US012616203B2

(12) United States Patent
Walter et al.

(10) Patent No.: US 12,616,203 B2
(45) Date of Patent: May 5, 2026

(54) USE OF 3-ISOXAZOLIDINONES COMPOUNDS AS SELECTIVE HERBICIDES

(71) Applicant: FMC Corporation, Philadelphia, PA (US)

(72) Inventors: James Walter, Furlong, PA (US); Paul Nicholson, Ewing, NJ (US); Alison Burnett, Philadelphia, PA (US); James Lappin, Randolph, NJ (US); Gurinderbir S. Chahal, Plymouth, MN (US); Sandra L. Shinn, Columbus, NJ (US); Frank J. D'amico, Jr., Robbinsville, NJ (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 15/117,301

(22) PCT Filed: Feb. 20, 2015

(86) PCT No.: PCT/US2015/016892

§ 371 (c)(1),
(2) Date: Aug. 8, 2016

(87) PCT Pub. No.: WO2015/127259

PCT Pub. Date: Aug. 27, 2015

(65) Prior Publication Data

US 2017/0042155 A1      Feb. 16, 2017

Related U.S. Application Data

(60) Provisional application No. 61/951,269, filed on Mar. 11, 2014, provisional application No. 61/943,437, filed on Feb. 23, 2014.

(51) Int. Cl.

| | |
|---|---|
| *A01N 43/80* | (2006.01) |
| *A01N 33/10* | (2006.01) |
| *A01N 37/18* | (2006.01) |
| *A01N 37/22* | (2006.01) |
| *A01N 37/34* | (2006.01) |
| *A01N 41/10* | (2006.01) |
| *A01N 43/10* | (2006.01) |
| *A01N 43/40* | (2006.01) |
| *A01N 43/56* | (2006.01) |
| *A01N 43/653* | (2006.01) |
| *A01N 43/66* | (2006.01) |
| *A01N 47/36* | (2006.01) |

(52) U.S. Cl.
CPC ............ *A01N 43/80* (2013.01); *A01N 33/10* (2013.01); *A01N 37/18* (2013.01); *A01N 37/22* (2013.01); *A01N 37/34* (2013.01); *A01N 41/10* (2013.01); *A01N 43/10* (2013.01); *A01N 43/40* (2013.01); *A01N 43/56* (2013.01); *A01N 43/653* (2013.01); *A01N 43/66* (2013.01); *A01N 47/36* (2013.01)

(58) Field of Classification Search
None
See application file for complete search history.

(56) References Cited

U.S. PATENT DOCUMENTS

| | | | | |
|---|---|---|---|---|
| 4,405,357 | A | * | 9/1983 | Chang .................... A01N 37/28 504/271 |
| 5,527,762 | A | | 6/1996 | Ensminger |
| 5,691,274 | A | * | 11/1997 | Ensminger ............. A01N 43/80 504/105 |
| 2010/0234225 | A1* | | 9/2010 | Dexter ................... A01N 25/04 504/134 |
| 2011/0059849 | A1* | | 3/2011 | Refardt .................. A01N 43/80 504/138 |
| 2012/0142533 | A1* | | 6/2012 | Richard ................. A01N 43/80 504/271 |
| 2014/0045694 | A1* | | 2/2014 | Nicholson ............. A01N 43/80 504/271 |

FOREIGN PATENT DOCUMENTS

| | | | | | |
|---|---|---|---|---|---|
| AU | 752714 | B2 | | 9/2002 | |
| AU | 767610 | B2 | | 11/2003 | |
| CN | 102318631 | A | * | 1/2012 | |
| CN | 102428942 | A | | 5/2012 | |
| CN | 102894004 | A | | 1/2013 | |
| CN | 108013055 | A | * | 5/2018 | |
| EA | 017098 | B1 | * | 1/2001 | |
| EP | 0767610 | | | 4/1997 | |
| EP | 0958742 | A1 | | 11/1999 | |
| FR | 2618053 | A1 | | 1/1989 | |
| FR | 2820950 | A1 | * | 8/2002 | .......... A01N 43/707 |

(Continued)

OTHER PUBLICATIONS

Preplant and Preemergence Herbicides for Soybean Production—2005 Herbicide Manual for Agricultural Professionals.*
International Search Report and Written Opinion dated May 14, 2015 in International Patent Application No. PCT/US2015/016892.
Gregory R. Armel, "Differential Response of Several Carotenoid Biosynthesis Inhibitors in Mixtures with Atrazine", Weed Technology, vol. 21, Dec. 1, 2007, pp. 947-953.
Supplementary European Search Report issued Aug. 2, 2017 in EP Application No. 15752754.
Mechanism and Application of Herbicides (edited by Wang Jiayin, Yunnan Science and Technology Press, 1st edition and 1st printing in Aug. 2009).

(Continued)

*Primary Examiner* — Alton N Pryor
(74) *Attorney, Agent, or Firm* — FMC Corporation

(57) ABSTRACT

Herbicidal compositions are described containing either 2-(2,4-dichlorophenyl)methyl-4,4-dimethyl-3-isoxazolidinone (2,4-DC) or 2-(2,5-dichlorophenyl)methyl-4,4-dimethyl-3-isoxazolidinone (2,5-DC). Compositions containing 2,4-DC or 2,5-DC and a second herbicide are also disclosed, where the combination does not contain both 2,4-DC and 2,5-DC. Methods of using the same compositions are also described.

13 Claims, No Drawings

(56)  References Cited

FOREIGN PATENT DOCUMENTS

| WO | WO 2012148689 A2 * | 11/2012 | ............. A01N 43/80 |
|----|--------------------|---------|--------------------------|
| WO | 2017025396 A1 | 2/2017 | |
| WO | 2017025418 A1 | 2/2017 | |

OTHER PUBLICATIONS

Command 3ME Microencapsulated Herbicide (US label).
Phytotoxicity of Clomazone Associated With Dietholate In A Wheat
Crop; Schmitz, M.F., et.al., Revista Brasileira de Herbicidas v.14,
n.4, p. 288-295, 2015.
Carryover Injury of Clomazone Applied in Soybeans (Glycine max)
and Fallow; Ahrens, W.H., et.al., Weed Technology vol. 4, Issue 4,
pp. 855-861, 1990.

* cited by examiner

USE OF 3-ISOXAZOLIDINONES COMPOUNDS AS SELECTIVE HERBICIDES

CROSS-REFERENCE TO RELATED APPLICATIONS

This application is a 371 U.S. national phase filing of International Patent Application No. PCT/US 15/16892 filed Feb. 20, 2015, which application claims the benefit of priority of U.S. Provisional Applications No. 61/943,437 filed on Feb. 23, 2014, and 61/951,269 filed on Mar. 11, 2014, the disclosures of all of which are incorporated herein by reference in their entireties.

TECHNICAL FIELD

The present invention is directed to compositions and uses of at least one 3-isoxazolidinone analog herbicide selected from 2-(2,4-dichlorophenyl)methyl-4,4-dimethyl-3-isoxazolidinone ("2,4-DC") and 2-(2,5-dichlorophenyl)methyl-4,4-dimethyl-3-isoxazolidinone ("2,5-DC"), including combinations with a second herbicide.

BACKGROUND

The protection of crops from undesirable plants known as weeds which can interfere with crop growth and can reduce crop yield has long been a goal in agriculture. One approach which has been taken to achieve this goal is the development of selective herbicides which can control weeds without exhibiting unacceptable phytotoxicity to the crops sought to be protected. More recently, crops have been protected from weeds by genetically modifying the crop to be tolerant to a non-selective herbicide (such as glyphosate or glufosinate) and applying such herbicide over the top of such crops. Unfortunately, this latter approach has led to the evolution of herbicide-ressitant weeds, with the result that there is still a need for a means of selectively controlling undesirable vegetation in crops.

U.S. Pat. No. 4,405,357 discloses certain 3-isoxazolidinones which exhibit desirable selective herbicidal activity. Specifically, such compounds are shown to be effective in controlling grassy and broadleaf weed species while leaving legumes, particularly soybeans, unaffected. Among the compounds specifically disclosed in this patent are 2-(2,4-dichlorophenyl) methyl-4,4-dimethyl-3-isoxazolidinone and 2-(2,5-dichlorophenyl)methyl-4,4-dimethyl-3-isoxazolidinone. Both such compounds are effective against a number of weeds. However, there is still a need for effective combinations of herbicides to reduce or nullify the injury of the crop plants by using selective formulations while not affecting the herbicidal action on the weeds to be controlled.

SUMMARY OF THE INVENTION

The present invention addresses such need. The present invention discloses novel compositions for protecting crops from undesirable vegetation. One aspect of the invention is directed to a composition containing a first herbicide selected from the group consisting of 2-(2,4-dichlorophenyl) methyl-4,4-dimethyl-3-isoxazolidinone ("2,4-DC") and 2-(2,5-dichlorophenyl)methyl-4,4-dimethyl-3-isoxazolidinone ("2,5-DC"); and at least one second herbicide and use thereof in controlling undesirable vegetation which interfere with crop growth. Another aspect of the invention is directed to a composition comprising a herbicide selected from the group consisting of 2-(2,4-dichlorophenyl)methyl-4,4-dimethyl-3-isoxazolidinone ("2,4-DC") and 2-(2,5-dichlorophenyl)methyl-4,4-dimethyl-3-isoxazolidinone ("2,5-DC"); at least one formulation component selected from the group consisting of adjuvants for an EC formulation, adjuvants for an SC formulation, and adjuvants for a CS formulation; and optionally, one or more additional active ingredients.

In at least one aspect of the present invention, the disclosed composition contains either 2,4-DC or 2,5-DC and the second herbicide that is different from the first herbicide, wherein when the first herbicide is 2,4-DC, the second herbicide is not 2,5-DC, and when the first herbicide is 2,5-DC, the second herbicide is not 2,4-DC. In one embodiment, the first herbicide is 2,4-DC. In another embodiment, the first herbicide is 2,5-DC.

In another embodiment, the second herbicide is selected from the group consisting of dimethenamid-P, diphenamid, napropamide, napropamide-M, naptalam, pethoxamid, propanil, acetochlor, alachlor, metolachlor, dimethachlor, S-metolachlor, pretilachlor, benzofluor, cambendichlor, chloramben, dicamba, bispyribac, pyrithiobac; mesotrione, sulcotrione, tefuryltrione, tembotrione, benfuresate, asulam, barban, alloxydim isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof.

In a preferred embodiment, the second herbicide is selected from the group consisting of acetochlor, aclonifen, ametryn, amicarbazone, atrazine, bispyribac-sodium, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsulfuron-methyl, napropamide, pendimethalin, pethoxamid, pretilachlor, propanil, pyroxasulfone, quizalofop, tebuthiuron, thifensulfuron, thifensulfuron-methyl, trifluralin, agriculturally acceptable salts thereof, esters thereof and mixtures of two or more thereof.

In yet another embodiment, the second herbicide is selected from the group consisting of napropamide, aclonifen, pyroxasulfone, metazachlor, diflufenican, sulfentrazone, mesotrione, metsulfuron, thifensulfuron, agriculturally acceptable salts thereof, esters thereof and mixtures of two or more thereof.

In another aspect, methods of controlling undesirable vegetation and protecting a crop are described using a composition that contains a first herbicide selected from the group consisting of 2,4-DC and 2,5-DC; and at least one second herbicide selected from the group that includes acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, trifluralin, agriculturally acceptable salts thereof, esters thereof and mixtures of two or more thereof.

In a one embodiment, susceptible crops include plants from groups such as bananas, beans, beets, Cassava, cereals, citrus, cocoas, coconuts, coffee, corn, cotton, fiber crops, flowers, forage corps, forestry, groundnuts, peanuts, hops, horticultures, non-land crops, oil palm, oilseed rape, peas, pomes, potato, rice, stonefruit, spices, sugarcane, sunflower, tea, tobacco, tomatoes, tree nuts, turf, vegetable crops, vines, and grapes. In at least one embodiment, the crops are selected from potato, soybean, corn, rice, *sorghum*, oilseed rape, barley, rye, cowpea, and canola.

The present disclosure also describes a method of controlling undesired vegetation in a crop that includes applying to the locus of such vegetation a herbicidally-effective amount of a composition. The composition includes a first herbicide and a second herbicide. The first herbicide is selected from the group that includes 2,4 DC and 2,5 DC. The second herbicide is different from the first herbicide. The crop is selected from the group that includes potato, soybean, corn, rice, *sorghum*, oilseed rape, barley, rye, and canola.

In another further embodiment, the second herbicide is selected from the group that includes dimethenamid-P, napropamide, dimethachlor, S-metolachlor, aclonifen, pyroxasulfone, metazachlor, diflufenican, sulfentrazone, metobromuron, metsulfuron, thifensulfuron, and agriculturally acceptable salts and esters thereof.

DETAILED DESCRIPTION

As used in this application and unless otherwise indicated the term "herbicide" refers to a compositional mixture that is produced, sold, or used in a field in order to kill or otherwise inhibit the growth of unwanted plants such as, but not limited to, deleterious or annoying weeds, broadleaf plants, grasses, and sedges; and can be used for crop protection, edifice protection or turf protection. The term "herbicide" includes the end-use herbicidal product. This composition can be a pure compound, a solution of chemical compounds, a mixture of chemical compounds, an emulsion, a suspension, a solid-liquid mixture, or a liquid-liquid mixture.

The term "herbicide" also refers to the product that passes through the commercial channels from the manufacturer to the ultimate end user who can either apply the herbicide to the affected field as sold, or mix it with other excipients.

The term "weed" means and includes any plant which grows where not wanted.

The term "herbicidally effective amount" means an amount necessary to produce an observable herbicidal effect on unwanted plant growth, including one or more of the effects of necrosis, death, growth inhibition, reproduction inhibition, inhibition of proliferation, and removal, destruction, or otherwise diminishing the occurrence and activity of unwanted plants.

The definition of the term "herbicidal composition" refers to an herbicide, and in addition, to any composition that comprises an herbicidally active ingredient. This composition can be a solution or a mixture. Further, the definition of the term "herbicidal composition" also refers to a product intended for use in manufacturing, or any product intended for formulation or repackaging into other agricultural products.

The term "herbicidally active ingredient" means the active ingredient in the herbicide that causes the herbicide to prevent, destroy, repel or mitigate any weed. Other ingredients of the herbicide that are not herbicidally active ingredients are excipients that aid in forming, storing, or delivering herbicidally active ingredient to the target. Examples of excipients in the present embodiment include, without limitation, an organic liquid in which herbicidally active ingredient is dissolved, a polyurea shell, a water-soluble polymer, and one or more salts.

The term "2,4 DC" refers to 2-(2,4-dichlorophenyl) methyl-4,4-dimethyl-3-isoxazolidinone.

The term "2,5 DC" refers to 2-(2,5-dichlorophenyl) methyl-4,4-dimethyl-3-isoxazolidinone.

The compositions of the present disclosure can be in any conventional agriculturally useful form, for example, in the form of a twin pack, or in a ready-to-use formulation, or in the form of a tank mix. Additionally, the active compounds can be supplied (either separately or pre-mixed) in any appropriate formulation type, for example an emulsifiable concentrate (EC), a suspension concentrate (SC), a suspoemulsion (SE), a capsule suspension (CS), a water dispersible granule (WG), an emulsifiable granule (EG), a water in oil emulsion (EO), an oil in water emulsion (EW), a microemulsion (ME), an oil dispersion (OD), an oil miscible flowable (OF), an oil miscible liquid (OL), a soluble concentrate (SL), an ultra-low volume suspension (SU), an ultra-low volume liquid (UL), a dispersible concentrate (DC), a wettable powder (WP) or any other technically feasible formulation in combination with agriculturally acceptable adjuvants. In one preferred embodiment, the compositions of the present disclosure are supplied as an emulsifiable concentrate, a suspension concentrate or a capsule suspension.

At least one aspect of the present invention is directed to compositions comprising a first herbicide selected from the group consisting of 2,4 DC and 2,5 DC; and a second herbicide with the proviso that when the first herbicide is 2,4 DC or 2,5 DC, the second herbicide is not 2,5 DC or 2,4 DC respectively. Accordingly, the compositions of the present invention either contains 2,4 DC or 2,5 DC in combination with at least another herbicide wherein when the first herbicide is 2,4-DC, the second herbicide is not 2,5 DC, and when the first herbicide is 2,5 DC, the second herbicide is not 2,4 DC.

As such the composition of the present invention can be in any one of SC, SE, CS, WG, EC, EG, EO, EW, ME, OD, OF, OL, SL, SU, UL, DC, or WP formulation in combination with agriculturally acceptable adjuvants.

The second herbicides disclosed in connection with the present invention include, but are not limited to, the following:

Acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxy-propionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl;

Acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium. KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron;

Amides, for example allidochlor (CDAA), benzoylpropethyl, bromobutide, chlorthiamid. diphenamid, etobenzanid, fluthiamide, fosamin or monalide;

At least one aspect of the present invention employs the use of a second herbicide that provides enhanced safety and efficacy in controlling undesirable vegetation. In a more preferred embodiment, the herbicide employed enhances the selectivity of the actions in the crops to be treated. The following provides a list of herbicides that are suitable for use as a second herbicide.

Amide herbicides include, but are not limited to allidochlor, amicarbazone, beflubutamid, benzadox, benzipram, bromobutide, cafenstrole, CDEA, cyprazole, dimethenamid, dimethenamid-P, diphenamid, epronaz, etnipromid, fentrazamide, flucarbazone, flupoxam, fomesafen, halosafen, huangcaoling, isocarbamid, isoxaben, napropamide, napropamide-M, naptalam, pethoxamid, propyzamide, quinonamid, saflufenacil, tebutam, and tiafenacil and agriculturally acceptable salts and esters thereof.

Anilide herbicides, include, but are not limited to, chloranocryl, cisanilide, clomeprop, cypromid, erlujixiancaoan, etobenzanid, fenasulam, flufenacet, flufenican, ipfencarbazone, mefenacet, mefluidide, metamifop, monalide, naproanilide, pentanochlor, picolinafen, propanil, and triafamone and agriculturally acceptable salts and esters thereof.

Arylalanine herbicides include, but are not limited to benzoylprop, flamprop, and flamprop-M and agriculturally acceptable salts and esters thereof.

Chloroacetanilide herbicides include but are not limited to acetochlor, alachlor, butachlor, butenachlor, delachlor, diethatyl, dimethachlor, ethachlor, ethaprochlor, metazachlor, metolachlor, S-metolachlor, pretilachlor, propachlor, propisochlor, prynachlor, terbuchlor, thenylchlor, xylachlor sulfonanilide herbicides; benzofluor, cloransulam, diclosulam, florasulam, flumetsulam, metosulam, perfluidone, profluazol, and pyrimisulfan and agriculturally acceptable salts and esters thereof.

Sulfonamide herbicides include, but are not limited to, asulam, carbasulam, fenasulam, oryzalin, penoxsulam, and pyroxsulam and agriculturally acceptable salts and esters thereof.

Thioamide herbicides include, but are not limited to, bencarbazone, and chlorthiamid and agriculturally acceptable salts and esters thereof.

Benzoic acid herbicides include, but are not limited to, cambendichlor, chloramben, dicamba, 2,3,6-TBA, tricamba, pyrimidinyloxybenzoic acid herbicides; bispyribac, and pyriminobac and agriculturally acceptable salts and esters thereof.

Pyrimidinylthiobenzoic acid herbicides include, but are not limited to pyrithiobac and agriculturally acceptable salts and esters thereof.

Phthalic acid herbicides include but are not limited to chlorthal and agriculturally acceptable salts and esters thereof.

Picolinic acid herbicides include but are not limited to, aminopyralid, clopyralid, halauxifen, and picloram and agriculturally acceptable salts and esters thereof.

Quinolinecarboxylic acid herbicides include but are not limited to, quinclorac, and quinmerac and agriculturally acceptable salts and esters thereof.

Arsenical herbicides include but are not limited to, cacodylic acid, CMA, DSMA, hexaflurate, MAA, MAMA, MSMA, potassium arsenite, and sodium arsenite and agriculturally acceptable salts and esters thereof.

Benzoylcyclohexanedione herbicides include are but are not limited to, fenquinotrione, ketospiradox, mesotrione, sulcotrione, tefuryltrione, and tembotrione.

Benzofuranyl alkylsulfonate herbicides include but are not limited to benfuresate, and ethofumesate and agriculturally acceptable salts and esters thereof.

Benzothiazole herbicides include but are not limited to benazolin, benzthiazuron, fenthiaprop, mefenacet, and methabenzthiazuron and agriculturally acceptable salts and esters thereof.

Carbamate herbicides include but are not limited to, asulam, carboxazole, chlorprocarb, dichlormate, fenasulam, karbutilate, terbucarb and agriculturally acceptable salts and esters thereof.

Carbanilate herbicides include but are not limited to, barban, BCPC, carbasulam, carbetamide, CEPC, chlorbufam, chlorpropham, CPPC, desmedipham, phenisopham, phenmedipham, phenmedipham-ethyl, propham, and swep and agriculturally acceptable salts and esters thereof.

Carbonate herbicides include but are not limited to bromobonil, dinofenate, and iodobonil and agriculturally acceptable salts and esters thereof.

Cyclohexene oxime herbicides include but are not limited to alloxydim, butroxydim, clethodim, cloproxydim, cycloxydim, profoxydim, sethoxydim, tepraloxydim, and tralkoxydim.

Cyclopropylisoxazole herbicides include but are not limited to, isoxachlortole, and isoxaflutole and agriculturally acceptable salts and esters thereof.

Dicarboximide herbicides include but are not limited to cinidon-ethyl, flumezin, flumiclorac, flumioxazin, and flumipropyn and agriculturally acceptable salts and esters thereof.

Dinitroaniline herbicides include, but are not limited to, benfluralin, butralin, chlornidine, dinitramine, dipropalin, ethalfluralin, fluchloralin, isopropalin, methalpropalin, nitralin, oryzalin, pendimethalin, prodiamine, profluralin, and trifluralin and agriculturally acceptable salts and esters thereof.

Dinitrophenol herbicides include but are not limited to dinofenate, dinoprop, dinosam, dinoseb, dinoterb, DNOC, etinofen, medinoterb and agriculturally acceptable salts and esters thereof.

Diphenyl ether herbicides include but are not limited to ethoxyfen and agriculturally acceptable salts and esters thereof.

Nitrophenyl ether herbicides include but are not limited to acifluorfen, aclonifen, bifenox, chlomethoxyfen, chlornitrofen, etnipromid, fluorodifen, fluoroglycofen, fluoronitrofen, fomesafen, fucaomi, furyloxyfen, halosafen, lactofen, nitrofen, nitrofluorfen, and oxyfluorfen.

Dithiocarbamate herbicides include but are not limited to dazomet, and metam and agriculturally acceptable salts and esters thereof.

Halogenated aliphatic herbicides include but are not limited to alorac, chloropon, dalapon, flupropanate, hexachloroacetone, methyl bromide, methyl iodide, monochloroacetic acid, SMA, and TCA and agriculturally acceptable salts and esters thereof.

Imidazolinone herbicides include, but are not limited to imazamethabenz, imazamox, imazapic, imazapyr, imazaquin, imazethapyr and agriculturally acceptable salts and esters thereof.

Inorganic herbicides include, but are not limited to ammonium sulfamate, borax, calcium chlorate, copper sulfate, ferrous sulfate, potassium azide, potassium cyanate, sodium azide, sodium chlorate, and sulfuric acid and agriculturally acceptable salts and esters thereof.

Nitrile herbicides include but are not limited to bromobonil, bromoxynil, chloroxynil, dichlobenil, iodobonil, and ioxynil pyraclonil and agriculturally acceptable salts and esters thereof.

Organophosphorus herbicides include, but are not limited to amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos, and shuangjiaancaolin and agriculturally acceptable salts and esters thereof.

Oxadiazolone herbicides include but are not limited to dimefuron, methazole, oxadiargyl, oxadiazon and agriculturally acceptable salts and esters thereof.

Oxazole herbicides include, but are not limited to carboxazole, fenoxasulfone, isouron, isoxaben, isoxachlortole, isoxaflutole, methiozolin, monisouron, pyroxasulfone, and topramezone and agriculturally acceptable salts and esters thereof.

Phenoxy herbicides include, but are not limited to bromofenoxim, clomeprop, 2,4-DEB, difenopenten, disul, erbon, etnipromid, fenteracol, and trifopsime and agriculturally acceptable salts and esters thereof.

Phenoxyacetic herbicides include, but are not limited to clacyfos, 4-CPA, 2,4-D, 3,4-DA, MCPA, MCPA-thioethyl, 2,4,5-T and agriculturally acceptable salts and esters thereof.

Phenoxybutyric herbicides include, but are not limited to 4-CPB, 2,4-DB, 3,4-DB, MCPB, 2,4,5-TB and agriculturally acceptable salts and esters thereof.

Phenoxypropionic herbicides include, but are not limited to cloprop, 4-CPP, dichlorprop, dichlorprop-P, 3,4-DP, fenoprop, mecoprop, mecoprop-P and agriculturally acceptable salts and esters thereof. Aryloxyphenoxypropionic herbicides include, but are not limited to chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, kuicaoxi, metamifop, propaquizafop, quizalofop, quizalofop-P, and trifop and agriculturally acceptable salts and esters thereof.

Phenylenediamine herbicides include, but are not limited to dinitramine, and prodiamine and agriculturally acceptable salts and esters thereof.

Pyrazole herbicides include, but are not limited to azimsulfuron, difenzoquat, halosulfuron, metazachlor, metazosulfuron, pyrazosulfuron, pyroxasulfone and agriculturally acceptable salts and esters thereof.

Benzoylpyrazole herbicides include, but are not limited to benzofenap, pyrasulfotole, pyrazolynate, pyrazoxyfen, and topramezone and agriculturally acceptable salts and esters thereof.

Phenylpyrazole herbicides include, but are not limited to fluazolate, nipyraclofen, pinoxaden, and pyraflufen and agriculturally acceptable salts and esters thereof.

Pyridazine herbicides include, but are not limited to credazine, cyclopyrimorate, pyridafol, and pyridate and agriculturally acceptable salts and esters thereof.

Pyridazinone herbicides include, but are not limited to brompyrazon, chloridazon, dimidazon, flufenpyr, metflurazon, norflurazon, oxapyrazon, and pydanon and agriculturally acceptable salts and esters thereof.

Pyridine herbicides include, but are not limited to aminopyralid, cliodinate, clopyralid, diflufenican, dithiopyr, flufenican, fluroxypyr, halauxifen, haloxydine, picloram, picolinafen, pyriclor, pyroxsulam, thiazopyr, and triclopyr and agriculturally acceptable salts and esters thereof.

Pyrimidinediamine herbicides include, but are not limited to iprymidam, and tioclorim and agriculturally acceptable salts and esters thereof.

Pyrimidinyloxybenzylamine herbicides include, but are not limited to pyribambenz-isopropyl, pyribambenz-propyl quaternary ammonium herbicides; cyperquat, diethamquat, difenzoquat, diquat, morfamquat, paraquat and agriculturally acceptable salts and esters thereof.

Thiocarbamate herbicides include, but are not limited to butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate, vernolate and agriculturally acceptable salts and esters thereof.

Thiocarbonate herbicides include, but are not limited to dimexano, EXD, and proxan and agriculturally acceptable salts and esters thereof.

Thiourea herbicides include, but are not limited to methiuron and agriculturally acceptable salts and esters thereof.

Triazine herbicides include, but are not limited to dipropetryn, fucaojing, and trihydroxytriazine and agriculturally acceptable salts and esters thereof.

Chlorotriazine herbicides include, but are not limited to atrazine, chlorazine, cyanazine, cyprazine, eglinazine, ipazine, mesoprazine, procyazine, proglinazine, propazine, sebuthylazine, simazine, terbuthylazine, and trietazine and agriculturally acceptable salts and esters thereof.

Fluoroalkyltriazine herbicides include, but are not limited to indaziflam, and triaziflam and agriculturally acceptable salts and esters thereof.

Methoxytriazine herbicides include, but are not limited to atraton, methometon, prometon, secbumeton, simeton, and terbumeton and agriculturally acceptable salts and esters thereof.

Methylthiotriazine herbicides include, but are not limited to ametryn, aziprotryne, cyanatryn, desmetryn, dimethametryn, methoprotryne, prometryn, simetryn, and terbutryn and agriculturally acceptable salts and esters thereof.

Triazinone herbicides include, but are not limited to ametridione, amibuzin, ethiozin, hexazinone, isomethiozin, metamitron, and metribuzin and agriculturally acceptable salts and esters thereof.

Triazole herbicides include, but are not limited to amitrole, cafenstrole, epronaz, and flupoxam and agriculturally acceptable salts and esters thereof.

Triazolone herbicides include, but are not limited to amicarbazone, bencarbazone, carfentrazone, carfentrazone ethyl, flucarbazone, ipfencarbazone, propoxycarbazone, sulfentrazone, and thiencarbazone and agriculturally acceptable salts and esters thereof.

Triazolopyrimidine herbicides include, but are not limited to cloransulam, diclosulam, florasulam, flumetsulam, metosulam, penoxsulam, and pyroxsulam and agriculturally acceptable salts and esters thereof.

Uracil herbicides include, but are not limited to benzfendizone, bromacil, butafenacil, flupropacil, isocil, lenacil, saflufenacil, terbacil, and tiafenacil and agriculturally acceptable salts and esters thereof.

Urea herbicides include, but are not limited to benzthiazuron, cumyluron, cycluron, dichloralurea, diflufenzopyr, isonoruron, isouron, methabenzthiazuron, monisouron, and noruron and agriculturally acceptable salts and esters thereof.

Phenylurea herbicides include, but are not limited to anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron, and thidiazuron and agriculturally acceptable salts and esters thereof.

Sulfonylurea herbicides include, but are not limited to amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, and zuomihuanglong and agriculturally acceptable salts and esters thereof.

Triazinylsulfonylurea herbicides include, but are not limited to chlorsulfuron, cinosulfuron, ethametsulfuron, iodosulfuron, iofensulfuron, and metsulfuron, prosulfuron, thifensulfuron, triasulfuron, tribenuron, triflusulfuron, tritosulfuron and agriculturally acceptable salts and esters thereof.

Thiadiazolylurea herbicides include, but are not limited to buthiuron, ethidimuron, tebuthiuron, thiazafluron, and thidiazuron and agriculturally acceptable salts and esters thereof.

Protoporphyrinogen Oxidase (PPO) inhibitors are selected from the group consisting of carfentrazone, carfentrazone-ethyl, sulfentrazone, fluthiacet-methyl, saflufenacil, diphenyl ethers, oxadiazoles, cyclic imides and pyrazoles. Examples of these PPO classes include, without limitation, acifluorfen, acifluorfen-sodium, azafenidin, bifenox, butafenacil, chlomethoxyfen, chlornitrofen, ethoxyfen-ethyl, fluorodifen, fluoroglycofen-ethyl, fluoronitrofen, fluthiacet-methyl, fomesafen, furyloxyfen, halosafen, lactofen, nitrofen, nitrofluorfen, oxyfluorfen, flumiclorac-pentyl, flumioxazine, profluazol, pyrazogyl, oxadiargyl, oxadiazon, pentoxazone, fluazolate, pyraflufen-ethyl, benzfendizone, butafenacil, cinidon-ethyl, flumipropyn, flupropacil, fluthiacet-methyl, thidiazimin, azafenidin, carfentrazone, carfentrazone-ethyl, sulfentrazone, saflufenacil, flufenpyr-ethyl, ET-751, JV 485, nipyraclofen, or mixtures of two or more thereof. Preferably the PPO inhibitors are selected from the group consisting of carfentrazone, sulfentrazone, fluthiacet-methyl, saflufenacil, and mixtures of two or more thereof.

Other herbicides include, but are not limited to acrolein, allyl alcohol, aminocyclopyrachlor, azafenidin, bentazone, bentranil, benzobicyclon, bicyclopyrone, buthidazole, calcium cyanamide, chlorfenac, chlorfenprop, chlorflurazole, chlorflurenol, cinmethylin, clomazone, CPMF, cresol, cyanamide, ortho-dichlorobenzene, dimepiperate, dithioether, endothal, fluoromidine, fluridone, flurochloridone, flurtamone, funaihecaoling, glyphosate, glufosinate, herbimycin, huancaiwo, indanofan, methoxyphenone, methyl isothiocyanate, OCH, oxaziclomefone, pelargonic acid, pentachlorophenol, pentoxazone, phenylmercury acetate, prosulfalin, pyribenzoxim, pyriftalid, quinoclamine, rhodethanil, saflufenacil, sulglycapin, tavron, thidiazimin, tridiphane, trimeturon, tripropindan, tritac, and agriculturally acceptable salts and esters thereof.

In a preferred embodiment, the second herbicide is selected from the group consisting of dimethenamid-P, diphenamid, napropamide, napropamide-M, naptalam, pethoxamid, propanil, acetochlor, alachlor, dimethachlor, R/S-metolachlor S-metolachlor, pretilachlor, benzofluor, cambendichlor, chloramben, dicamba, bispyribac, pyrithiobac; mesotrione, sulcotrione, tefuryltrione, tembotrione, benfuresate, asulam, barban, alloxydim isoxaflutole, dinitramine, dipropalin, ethalfluralin, pendimethalin, trifluralin, acifluorfen, aclonifen, etnipromid, clomazone, sulfentrazone, fluoronitrofen, fomesafen, glyphosate, glufosinate, saflufenacil, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, and agriculturally acceptable salts and esters thereof.

In one preferred embodiment, the second herbicide is selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, glyphosate, glufosinate, saflufenacil, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, trifluralin, agriculturally acceptable salts thereof, esters thereof and mixtures of two or more thereof.

In a more preferred embodiment, the second herbicide is selected from the group that includes dimethenamid-P, napropamide, dimethachlor, S-metolachlor, aclonifen, pyroxasulfone, metazachlor, diflufenican, sulfentrazone, metobromuron, metsulfuron, thifensulfuron, and agriculturally acceptable salts and esters thereof. In another embodiment, the second herbicide is selected from the group that includes metazachlor, napropamide, sulfentrazone, and mesotrione.

In yet another embodiment, the first herbicide is 2,4 DC and the second herbicide is selected from the group consisting of dimethenamid-P, pethoxamid, propanil, acetochlor, dimethachlor, pretilachlor, dicamba, bispyribac, mesotrione, ethalfluralin, pendimethalin, trifluralin, fomesafen, bromoxynil, 2,4-DEB, 2,4-D, 2,4-DB, cyhalofop, metamifop, quizalofop, atrazine, aclonifen, ametryn, hexazinone, metribuzin, amicarbazone, carfentrazone, carfentrazone ethyl, linuron, ethoxysulfuron, fluthiacet-methyl, napropamide, pyroxasulfone, metazachlor, diflufenican, metobromuron, metsulfuron, thifensulfuron, and agriculturally acceptable salts and esters thereof.

In a further embodiment, the first herbicide is 2,5 DC and the second herbicide is selected from the group consisting of dimethenamid-P, pethoxamid, propanil, acetochlor, dimethachlor, pretilachlor, dicamba, bispyribac, mesotrione, ethalfluralin, pendimethalin, trifluralin, fomesafen, bromoxynil, 2,4-DEB, 2,4-D, 2,4-DB, cyhalofop, metamifop, quizalofop, atrazine, aclonifen, ametryn, hexazinone, metribuzin, amicarbazone, carfentrazone, carfentrazone ethyl, linuron, ethoxysulfuron, fluthiacet-methyl, napropamide, pyroxasulfone, metazachlor, diflufenican, metobromuron, metsulfuron, thifensulfuron, and agriculturally acceptable salts and esters thereof.

In another embodiment, the second herbicide are any one of dimethenamid-P, napropamide, dimethachlor, S-metolachlor, aclonifen, pyroxasulfone, metazachlor, diflufenican, sulfentrazone, metobromuron, metsulfuron, thifensulfuron, and agriculturally acceptable salts and esters thereof having particle sizes of less than 250, 100 or preferably 50 microns. In yet another embodiment, the second herbicide can be anyone of napropamide, aclonifen, pyroxasulfone, metazachlor, diflufenican, sulfentrazone, mesotrione, metsulfuron, thifensulfuron, and agriculturally acceptable salts and esters thereof having particle sizes of less than 250, 100 or preferably 50 microns.

In one aspect of the present invention, the compositions of the present invention selectively protect crops that are a member of the any of the following crop groups including, bananas, beans, beets, cassava, cereals, citrus, cocoas, coconuts, coffee, corn, cotton, fiber crops, flowers, forge corps, forestry, groundnuts, peanuts, hops, horticultures, non-land crops, oil palm, oilseed rape, peas, pomes, potato, rice, stonefruit, spices, sugar cane, Sunflower, tea, tobacco, tomatoes, tree nuts, turf, vegetable crops, vines, grapes. In at least one embodiment, the crops are potato, soybean, corn, rice, *sorghum*, oil seed rape, barley, rye, cowpea or canola.

More specifically, such crops include, but are not limited to, bananas, plantains, beet: fodder, beets, sugar beets, cassava, barley, barley-spring, barley-winter, oats, oats+triticale-winter, oats-spring, oats-winter, rye, rye-winter, stubble, triticale, triticale+rye, wheat, wheat/barley, wheat-durum, wheat-spring, wheat-winter, citrus, grapefruit, lemons/limes, oranges, cocoa, coconuts, coffee, corn, corn: fodder, corn: grain, corn: sweet, corn+*sorghum*-spring, cotton, flax, carnation, chrysanthemum, flowers, gladioli, ornamentals: nursery, roses, alfalfa, brassicas: fodder, clover: seed, forage crops, grass-seed, pasture, rangeland, rye: seed, forestry, groundnuts, peanuts, hops, horticulture, industrial markets, aquatic weed, fallow land, idle crop land, land reclamation, summer fallow, oil palm, canola, rapeseed, rapeseed-spring, rapeseed-winter, linseed, lupin, mustard, oil seeds, safflower seed, sesame seed, olives, berries, blackberries, cranberries, currants, durians, guavas, kiwifruit, lychees, mangoes, papayas, persimmon, pineapple, rambutans, strawberries, tropical fruits, beans, chick-peas, lentils, mung beans, peas, pulses/gram, apples, apricots, avocados, cherries, fruit, peaches, nectarines, pears, plums, pome fruit, pome/stone fruit, tree crops: waxapples, potatoes, potatoes: seed, potatoes: sweet, rice: paddy, rice: upland, rubber, millet, sm. grain: other, *sorghum*, soybeans, cardamom, cloves, ginsing, pepper: black, spices, sugar cane, sunflower, tea, tobacco, tomatoes, field tomatoes, green tomatoes, red tomatoes, almonds, betel nuts, cashews, hazelnuts, macadamia nuts, pecans, pistachios, walnuts, turf/lawns, agave, asparagus, brassicas: vegetable, broccoli, cabbage, Chinese cabbage, carrots, chicory, cruciferae, cucumbers, cucurbits, eggplant, garlic, herbs, lettuce, melons, onions, onions/garlic, peppers/chillies, field peppers, Japanese radish, squash, vegetable crops, field vegetables, other vegetables, watermelons, and grapes. Cucurbits include such crops as Melons: *Benincasa* spp., *Citrullus* spp., *Cucumis* spp., *Momordica* spp.; Watermelon: *Citrullus lanatus*; Pumpkin: *Cucurbita pepo*; Squash: *Cucurbita argyrosperma, C. ficifolia, C. maxima, C. moschata*; and Cucumber: *Cucumis sativus* In one embodiment, the crop includes wheat varieties such as Bloc, Kord, Wyalkatchem and Mace.

In another aspect of the present invention, the presently claimed composition are selective against weeds including but are not limited to, fleabane, sowthistle, grass weeds, broadleaf weeds, barnyardgrass (*Echinochloa crus-galli*), jimsonweed (*Datura stramonium*), velvetleaf (*Abutilon theophrasti*), common cockelbur (*Xanthium strumarium*) and hairy beggartickss (*Bidens pilosa*), Italian ryegrass (*Lolium perenne. multiflorum*), annual bluegrass (*Poa annua*), common lambsquarters (*Chenopodium album*), littleseed canarygrass (*Phalaris minor*), common chickweed (*Stellaria media*) and corn poppy (*Papaver rhoeas*), Pennsylvania smartweed (*Polygonum pennsylvanicum*), Palmer amaranth (*Amaranthus palmeri*), velvetleaf (*Abutilon theophrasti*), green foxtail (*Setaria viridis*), morningglory (*Ipomoea* spp.), yellow nutsedge (*Cyperus esculentus*), purple nutsedge (*Cyperus rotundus*) and benghal dayflower (*Commelina benghalensis*), *Atriplex prostrate, Capsella bursa-pastoris, Chenopodium album, Chenopodium album ccentrorubrum, Desuraina Sophia, Galium aparine, Lamium Purpurum, Matricaria recutita, solanum nigrum, Stellaria media, Viola arvensis*.

In another further embodiment, the activity of the first and second herbicide may be additive. As such, when the observed activity is the same as expected, the activity of the combination is additive. In another embodiment, the combination of first and second herbicides provides an activity that is greater than the expected additive, and thus the combination provides synergistic properties. In contrast, when the combined activity is less than expected, the activity is deemed antagonistic. According to at least one aspect of the present invention, combinations of the first and second herbicides provide synergistic effects in terms of weed control.

In at least one embodiment, synergistic effects of the presently described combinations are observed in such species including annual bluegrass, Benghal dayflower, black nightshade, blackgrass, cheat, common chickweed, common cocklebur, common lambsquarters, common ragweed, hairy beggarticks, Italian ryegrass, ivyleaf morningglory, jimsonweed, johnsongrass, littleseed canarygrass, Pennsylvania smartweed, pitted morningglory, purple nutsedge, quackgrass, shepherd's purse, velvetleaf, wild buckwheat, wild mustard, wild oat, wild poinsettia, yellow nutsedge.

In another embodiment, methods of controlling undesired vegetation in a crop are described by applying to the locus of such vegetation an herbicidally-effective amount of a composition containing a first herbicide selected from the group consisting of 2,4-DC and 2,5-DC and, optionally, a second herbicide that is different from the first herbicide, wherein the crop is selected from wheat, potato, soybean, corn, rice, *sorghum*, oilseed rape, barley, rye, cowpea, oat, sunflower, and canola. In a more preferred embodiment, the crop is wheat, sunflower and canola.

In at least one aspect of the present invention, the present compositions comprising 2,4-DC or 2,5-DC may be applied pre-emergently or post emergently. The amount constituting an effective amount is variable and generally depends on a number of factors such as the type of soil, the expected pattern of rainfall or irrigation, the plant species to be controlled and the susceptibility of the particular crop involved. However, the effective amounts are typically between about 1 and about 4000 grams of the herbicide active ingredient may need to be applied per hectare. Such compounds are generally applied at a rate between 75 to about 2000 grams a.i./hectare. In more preferred embodiments, the amounts are applied at a rate of between about 125 and 1500 grams a.i./hectare.

The compositions of the present invention can further contain one or more adjuvants or carriers. In at least one embodiment, herbicidal active ingredients are present in concentrations ranging between 0.01% to about 95%. In another embodiment, agriculturally acceptable carriers constitute about 4% to about 98.5%. Surface active or surfactant agents, viscocity enhancing agents, and solvents respectively can constitute about between 1% to 15% of the final formulation by weight. In one preferred embodiment, the compositions of the present invention are formulated as an EC an SC or a CS.

In yet another aspect of the present invention, uniquie compositions are described that contains only a 2,4 DC or 2,5 DC in a suitable delivery vehicle. In one embodiment, the 2,4 DC or 2,5 DC contains amounts ranging from about 25-about 40% w/w, the calcium chloride is in amount ranging from about 3-about 8% w/w, and the sodium nitrate is in amount ranging from about 3-about 8% w/w, while in another embodiment, the present invention can contain a 2,5 DC formulation, wherein the 2,4 DC is in amount of about 36% w/w, the calcium chloride is in amount of about a 6.156% w/w, and the sodium nitrate is in amount of about 6.156% w/w.

In yet another aspect of this invention, the compositions of the present invention contain: (i). a first herbicide selected from the group consisting of 2,4 DC, and 2,5 DC; (ii) at least one inactive component selected from the group consisting of at least one an antimicrobial, at least one surfactant, at least one thickener, at least one antifoam, at least one antifreeze, at least one solvent, and at least one co-solvent; and (iii). optionally, one or more additional active ingredients.

In yet another aspect of this invention, a composition is described for example in a SC form that may contain a surfactant from a very large variety of surfactants known in the art which can also be commercially available. Surfactants may belong to different classes such as cationic surfactants, anionic surfactants, non-ionic surfactants, ionic surfactants, and amphoteric surfactants. According to the invention, the surfactant can be any surfactant or combination of two or more surfactants useful to dissolve the herbicide compound, for example, in its acid form to produce a microemulsion-forming-concentrate.

Examples of some preferred surfactants include cationic, non-ionic, and anionic surfactants. Of these, some even more specific types of preferred surfactants include non-ionic linear or branched alcohol ethoxylate surfactants, anionic phosphoric acid ester surfactants (sometimes referred to as "phosphate ester" surfactants), and cationic ethoxylated tallow amine surfactants.

Non-ionic surfactants suitable for the present invention include ethoxylated linear alcohol, ethoxylated alkyl phenol, alkyl EO/PO copolymer, polyalkylene glycol monobutyl ether ethoxylated fatty acids/oils, sorbitan laurate, polysorbate, sorbitan oleate, ethoxylated fatty acid alcohols, or alkyl phenols.

In another aspect of the present invention, the composition of the preset invention, may contain a thickener. Suitable thickener are rice, starch, gum arabic, gum tragacanth, guar flour, British gum, starch ethers and starch esters, gum resins, galactomannans, magnesium aluminum silicate, xanthan gum, carrageenan, cellulose derivatives, methyl cellulose, alginates and combinations thereof. Other known commercial products may include Lattice NTC 50, Lattice NTC 60, methocel, clay, veegum silica.

In another embodiment, the compositions of the present invention may contain an antifreeze agent such as ethylene glycol, propylene glycol, urea, calcium chloride sodium nitrate, magensiul chloride and ammonium sulfate. Other inactive agents may include an antimicrobial such as Proxel GXL, Bronopol, BHT, BHA, Dowcided A Kathon; solvents including Aromatic and linear solvents. Aromatic solvents include aromatic 100, aromatic 150, aromatice 150 ND, aromatic 200 ND, isopar M, paraffinic oil, Sunspray 6 or 11 N, vegetable oil, methyl ester of fatty acid, Dimethyl caprylamide. Anti foam agents such as Xiameter AFE-100, Dow Corning AFs, Dow Corning 1520, 1530, or 1540 may also be used in the presently claimed formulations.

At least another embodiment is directed to composition containing the 2,4 DC or 2,5 DC in the amounts ranging from about 30-about 50% w/w, preferably about 35-about 45% and more preferably about 40% w/w. I another embodiment, the compositions of the present invention contain an antifreeze agents in amounts of ranging from about 1-about 15%, preferably about 3-about 8% and more preferably about 5-about 7% w/w. in another embodiment, the amounts of the surfactant within the compositions of the present invention ranging from about 1-about 10%, preferably about 3-about 8%, and more preferably about 5-about 7% w/w. In one embodiment, the antifreeze agent is propylene glycol in amount ranging from about 3-about 8% w/w, and the surfactant is Tergiot in amount ranging from about 6% w/w.

In yet another aspect of the present invention, unique compositions are described containing a first herbicide selected from the group consisting of 2-(2,4-dichlorophenyl) methyl-4,4-dimethyl-3-isoxazolidinone ("2,4 DC") and 2-(2,5-dichlorophenyl)methyl-4,4-dimethyl-3-isoxazolidinone ("2,5 DC"); and a second herbicide; with the proviso that when the first herbicide is 2,4-DC or 2,5-DC, the second herbicide is not 2,5-DC or 2,4-DC respectively.

In a more preferred embodiment, the composition is in the form of an SC comprising at least one a surfactant, a thicker and a solvent and optionally an antifoam agent. In yet another embodiment, the formulation is a CS formulation comprising a thickener, Reax or lignin derivatives, and a solvent. In yet another embodiment, the formulation is an EC formulation comprising a solvent, a surfactant, castor oil ethoxylated or nonyl phenol and DDBS or equivalents thereof. In another aspect of the present invention, the compositions of the present invention are prepared by a process following the steps of combining the herbicidal active ingredient in effective amounts with suitable surface active agent, emulsifier desired amounts, viscosity enhancing agents, and suitable solvent.

In another embodiment, the mixture is further undergoing a milling process until suitable particle size ranging from about 1 to about 250 microns are obtained. In a preferred embodiment, the mixture is milled until 90% of the particle size (D90) is less than about 50 microns.

One aspect of the invention is directed to a composition comprising: i) a first herbicide selected from the group consisting of 2-(2,4-dichlorophenyl)methyl-4,4-dimethyl-3-isoxazolidinone ("2,4-DC") and 2-(2,5-dichlorophenyl) methyl-4,4-dimethyl-3-isoxazolidinone ("2,5-DC"); ii) at least one formulation component selected from the group consisting of adjuvants for an EC formulation; adjuvants for an SC formulation; and adjuvants for a CS formulation; and iii) optionally, one or more additional active ingredients.

The adjuvants for an EC formulation may be selected from the group consisting of pluronic or Tergitol, caster oil ethoxylated or nonyl phenol, DDBS or equivelant, and a solvent. The adjuvants for an SC formulation may be selected from the group consisting of Tergitols, Pluronics, Dextrol, Soprophor FLK, Glycol, Glycerine, Water, antifoam, clay and a thickener. The adjuvants for a CS formulation are selected from the group consisting of solvent, polymeric material, Reax or lignin derivatives, salts and thickeners such as xanthan. Generally, glycols may also be used in CS, EW, SE or SS type formulations as an antifreeze agent.

In one embodiment, the additional active ingredients are selected from the group consisting of herbicides such as clomozone. One embodiment of the composition comprises 2,4-DC, propylene glycol and surfactants. In a preferred embodiment the composition comprises about 36% by weight of 2,4-DC, the propylene glycol comprises about 6% by weight, and the surfactant blend comprises about 3% by weight of the composition. Another embodiment of the composition comprises 2,4-DC, calcium chloride and sodium nitrate. In a preferred embodiment the composition comprises about 36% by weight of 2,4-DC, the calcium chloride comprises about 6.156% by weight, and the sodium nitrate comprises about 6.156% by weight of the composition.

In yet another embodiment, the present disclosure describes an agricultural formulation containing about 36% of 2,4-dichlorophenyl-4,4-dimethyl-3-isoxazolidinone (410 g/L), about 6% of propylene glycol, about 3% of a surfactant blend, and about 55% of other ingredients, which may include agriculturally acceptable formulation ingredients known to one of skill in the art. In one embodiment, this agricultural formulation is a suspension concentrate (SC).

In another embodiment, the formulation contains about 36% of 2,4-dichlorophenyl-4,4-dimethyl-3-isoxazolidinone (430 g/L), about 6.156% of Calcium Chloride Hexahydrate (CAS No. 7774-34-7), about 6.156% of Sodium Nitrate (CAS No. 7631-99-4), and about 51.69% other ingredients, which may include agriculturally acceptable formulation ingredients known to one of skill in the art. In one embodiment, this agricultural formulation is a capsule suspension (CS).

Another aspect of the invention is directed to a composition comprising: i) a first herbicide selected from the group consisting of 2-(2,4-dichlorophenyl)methyl-4,4-dimethyl-3-isoxazolidinone ("2,4-DC") and 2-(2,5-dichlorophenyl) methyl-4,4-dimethyl-3-isoxazolidinone ("2,5-DC"); and ii) a second herbicide; with the proviso that when the first herbicide is 2,4-DC or 2,5-DC, the second herbicide is not 2,5-DC or 2,4-DC respectively. The second herbicide may be selected from the group consisting of dimethenamid-P, diphenamid, napropamide, napropamide-M, naptalam, pethoxamid, propanil, acetochlor, alachlor, dimethachlor, S-metolachlor, pretilachlor, benzofluor, cambendichlor, chloramben, dicamba, bispyribac, pyrithiobac, mesotrione, sulcotrione, tefuryltrione, tembotrione, benfuresate, asulam, barban, alloxydim, isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof. In one embodiment the second herbicide is selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, sulfentrazone, trifluralin, agriculturally acceptable salts thereof, esters thereof and mixtures of two or more thereof. In a preferred embodiment the second herbicide is selected from the group consisting of napropamide, aclonifen, pyroxasulfone, metazachlor, diflufenican, sulfentrazone, mesotrione, metsulfuron, thifensulfuron, agriculturally acceptable salts thereof, esters thereof and mixtures of two or more thereof.

One aspect of the invention is directed to a composition where the first herbicide is 2,4-DC. Another aspect of the invention is directed to a composition where the herbicide is 2,5-DC.

In one aspect of the invention the first herbicide of the composition is 2,4-DC and the second herbicide may be selected from the group consisting of dimethenamid-P, diphenamid, napropamide, napropamide-M, naptalam, pethoxamid, propanil, acetochlor, alachlor, dimethachlor, S-metolachlor, pretilachlor, benzofluor, cambendichlor, chloramben, dicamba, bispyribac, pyrithiobac, mesotrione, sulcotrione, tefuryltrione, tembotrione, benfuresate, asulam, barban, alloxydim, isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof. In one embodiment the second herbicide is selected from the group consisting of acetochlor, aclonifen, ametryn, amicarbazone, atrazine, bispyribac, bromoxynil, carfentrazone, carfentrazone ethyl, clomazone, cyhalofp, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, sulfentrazone, trifluralin, agriculturally acceptable salts thereof, esters thereof and mixtures of two or more thereof. In a preferred embodiment the second herbicide is selected from the group consisting of dimethenamid-P, napropamide, dimethachlor, S-metolachlor, aclonifen, pyroxasulfone, metazachlor, diflufenican, sulfentrazone, metobromuron, metsulfuron, thifensulfuron, agriculturally acceptable salts thereof, esters thereof and mixtures of two or more thereof.

In another aspect of the invention the first herbicide of the composition is 2,5-DC and the second herbicide may be selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, sulfentrazone, trifluralin, agriculturally acceptable salts thereof, esters thereof and mixtures of two or more thereof. In a preferred embodiment the second herbicide is selected from the group consisting of dimethenamid-P, napropamide, dimethachlor, S-metolachlor, aclonifen, pyroxasulfone, metazachlor, diflufenican, sulfentrazone, metobromuron, metsulfuron, thifensulfuron, agriculturally acceptable salts thereof, esters thereof and mixtures of two or more thereof.

Another aspect of the invention is directed to a method of controlling undesired vegetation in a crop comprising applying to the locus of such vegetation a herbicidally-effective amount of a composition comprising a first herbicide selected from the group consisting of 2,4-DC and 2,5-DC and a second herbicide, with the proviso that when the first herbicide is 2,4-DC or 2,5-DC, the second herbicide is not 2,5-DC or 2,4-DC respectively, wherein the crop may be selected from the group consisting of broadleaf crops and grass crops, and the undesired vegetation is selected from the group consisting of grass weeds and broadleaf weeds. In one embodiment the second herbicide is selected from the group consisting of dimethenamid-P, diphenamid, napropamide, napropamide-M, naptalam, pethoxamid, propanil, acetochlor, alachlor, dimethachlor, S-metolachlor, pretilachlor, benzofluor, cambendichlor, chloramben, dicamba, bispyribac, pyrithiobac, mesotrione, sulcotrione, tefuryltrione, tembotrione, benfuresate, asulam, barban, alloxydim, isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof. In another embodiment the second herbicide is selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, sulfentrazone, trifluralin, agriculturally acceptable salts thereof, esters thereof and mixtures of two or more thereof. In a preferred embodiment the second herbicide is selected from the group consisting of dimethenamid-P, napropamide, dimethachlor, S-metolachlor, aclonifen, pyroxasulfone, metazachlor, diflufenican, sulfentrazone, metobromuron, metsulfuron, thifensulfuron, agriculturally acceptable salts thereof, esters thereof and mixtures of two or more thereof. In one embodiment the crop is selected from the group consisting of wheat, potato, soybean, corn, rice, *sorghum*, oil seed rape, barley, rye, cow pea, oat and canola. In a preferred embodiment the crop is wheat.

In one aspect of the invention the first herbicide of the method is 2,4-DC. In another aspect of the invention the first herbicide is 2,5-DC.

In one embodiment of the method, the first herbicide is 2,4-DC and the second herbicide may be selected from the group consisting of dimethenamid-P, diphenamid, napropamide, napropamide-M, naptalam, pethoxamid, propanil, acetochlor, alachlor, dimethachlor, S-metolachlor, pretilachlor, benzofluor, cambendichlor, chloramben, dicamba, bispyribac, pyrithiobac, mesotrione, sulcotrione, tefuryltrione, tembotrione, benfuresate, asulam, barban, alloxydim, isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof. In one embodiment the second herbicide is selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuron-methyl, sulfentrazone, trifluralin, agriculturally acceptable salts thereof, esters thereof and mixtures of two or more thereof. In one embodiment the second herbicide may be selected from the group consisting of dimethenamid-P, napropamide, dimethachlor, S-metolachlor, aclonifen, pyroxasulfone, metazachlor, diflufenican, sulfentrazone, metobromuron, metsulfuron, thifensulfuron, agriculturally acceptable salts thereof, esters thereof and mixtures of two or more thereof.

In another embodiment of the method, the first herbicide is 2,5-DC, and the second herbicide may be selected from the group consisting of dimethenamid-P, diphenamid, napropamide, napropamide-M, naptalam, pethoxamid, propanil, acetochlor, alachlor, dimethachlor, S-metolachlor, pretilachlor, benzofluor, cambendichlor, chloramben, dicamba, bispyribac, pyrithiobac, mesotrione, sulcotrione, tefuryltrione, tembotrione, benfuresate, asulam, barban, alloxydim, isoxaflutole, dinitramine, dipropalin, ethalfluralin, pendimethalin, trifluralin, acifluorfen, aclonifen, etnipromid, fluoronitrofen, fomesafen, imazamethabenz, bromobonil, bromoxynil, methiozolin, monisouron, pyroxasulfone, topramezone, bromofenoxim, clomeprop, 2,4-DEB, etnipromid, clacyfos, 4-CPA, 2,4-D, 2,4-DB, 3,4-DB, cloprop, 4-CPP, dichlorprop, chlorazifop, clodinafop, clofop, cyhalofop, kuicaoxi, metamifop, propaquizafop, quizalofop, difenzoquat, halosulfuron, metazachlor, fluazolate, brompyrazon, clopyralid, diflufenican, atrazine, chlorazine, cyanazine, cyprazine, trietazine, indaziflam, ametryn, methoprotryne, simetryn, terbutryn, ethiozin, hexazinone, metribuzin, amicarbazone, bencarbazone, carfentrazone, carfentrazone ethyl, sulfentrazone, thiencarbazone, cloransulam, isoproturon, linuron, methiuron, metobromuron, metoxuron, tetrafluron, thidiazuron, amidosulfuron, cyclosulfamuron, ethoxysulfuron, flucetosulfuron, metsulfuron, prosulfuron, thifensulfuron, tebuthiuron, acrolein, flurtamone, fluthiacet-methyl, funaihecaoling, agriculturally acceptable salts thereof, esters thereof and mixtures of two or more thereof. In one embodiment the second herbicide may be selected from the group consisting of acetochlor, aclonifen, ametryn, amicarbazone, atrazine, bispyribac, bromoxynil, carfentrazone, carfentrazone ethyl, clomazone, cyhalofop, 2,4-D, 2,4-DB, 2,4-DEB, dicamba, diflufenican, dimethachlor, dimethenamid-P, ethalfluralin, ethoxysulfuron, flucetosulfuron, fluthiacet-methyl, fomesafen, hexazinone, isoxaflutole, linuron, mesotrione, metamifop, metazachlor, metobromuron, S-metolachlor, metribuzin, metsulfuron, metsufluron-methyl, napropamide, pendimethalin, pethoxamid, pretilachlor, propanil, pyroxasulfone, quizalofop, tebuthiuron, thifensulfuron, thifensulfuronmethyl, sulfentrazone, trifluralin, agriculturally acceptable salts thereof, esters thereof and mixtures of two or more thereof. In a preferred embodiment the second herbicide may be selected from the group consisting of dimethenamid-P, napropamide, dimethachlor, S-metolachlor, aclonifen, pyroxasulfone, metazachlor, diflufenican, sulfentrazone, metobromuron, metsulfuron, thifensulfuron, agriculturally acceptable salts thereof, esters thereof and mixtures of two or more thereof. In one embodiment of the method the crop is wheat or corn. In a preferred embodiment the crop is wheat.

Yet another aspect of the invention is directed to a method of controlling undesired vegetation in a crop comprising applying to the locus of such vegetation a herbicidally-effective amount of a composition comprising a first herbicide selected from the group consisting of 2,4-DC and 2,5-DC, wherein the crop may be selected from the group consisting of bananas, beans, beets, cassava, cereals, citrus, cocoas, coconuts, coffee, corn, fiber crops, flowers, forestry, forage crops, grapes, groundnuts, hops, horticultures, non-land crops, oil palm, oilseed rape, peas, peanuts, pomes, potato, rice, spices, stonefruit, sugarcane, sunflower, tea, tobacco, tree nuts, turf, vegetable crops, vines, wheat, and the undesired vegetation may be selected from the group consisting of annual bluegrass, Benghal dayflower, blackgrass, black nightshade, broadleaf signalgrass, Canada thistle, cheat, common cocklebur (*Xanthium pensylvanicum*), common ragweed, corn poppies, field violet, giant foxtail, goosegrass, green foxtail, guinea grass, hairy beggarticks, herbicide-resistant blackgrass, horseweed, Italian ryegrass, jimsonweed, johnsongrass (*Sorghum halepense*), large crabgrass, littleseed canarygrass, morningglory spp., Pennsylvania smartweed, pitted morningglory, prickly *sida*, quackgrass, redroot pigweed, shattercane, shepherd's-purse, silky windgrass, sunflower (as weed in potato), wild buckwheat (*Polygonum convolvulus*), wild mustard (, *Sinapis arvensis*), wild oat (*Avena fatua*), wild pointsettia, yellow foxtail, yellow nutsedge (*Cyperus esculentus*). In one embodiment the crop is selected from the group consisting of beets, cereals, corn, groundnuts, peanuts, oil palm, oilseed rape, peas, potato, rice, sugarcane, sunflower, tobacco, vegetable crops, and wheat. In a preferred embodiment the crop is wheat.

In yet another preferred embodiment, new methods of use of 2,4 DC or 2,5 DC alone are described on such crops as bananas, beans, beets, Cassava, cereals, citrus, cocoas, coconuts, coffee, fiber crops, flowers, forestry, forge corps, grapes, groundnuts, hops, horticultures, non-land crops, oil palm, oilseed rape, peas, pomes, potato, spices, stonefruit, sugar cane, Sunflower, tea, tobacco, tree nuts, turf, vegetable crops, vines, wheat. In yet another embodiment, the preferred crops are beets, cereals, corn, groundnuts, peanuts, oil palm, oilseed rape, peas, potato, rice, sugar cane, Sunflower, tobacco, vegetable crops, wheat.

In yet another preferred embodiment, method of controlling undesirable plants and weeds are described using either 2, 4 DC or 2,5 DC alone against annual blue grass, Benghal dayflower, black grass, black night shade, broadleaf signal grass, Canada thistle, cheat, common cocklebur (*Xanthium pensylvanicum*), common ragweed, corn poppies, field violet, giant foxtail, goose grass, green fox tail, guinea grass, hairy beggarticks, herbicide-resistant black grass, horseweed, Italian rye grass, jimsonweed, johnsongrass (*Sorghum halepense*), large crabgrass, little seed canary grass, morning glory, Pennsylvania smartweed, pitted morningglory, prickly *sida*, quack grass, redroot pigweed, shatter cane, sheppard's purse, silky windgrass, sunflower (as weed in potato), wild buckwheat (*Polygonum convolvulus*), wild mustard (*Brassica kaber*), wild oat (*Avena fatua*), wild pointsettia, yellow foxtail, yellow nutsedge (*Cyperus esculentus*).

The following examples serve only to illustrate the invention and should not be interpreted as limiting the scope of the invention in any way, since further modifications encompassed by the disclosed invention will be apparent to those skilled in the art. All such modifications are deemed to be within the scope of the invention as defined in the present specification and claims.

EXAMPLES

Example 1: Suspension Concentrate (SC) Formulations of 2-(2,4-dichlorophenyl)methyl-4,4-dimethyl-3-isoxazolidinone (2,4-DC)

Formulation 1A: An SC formulation of 2,4-DC was prepared by combining 37.89% 2,4-DC, 1.50% TERGITOL™ XD (Dow Chemical Company), 1.50% DEXTROL™ OC-180 (Ashland Specialty Company), 1.00% of INDULIN® C, 0.10% of XIAMETER® AFE 100, 6.0% of propyleneglycol, 0.15% of KELZAN® M xanthan gum (CPKelco A Huber Company), 0.15% of PROXEL® GXL, and 42.00% water (% by weight).

In at least one embodiment, the present formulations are prepared using the following microencapsulation procedures as follows: employing the slurry and letdown vessels, attritor, melt TERGITOL® XD in a 55° C. oven prior to use.

Preparing KELZAN/Glycol Slurry:

To a separate vessel weigh the propylene glycol. While mixing vigorously, slowly add the KELZAN M. Mix until uniform.

Preparing pre-mill Slurry:

Charge the water to the mixing vessel and Add the XIAMETER® AFE-100, TERGITOL® XD, DEXTROL® OC-180, and PROXEL® GXL to the tank and mix until uniform. Then add the 2,4-DC technical in portions, allowing each portion to mix in prior to adding more. Measure the starting viscosity.

Milling steps:

Charge a portion of the slurry to the attritor and mill. Measure the particle size every 20 minutes and continue milling until the D90 is <10 microns. Discharge the milled portion into a tared letdown tank and charge remaining portions of pre-mill slurry. Mill remaining portions as before and collect. Once the milling is complete, charge 500 grams of the holdback water to the attritor, rinse, and combine with mill base. Record weight and viscosity of mill base. Based on the weight recovered, determine the amount of INDULIN® C to add using the following calculation: Grams of INDULIN® C to add=(weight of recovered mill base, in grams/9149.6)×104. Then add the INDULIN® C and allow it to mix in thoroughly. Finally, add half the KELZAN®/glycol slurry to the batch, mix for a minimum of 4 hours, and submit for in-process assay. Continue stirring the batch overnight. Measurements of viscosity should be done after stirring. Based on the in-process assay and viscosity, add additional KELZAN®/glycol and/or water as needed and stir.

| | | Wet Screens: | | | | |
|---|---|---|---|---|---|---|
| Assay | Particle Size | | +100 | +200 | | |
| 2,4-DC | D90 | D50 | mesh | mesh | Viscosity | Density |
| 36.5% | 11.52 | 5.21 | 0 | 0.0018 | 1200 | 1.1232 |

Formulation 1B: SC formulation of 2,4-DC was prepared by combining 44.1% 2,4-DC (42.0% active AI), 1.5% TERGITOL™ XD (Dow Chemical Company), 1.17% DEXTROL™ OC-180 (Ashland Specialty Company), 6.0% propyleneglycol, 0.13% of a 2% aqueous solution of KELZAN® M xanthan gum (CPKelco A Huber Company) and 46.77% water (% by weight) and milling the mixture until a particle size of D90 is less than about 50 microns.

Formulation 1C: SC formulation of 2,4-DC was prepared by combining 44.0% 2,4-DC, 1.5% TERGITOL™ XD (Dow Chemical Company), ETHOX ERS 01293 (Ethox Chemicals), 6.0% propyleneglycol, 0.13% of a 2% aqueous solution of KELZAN® M xanthan gum (CPKelco A Huber Company), 0.15% DOW AF antifoam (Dow Chemical Company) and 46.7% water (all % by weight) and milling the mixture until a particle size of D90 is less than about 50 microns.

Formulation 1D: SC formulation of 2,4-DC was prepared by combining 38% 2,4-DC (36% active AI), 1.17% TERGITOL™ XD (Dow Chemical Company), 1.17% DEXTROL™ OC-180 (Ashland Specialty Company), 0.078 XIAMETER® AFE 100 AF Emulsion (Dow Chemical Company), 0.12 PROXEL™ GXL Antimicrobial (Arch chemicals Inc.) 4.68% propyleneglycol, 3.0% ATTAFLOW® AF (BASF), 1.0% INDULIN® C (MeadWestvaco) 0.12% of a 2% aqueous solution of KELZAN® M xanthan gum (CPKelco A Huber Company) and 50.662% water (% by weight) and milling the mixture until a particle size of D90 is less than about 50 microns.

Formulation 1E: SC formulation of 2,4-DC was prepared by combining 37.5% 2,4-DC, 1.5% DEXTROL™, 1.5% TERGITOL™ XD, 1.0% INDULIN® C, 0.1% XIAMETER® AFE 100, 0.15% PROXEL® GXL, 0.2% KELZAN® M, 6.0% of propylene glycol, and 52.05% of water.

Formulation 1F: SC formulation of 2,4-DC:

| Raw Material | Wt % |
|---|---|
| 2,4-DC | 36.00 |
| DEXTROL ® OC-180 | 2.00 |
| INDULIN ® C | 2.00 |
| TERGITOL ® XD | 2.00 |
| Veegum | 0.50 |
| Propylene Glycol | 6.00 |
| KELZAN ® M | 0.30 |
| PROXEL ® GXL | 0.15 |
| Water | 51.05 |
| total | 100.00 |

Formulation 1G: SC formulation of 2,4 DC with sulfentrazone:

| Raw Material | Wt % |
|---|---|
| 2,4-DC Tech 95% | 24.00 |
| Sulfentrazone | 12.00 |
| DEXTROL ® OC-180 | 2.00 |
| TERGITOL ® XD | 2.00 |
| Veegum | 0.50 |
| Propylene Glycol | 6.00 |
| KELZAN ® M | 0.30 |
| PROXEL ® GXL | 0.15 |
| Water | 53.05 |
| total | 100.00 |

Formulation 1H: SC formulation of 2,4 DC with diflufenican:

| Raw Material | Wt % |
|---|---|
| 2,4-DC | 20.00 |
| Diflufenican tech | 16.00 |
| DEXTROL ® OC-180 | 2.00 |
| TERGITOL ® XH | 1.40 |
| TERGITOL ® XD | 2.00 |
| Veegum | 0.50 |
| Propylene Glycol | 6.00 |
| KELZAN ® M | 0.30 |
| PROXEL ® GXL | 0.15 |
| Water | 51.65 |
| total | 100.00 |

Formulation 11I: SC formulation of 2,4 DC with metolachlor:

| Raw Material | Wt % |
|---|---|
| 2,4-DC | 10.00 |
| metolachlor | 42.00 |
| AGNIQUE ® CSO-40 | 5.00 |
| CaDDBS | 5.00 |
| TERGITOL ® XD | 2.00 |
| Aromatic 150 | 36.00 |
| total | 100.00 |

Example 2: Pre-emergent Herbicidal Evaluation of 2-(2,4-dichlorophenyl)methyl-4,4-dimethyl-3-isoxazolidinone in Mixtures with Metazachlor Compositions of the present disclosure were tested for herbicidal efficacy in the following manner:

Test compositions containing 2,4 DC Example 1B and metazachlor (Butisan® S, 43.1% active ingredient, BASF) and mixtures of 2-(2,4-dichlorophenyl)methyl-4,4-dimethyl-3-isoxazolidinone and metazachlor, were diluted with water to provide the appropriate test rate concentrations.

The test crops were wheat and canola (*Brassica napus*), the test weeds were Italian ryegrass (IR) (*Lolium perenne. multiflorum*), annual bluegrass (AB) (*Poa annua*), common lambsquarters (CL) (*Chenopodium album*), littleseed canarygrass (LC) (*Phalaris minor*), common chickweed (CC) (*Stellaria media*), and corn poppy (CP) (*Papaver rhoeas*).

For pre-emergence testing, four disposable fiber flats (6" by 10") for each rate of application of each herbicide solution were filled with top soil, to which seeds of each species were planted in furrows made by a template pressed on the top of the soil. The furrows were covered with soil after planting the seed and were watered well before application of the test compounds.

Fiber flats designated for treatment were placed in a spray chamber having a static platform and a movable sprayer and height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre. The application rates are those shown in Table 1 below for the individual herbicidal solutions and the herbicide compositions of the present invention. The pre-emergence flats were immediately placed in the greenhouse and watered lightly after treatment. Thereafter they were regularly watered and fertilized for the duration of the test.

The control of weeds was evaluated in each experimental test at 21 days after treatment (DAT) for corn poppy and wheat and 28 DAT for all other species. The results, shown as an average of the replications were compared with results observed in untreated control flats in the same tests. The results are in Table 1 below. As shown the efficacy of the present combination is far superior as compared to the individual ingredients.

Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977. The rating system is as follows:

| Weed Control Rating System | | |
|---|---|---|
| Rating Percent Control | Description of Main Categories | Weed Description |
| 0 | No Effect | No weed control |
| 10 | | Very poor weed control |
| 20 | Slight Effect | Poor weed control |
| 30 | | Poor to deficient weed control |
| 40 | | Deficient weed control |
| 50 | Moderate Effect | Deficient to moderate weed control |
| 60 | | Moderate weed control |
| 70 | | Control somewhat less than satisfactory |
| 80 | Severe | Satisfactory to good weed control |
| 90 | | Very good to excellent weed control |
| 100 | Complete Effect | Complete weed destruction |

TABLE 1

Percent Crop Injury and Percent Control of Weeds Using Mixtures of 2,4-DC and Metazachlor at 21 and 28 Days After Treatment (DAT) (Three or Four replications)

| Treatment | Rate (gram ai/ha) | % Injury/% Control | | | | | | | |
|---|---|---|---|---|---|---|---|---|---|
| | | Canola | Wheat | CP | AB | IR | CL | LC | CC |
| Non-treated control | — | 0 | 0 | 0 | 0 | 0 | 0 | 0 | 0 |
| 2,4-DC + Metazachlor | 31.25 + 250 | 8 | 68 | 100 | 93 | 93 | 100 | 90 | 100 |
| 2,4-DC + Metazachlor | 31.25 + 500 | 14 | 92 | 100 | 100 | 99 | 100 | 98 | 100 |
| 2,4-DC + Metazachlor | 31.25 + 750 | 27 | 90 | 100 | 100 | 98 | 100 | 95 | 100 |

TABLE 1-continued

| | Rate (gram | % Injury/% Control | | | | | | |
|---|---|---|---|---|---|---|---|---|
| Treatment | ai/ha) | Canola | Wheat | CP | AB | IR | CL | LC | CC |
| 2,4-DC + Metazachlor | 62.5 + 250 | 15 | 75 | 100 | 100 | 100 | 99 | 93 | 100 |
| 2,4-DC + Metazachlor | 62.5 + 500 | 20 | 85 | 100 | 100 | 98 | 100 | 93 | 100 |
| 2,4-DC + Metazachlor | 62.5 + 750 | 35 | 93 | 100 | 100 | 99 | 100 | 99 | 100 |
| 2,4-DC + Metazachlor | 125 + 250 | 25 | 70 | 100 | 100 | 99 | 100 | 90 | 100 |
| 2,4-DC + Metazachlor | 125 + 500 | 35 | 93 | 100 | 100 | 100 | 100 | 98 | 100 |
| 2,4-DC + Metazachlor | 125 + 750 | 28 | 88 | 100 | 100 | 100 | 100 | 100 | 100 |
| 2,4-DC + Metazachlor | 250 + 250 | 40 | 82 | 100 | 100 | 100 | 100 | 87 | 100 |
| 2,4-DC + Metazachlor | 250 + 500 | 40 | 87 | 100 | 100 | 100 | 100 | 100 | 100 |
| 2,4-DC + Metazachlor | 250 + 750 | 40 | 100 | 100 | 100 | 100 | 100 | 100 | 100 |
| 2,4-DC + Metazachlor | 375 + 250 | 43 | 75 | 100 | 100 | 100 | 100 | 96 | 100 |
| 2,4-DC + Metazachlor | 375 + 500 | 47 | 88 | 100 | 100 | 100 | 100 | 99 | 100 |
| 2,4-DC + Metazachlor | 375 + 750 | 55 | 88 | 100 | 100 | 100 | 100 | 100 | 100 |
| 2,4-DC | 31.25 | 27 | 4 | 53 | 3 | 57 | 27 | 0 | 100 |
| 2,4-DC | 62.5 | 25 | 5 | 28 | 47 | 68 | 23 | 7 | 100 |
| 2,4-DC | 125 | 35 | 9 | 53 | 63 | 85 | 50 | 22 | 100 |
| 2,4-DC | 250 | 40 | 16 | 85 | 63 | 98 | 73 | 38 | 100 |
| 2,4-DC | 375 | 40 | 53 | 90 | 77 | 99 | 82 | 58 | 100 |
| Metazachlor | 250 | 23 | 72 | 100 | 100 | 96 | 100 | 99 | 100 |
| Metazachlor | 500 | 28 | 98 | 100 | 100 | 98 | 100 | 100 | 100 |
| Metazachlor | 750 | 35 | 96 | 100 | 100 | 99 | 100 | 100 | 100 |

Example 3: Pre-emergent Herbicidal Evaluation of 2-(2,4-dichlorophenyl)methyl-4,4-dimethyl-3-isoxazolidinone in Mixtures with Napropamide Compositions of the present disclosure were tested for herbicidal efficacy in the following manner:

Test compositions containing 2,4-DC Example 1C and napropamide (Devrinol® 50-DF, 50% active ingredient, United Phosphorus Inc.) and mixtures of 2-(2,4-dichlorophenyl)methyl-4,4-dimethyl-3-isoxazolidinone and napropamide, were diluted with water to provide the appropriate test rate concentrations.

The test crop was canola (*Brassica napus*) and wheat, the test weeds were Italian ryegrass (IR) (*Lolium perenne. multiflorum*), annual bluegrass (AB) (*Poa annua*), blackgrass (BG) (*Alopecurus myosuroides*), wild buckwheat (WB) (*Polygonum convolvulus*), common chickweed (CC) (*Stellaria media*), littleseed canarygrass (LC) (*Phalaris minor*) and wild oat (WO) (*Avena fatua*).

For pre-emergence testing, four disposable fiber flats (6" by 10") for each rate of application of each herbicide solution were filled with top soil, to which seeds of each species were planted in furrows made by a template pressed on the top of the soil. The furrows with seeds were covered with soil and were watered well before application of the test compounds. Fiber flats designated for treatment were placed in a spray chamber having a static platform and a movable sprayer and height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre.

The application rates are those shown in Table 2 below for the individual herbicidal solutions and the herbicide compositions of the present invention. The pre-emergence flats were immediately placed in the greenhouse and watered lightly after treatment. Thereafter they were watered and fertilized regularly for the duration of the test. The control of weeds was evaluated in each experimental test at 27 days after treatment (DAT) for all species. The results, shown as an average of the replications, were compared with results observed in non-treated control flats in the same tests.

The results are in Table 2 below. Accordingly, the compositions of the present invention provide far supeiro results as compared to the individual agents respectively. Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977.

TABLE 2

Percent Crop Injury and Control of Weeds Using Mixtures of 2,4-DC
and Napropamide 27 Days After Treatment (DAT) Four replications)

| Treatment | Rate (gram ai/ha) | % inury Control | | | | | | | |
|---|---|---|---|---|---|---|---|---|---|
| | | Canola | LC | BG | WB | WO | AB | CC | IR |
| 2,4-DC + napropamide | 31.2 + 315 | 12 | 84 | 18 | 22 | 10 | 0 | 93 | 23 |
| 2,4-DC + napropamide | 31.2 + 630 | 10 | 93 | 62 | 30 | 18 | 85 | 95 | 57 |
| 2,4-DC + napropamide | 31.2 + 1260 | 10 | 96 | 67 | 27 | 37 | 94 | 95 | 53 |
| 2,4-DC + napropamide | 62.5 + 315 | 13 | 78 | 70 | 37 | 33 | 82 | 97 | 60 |
| 2,4-DC + napropamide | 62.5 + 630 | 12 | 96 | 72 | 42 | 37 | 82 | 99 | 79 |
| 2,4-DC + napropamide | 62.5 + 1260 | 10 | 100 | 83 | 43 | 65 | 83 | 98 | 86 |
| 2,4-DC + napropamide | 125 + 315 | 18 | 77 | 89 | 73 | 33 | 83 | 99 | 89 |
| 2,4-DC + napropamide | 125 + 630 | 25 | 98 | 91 | 80 | 83 | 89 | 99 | 88 |
| 2,4-DC + napropamide | 125 + 1260 | 23 | 98 | 85 | 73 | 76 | 100 | 99 | 93 |
| 2,4-DC + napropamide | 250 + 315 | 33 | 88 | 93 | 75 | 57 | 87 | 99 | 97 |
| 2,4-DC + napropamide | 250 + 630 | 37 | 95 | 96 | 86 | 73 | 90 | 99 | 99 |
| 2,4-DC + napropamide | 250 + 1260 | 37 | 100 | 95 | 80 | 84 | 100 | 100 | 98 |
| 2,4-DC + napropamide | 375 + 315 | 43 | 87 | 97 | 57 | 70 | 86 | 100 | 99 |
| 2,4-DC + napropamide | 375 + 630 | 50 | 90 | 97 | 82 | 82 | 95 | 100 | 100 |
| 2,4-DC + napropamide | 375 + 1260 | 53 | 99 | 97 | 78 | 85 | 99 | 99 | 100 |
| 2,4-DC | 31.2 | 7 | 8 | 10 | 10 | 7 | 0 | 94 | 23 |
| 2,4-DC | 62.5 | 10 | 12 | 18 | 8 | 13 | 2 | 99 | 60 |
| 2,4-DC | 125 | 27 | 18 | 84 | 8 | 53 | 12 | 100 | 83 |
| 2,4-DC | 250 | 32 | 27 | 93 | 23 | 65 | 40 | 100 | 97 |
| 2,4-DC | 375 | 50 | 53 | 97 | 37 | 78 | 63 | 100 | 98 |
| napropamide | 315 | 7 | 50 | 5 | 23 | 7 | 1 | 80 | 15 |
| napropamide | 630 | 10 | 87 | 7 | 23 | 8 | 77 | 81 | 20 |
| napropamide | 1260 | 8 | 100 | 15 | 38 | 81 | 92 | 83 | 90 |

Compositions of the present disclosure were tested for herbicidal efficacy in the following manner:

Test compositions containing 2,4-DC Example 1B and sulfentrazone (Spartan® 4F, 39.6% active ingredient, FMC Corp.) and mixtures of 2-(2,4-dichlorophenyl)methyl-4,4-dimethyl-3-isoxazolidinone and sulfentrazone, were diluted with water to provide the appropriate test rate concentration.

The test weeds were Pennsylvania smartweed (PS) (*Polygonum pennsylvanicum*), Palmer *amaranth* (PA) (*Amaranthus palmeri*), velvetleaf (VL) (*Abutilon theophrasti*), green foxtail (GF) (*Setaria viridis*), morningglory (MG) (*Ipomoea* spp.), yellow nutsedge (YN) (*Cyperus esculentus*), purple nutsedge (PN) (*Cyperus rotundus*), and benghal dayflower (BD) (*Commelina benghalensis*). Crops included in the evaluation were corn, wheat, and cowpea.

For pre-emergence testing, four disposable fiber flats (6" by 10") for each rate of application of each herbicide solution were filled with top soil, to which seeds of each species were planted in furrows made by a template pressed on the top of the soil. The furrows with crop/weed seeds were covered with soil and were watered well before application of the test compounds. Flats designated for treatment were placed in a spray chamber having a static platform and a movable sprayer and height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre.

The application rates are those shown in Table 3, 3A, and 3B below for the individual herbicidal solutions and the herbicide compositions of the present invention. The pre-emergence flats were immediately placed in the greenhouse and watered lightly after treatment for herbicide activation. Thereafter they were regularly watered and feterilized for the duration of the test. The control of weeds was evaluated in each experimental test at 28 days after treatment (DAT), 14 DAT for crops. The results, shown as an average of the replications, were compared with results observed in untreated control flats in the same tests. The results are in Table 3, 3A and 3B below. Percent weed control was determined by a method similar to the 0 to 100 rating system disclosed in "Research Methods in Weed Science," 2nd ed., B. Truelove, Ed.; Southern Weed Science Society; Auburn University, Auburn, Ala., 1977.

TABLE 3

Percent Control of Weeds Using Mixtures of 2,4-DC and
Sulfentrazone 28 Days After Treatment (DAT) (Four replications)

| Treatment | Rate (gram ai/ha) | % Injury Control | | | | |
|---|---|---|---|---|---|---|
| | | PS | PA | VL | GF | MG |
| 2,4-DC + sulfentrazone | 31.2 + 105 | 100 | 100 | 73 | 80 | 100 |
| 2,4-DC + sulfentrazone | 31.2 + 210 | 100 | 100 | 100 | 99 | 100 |
| 2,4-DC + sulfentrazone | 31.2 + 315 | 100 | 100 | 100 | 93 | 100 |
| 2,4-DC + sulfentrazone | 62.5 + 105 | 100 | 100 | 100 | 91 | 100 |
| 2,4-DC + sulfentrazone | 62.5 + 210 | 100 | 100 | 100 | 99 | 100 |
| 2,4-DC + sulfentrazone | 62.5 + 315 | 100 | 100 | 100 | 99 | 100 |
| 2,4-DC + sulfentrazone | 125 + 105 | 100 | 100 | 90 | 85 | 95 |
| 2,4-DC + sulfentrazone | 125 + 210 | 100 | 100 | 100 | 100 | 100 |
| 2,4-DC + sulfentrazone | 125 + 315 | 100 | 100 | 100 | 100 | 100 |
| 2,4-DC + sulfentrazone | 250 + 105 | 100 | 100 | 100 | 100 | 100 |
| 2,4-DC + sulfentrazone | 250 + 210 | 100 | 100 | 90 | 100 | 100 |
| 2,4-DC + sulfentrazone | 250 + 315 | 100 | 100 | 100 | 100 | 100 |
| 2,4-DC + sulfentrazone | 375 + 105 | 100 | 100 | 100 | 100 | 100 |
| 2,4-DC + sulfentrazone | 375 + 210 | 100 | 100 | 100 | 100 | 100 |
| 2,4-DC + sulfentrazone | 375 + 315 | 100 | 100 | 100 | 100 | 100 |
| 2,4-DC | 31.2 | 17 | 0 | 22 | 12 | 0 |
| 2,4-DC | 62.5 | 83 | 0 | 3 | 85 | 0 |
| 2,4-DC | 125 | 97 | 13 | 40 | 99 | 18 |
| 2,4-DC | 250 | 100 | 448 | 58 | 99 | 32 |
| 2,4-DC | 375 | 100 | 67 | 58 | 100 | 37 |
| sulfentrazone | 105 | 100 | 100 | 100 | 84 | 100 |
| sulfentrazone | 210 | 100 | 100 | 100 | 100 | 100 |
| sulfentrazone | 315 | 100 | 100 | 100 | 100 | 100 |

TABLE 3A

Percent Control of Weeds Using Mixtures of 2,4-DC and
Sulfentrazone 28 Days After Treatment (DAT) (Four replications)

| Treatment | Rate (gram ai/ha) | % Control | | |
|---|---|---|---|---|
| | | YN | PN | BD |
| Non-treted Control | — | 0 | 0 | 0 |
| 2,4-DC + sulfentrazone | 50 + 105 | 88 | 70 | 69 |
| 2,4-DC + sulfentrazone | 50 + 210 | 97 | 77 | 82 |
| 2,4-DC + sulfentrazone | 50 + 315 | 100 | 87 | 95 |
| 2,4-DC + sulfentrazone | 100 + 105 | 70 | 65 | 60 |
| 2,4-DC + sulfentrazone | 100 + 210 | 93 | 84 | 90 |
| 2,4-DC + sulfentrazone | 100 + 315 | 95 | 85 | 97 |
| 2,4-DC + sulfentrazone | 200 + 105 | 78 | 60 | 72 |
| 2,4-DC + sulfentrazone | 200 + 210 | 94 | 73 | 93 |
| 2,4-DC + sulfentrazone | 200 + 315 | 95 | 90 | 100 |
| 2,4-DC | 50 | 10 | 7 | 8 |
| 2,4-DC | 100 | 12 | 7 | 50 |
| 2,4-DC | 200 | 13 | 20 | 82 |
| sulfentrazone | 105 | 85 | 77 | 72 |
| sulfentrazone | 210 | 95 | 77 | 88 |
| sulfentrazone | 315 | 100 | 83 | 90 |

TABLE 3B

Percent Crop Injury Using Mixtures of 2,4-DC and Sulfentrazone
14 Days After Treatment (DAT) (Four replications)

| Treatment | Rate (gram ai/ha) | % Control (Injury) | | | |
|---|---|---|---|---|---|
| | | Bush Bean | Corn | Wheat | Cowpea |
| 2,4-DC + sulfentrazone | 31.2 + 105 | 33 | 0 | 0 | 0 |
| 2,4-DC + sulfentrazone | 31.2 + 210 | 50 | 0 | 7 | 1 |
| 2,4-DC + sulfentrazone | 31.2 + 315 | 50 | 2 | 4 | 4 |
| 2,4-DC + sulfentrazone | 62.5 + 105 | 33 | 1 | 4 | 4 |
| 2,4-DC + sulfentrazone | 62.5 + 210 | 68 | 5 | 15 | 6 |
| 2,4-DC + sulfentrazone | 62.5 + 315 | 78 | 5 | 10 | 20 |
| 2,4-DC + sulfentrazone | 125 + 105 | 20 | 2 | 6 | 4 |
| 2,4-DC + sulfentrazone | 125 + 210 | 53 | 2 | 17 | 10 |
| 2,4-DC + sulfentrazone | 125 + 315 | 70 | 8 | 17 | 22 |
| 2,4-DC + sulfentrazone | 250 + 105 | 40 | 4 | 11 | 10 |
| 2,4-DC + sulfentrazone | 250 + 210 | 65 | 12 | 12 | 13 |
| 2,4-DC + sulfentrazone | 250 + 315 | 77 | 9 | 20 | 13 |
| 2,4-DC + sulfentrazone | 375 + 105 | 37 | 11 | 12 | 7 |
| 2,4-DC + sulfentrazone | 375 + 210 | 65 | 15 | 15 | 15 |
| 2,4-DC + sulfentrazone | 375 + 315 | 72 | 17 | 28 | 37 |
| 2,4-DC | 31.2 | 3 | 0 | 0 | 0 |
| 2,4-DC | 62.5 | 6 | 1 | 6 | 2 |
| 2,4-DC | 125 | 8 | 2 | 8 | 5 |
| 2,4-DC | 250 | 5 | 3 | 6 | 3 |
| 2,4-DC | 375 | 3 | 4 | 9 | 6 |
| sulfentrazone | 105 | 10 | 1 | 4 | 5 |
| sulfentrazone | 210 | 56 | 50 | 10 | 10 |
| sulfentrazone | 315 | 75 | 75 | 13 | 20 |

Example 5: Pre-Emergent Herbicidal Evaluation of
2-(2,4-dichlorophenyl)methyl-4,4-dimethyl-3-isoxa-
zolidinone in Mixtures with Mesotrione Compositions of the present disclosure were tested for herbicidal efficacy in the following manner:

Test compositions containing 2,4-DC Example 1C and mesotrione (Callisto® Herbicide, 40% active ingredient, Syngenta) and mixtures of 2-(2,4-dichlorophenyl)methyl-4, 4-dimethyl-3-isoxazolidinone and mesotrione, were diluted with water to provide the appropriate test rate concentration.

The test weeds were barnyardgrass (BG) (*Echinochloa crus-galli*), jimsonweed (PA) (*Datura stramonium*), velvetleaf (VL) (*Abutilon theophrasti*), common cockelbur (CC) (*Xanthium strumarium*) and hairy beggarticks (HB) (*Bidens pilosa*). Crops included in the evaluation were field corn and *sorghum*.

For pre-emergence testing, four disposable fiber flats (6" by 10") for each rate of application of each herbicide solution were filled with top soil, to which seeds of each species were planted in furrows made by a template pressed on the top of the soil. The furrows with seeds were covered with soil and were watered well before application of the test compounds. Flats designated for treatment were placed in a spray chamber having a static platform and a movable sprayer and height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre.

The application rates are those shown in Table 4 below for the individual herbicidal solutions and the herbicide compositions of the present invention. The pre-emergence flats were immediately placed in the greenhouse and watered lightly after treatment. Thereafter they were regularly watered and fertilized for the duration of the test. The control of weeds and injury to crops was evaluated in each experimental test at 28 days after treatment (DAT). The results, shown as an average of the replications, were compared with results observed in untreated control flats in the same tests and indicated far superior efficacy as compared to its single ingredient counterparts. The results are in Table 4 below. Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977.

TABLE 4

Percent Control of Weeds Using Mixtures of 2,4-DC and mesotrione 28 Days After Treatment (DAT) (Four replications)

| Treatment | Rate (gram ai/ha) | Field corn | % Control (injury) | | | | |
|---|---|---|---|---|---|---|---|
| | | | Sorghum | BG | VL | JW | CC |
| Non-treated control | — | 0 | 0 | 0 | 0 | 0 | 0 |
| 2,4-DC + mesotrione | 50 + 25 | 3 | 1 | 98 | 87 | 73 | 80 |
| 2,4-DC + mesotrione | 50 + 50 | 1 | 4 | 97 | 82 | 87 | 55 |
| 2,4-DC + mesotrione | 50 + 100 | 7 | 10 | 99 | 100 | 98 | 98 |
| 2,4-DC + mesotrione | 100 + 25 | 4 | 9 | 100 | 77 | 77 | 50 |
| 2,4-DC + mesotrione | 100 + 50 | 3 | 5 | 100 | 99 | 100 | 31 |
| 2,4-DC + mesotrione | 100 + 100 | 6 | 18 | 99 | 100 | 98 | 66 |
| 2,4-DC + mesotrione | 200 + 25 | 12 | 21 | 100 | 78 | 87 | 63 |
| 2,4-DC + mesotrione | 200 + 50 | 11 | 26 | 100 | 98 | 98 | 100 |
| 2,4-DC + mesotrione | 200 + 100 | 9 | 32 | 100 | 100 | 98 | 100 |
| 2,4-DC | 50 | 0 | 3 | 97 | 25 | 33 | 28 |
| 2,4-DC | 100 | 3 | 15 | 99 | 13 | 35 | 28 |
| 2,4-DC | 200 | 17 | 22 | 99 | 38 | 68 | 63 |
| mesotrione | 25 | 0 | 0 | 48 | 73 | 68 | 60 |
| mesotrione | 50 | 0 | 0 | 61 | 87 | 90 | 0 |
| mesotrione | 100 | 4 | 12 | 73 | 100 | 93 | 90 |

Example 6: Emulsifiable Concentrate (EC) Formulation of 2-(2,5-dichlorophenyl)methyl-4,4-dimethyl-3-isoxazolidinone (2,5-DC)

An EC formulation of 2,5-DC was prepared by combining 46.5% 2,5-DC, 0.71% of a blend of 80% calcium dodecyl benzene sulfonate and 20% 6 mole ethylene oxide adduct of nonyl phenol, 5.47% of a blend of 60% calcium dodecyl benzene sulfonate and 40% of the 30 mole ethylene oxide adduct of nonyl phenol, 1.56 TERGITOL™ XD (Dow Chemical Company), and 45.689% Aormatic 100 fluid (ExxonMobile Chemical). The mixture was subjected to shear blending for about 1 minute then stirred until a homogenous mixture was obtained.

Example 7: Pre-emergent Herbicidal Evaluation of 2-(2,5-dichlorophenyl)methyl-4,4-dimethyl-3-isoxazolidinone Test compositions containing 2,5-DC Example 6 were diluted with water to provide the appropriate test rate concentration.

The test weeds were green foxtail (GF) (Setaria viridis), blackgrass (BG) (Alopecurus myosuroides), and common chickweed (CC) (Stellaria media). Crops included in the evaluation were field corn and sorghum.

For pre-emergence testing, four disposable fiber flats (6" by 10") for each rate of application of each herbicide solution were filled with top soil, to which seeds of each species were planted in furrows made by a template pressed on the top of the soil. The furrows were covered with soil and were watered well before application of the test compounds. Flats designated for treatment were placed in a spray chamber having a static platform and a movable sprayer and height of the spray nozzle was 10.5 inches above the soil level. Once the sprayer was calibrated using water for spray volume of 30 gallons per acre, flats were sprayed with sprayer at a speed to receive a coverage equivalent of 30 gallons per acre.

The application rates are those shown in Table 5 below for the individual herbicidal solutions and the herbicide compositions of the present invention. The pre-emergence flats were immediately placed in the greenhouse and watered lightly after treatment. Thereafter flats were regularly watered and fertilized for the duration of the test. The control of weeds and injury to crops was evaluated in each experimental test at 28 days after treatment (DAT), crops were evaluated 14 DAT.

TABLE 5

Percent Control of Weeds and Injury to Crops Using 2,5-DC EC Formulation

| TREATMENT | RATE (GRAM AI/HA) | % CONTROL (INJURY) | | | | |
|---|---|---|---|---|---|---|
| | | WHEAT | SORGHUM | GF | BG | CW |
| EXAMPLE 6 | 31 | 0 | 0 | 0 | 0 | 95 |
| EXAMPLE 6 | 63 | 6 | 0 | 13 | 3 | 99 |
| EXAMPLE 6 | 125 | 17 | 6 | 88 | 15 | 100 |
| EXAMPLE 6 | 250 | 50 | 21 | 96 | 17 | 100 |
| EXAMPLE 6 | 375 | 80 | 28 | 100 | 81 | 100 |

The results, shown as an average of the replications, were compared with results observed in untreated control flats in the same tests. The results are in Table 5 below. Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977.

Example 8: Emulsifiable Concentrate (EC) Formulation of 2-(2,4-dichlorophenyl)methyl-4,4-dimethyl-3-isoxazolidinone (2,4-DC)

Two different EC formulations were prepared for 2,4-DC using the procedure of Example 6, with the components and proportions found in the following Table 6 (with and without alkylphenol ethoxylate (APE)).

TABLE 6

| Component | 8A: APE*-free Formula, wt % | 8B: APE*-containing Formula, wt % |
|---|---|---|
| 2,4-DC technical | 20.74 | 20.74 |
| Aromatic 100 | 64.6 | 67.71 |
| RHODACAL ® 70/B | 6.69 | |
| ANTAROX ® B848 | 3.34 | |
| RHODASURF ® BC 840 | 4.63 | |
| NIAGARA ® 1 | | 1.15 |
| NIAGARA ® 2 | | 8.1 |
| TERGITOL ® XD | | 2.3 |

*APE = alkylphenol ethoxylate

Example 9A: A Capsule Suspension (CS)
Formulation of 2,4-DC was Prepared Using the
Following Microencapsulation Procedures as
Follows Organic phase: 36.29% of 2,4-DC and 6.48% of Aromatic 200ND.

Aqueous phase: 1.15% of REAX® 88B, 5.33% of sodium nitrate, 5.33% of anhydrous calcium chloride, 3.68% of 2% KELZAN®/2% PROXEL® mixture, 0.03% glacial acetic acid, 2.16% of hexamethylenediamine (HMDA), 2.16% of polymethylene polyphenylisocyanate (polymeric MDI; PAPI® 27) and 37.39% of water.

Feed rate: 420 grams/minute

Run time: 44.02 minutes

Organic feed rate 209.78 grams/minute

Aqueous feed rate: 189.03 grams/minute

PAPI® 27 feed rate: 10.59 grams/minute

HMDA feed rate: 10.59 grams/minute

Procedure:

First, heat the aqueous and organic feed vessels. Then heat organic flush unit to 80 C for circulated heating of static mixer, and flush solvent to 80 C. Initiate heating of microcap unit to a target temp of 85 C. Set cure reactor temperature to 55 C and prepare data logging.

Feed Solutions:

Add the organic solvent to the organic reactor preheated to 80-85° C. Charge the 2,4-DC technical and warm to 80-85° C. Hold at temp with stirring until the solution is clear and uniform. Complete preparation of the aqueous phase. Prepare feeds of 43% HMDA, PAPI, and 2% kelzan/ 2% Proxel solution.

Unit Setup and Running:

Next, circulate organic flush stream to heat static mixer and prep it. Setup PAPI and amine feed systems and start recirculation of both lines close to set rates. Once feed solutions and vessels are at set temp, first add the aqueous feed system to the reactor tank. Hold system until set temperature is reached Monitor system and data log for fluctuations feed rates and wait till system is stable. Once stable, transfer the organic phase to the organic feed tank. Hold before feeding forward. Keep the organic flush solvent circulating. Set up a separate waste container to collect 2,4-DC waste. Once ready, feed aqueous forward to the waste container. Slowly increasing the homogenizer speed to around 3000 rpm, feed the solvent flush forward within 30 seconds, and then switch to the actual organic feed right away (this keeps the organic return line primed with solvent). Immediately increase the homogenizer RPM to the set level. Feed both the amine and PAPI streams forward within 30 seconds. Manually control the feed rates to being them close to the target levels. Once close, set the feed rates to automatic and set the target feed rates. Confirm system is running at set feed rates. Once stable, feed forward into cure reactor.

Cure Reaction and Workup:

Hold reactor at 55° C. for 4 hours. Cool to room temperature. Add the calcium chloride and sodium nitrate salts. Allow each to dissolve before adding more. As necessary, adjust the as is pH using acetic acid to between 6.0 and 7.5. Add the required amount of 2% Kelzan/2% Proxel based on recovery and mix. Sample for assay and continue stirring to hydrate Kelzan Screen through 200 mesh sieve, pack out, and complete physicals.

| Wt % of | Particle Size | | Wet screens | | Density | | |
|---|---|---|---|---|---|---|---|
| 2,4-DC | D90 | D50 | +100 | +200 | (g/ml) | Viscosity | pH |
| 36.3% | 13.50 | 7.264 | 0.19% | 0.80% | 1.1665 | 1560 | 7.34 |

Example 9B: CS formulation of 2,4-DC

| Raw Material | Wt % |
|---|---|
| 2,4-DC | 36.00 |
| Aromatic 200ND | 6.00 |
| REAX ® 88B | 1.00 |
| Calcium Chloride | 5.00 |
| Sodium Nitrate | 5.00 |
| Acetic acid | 0.08 |
| RUBINATE ® M (polymeric MDI) | 1.97 |
| KELZAN ® S | 0.10 |
| hexamethylene diamine | 1.28 |
| PROXEL ® GXL | 0.15 |
| Water | 43.42 |
| total | 100.00 |

Examples 9C to 9E: CS Formulations of 2,4-DC

| | Example | | |
|---|---|---|---|
| | 9C | 9D | 9E |
| 2,4-DC | 25.5% | 25.5% | 25.5% |
| Aromatic 200ND | 17.7 | 17.7 | 17.7 |
| PAPI ® 2027 | 2.13 | 1.14 | 1.42 |
| HMDA 43% | 2.13 | 1.14 | 1.14 |
| Water | 42.01 | 43.00 | 43.43 |
| REAX ® 88B | 1.14 | 1.14 | 1.14 |
| MgCl$_2$ | 9.23 | 9.23 | 9.23 |
| KELZAN ® 2% | 0.06 | 0.06 | 0.06 |
| Acetic acid | 0.03 | 0.03 | 0.03 |

Examples 9F and 9G: CS Formulations of 2,4-DC

Both Examples 9F and 9G were prepared, in separate batches, from 255 gm of 2,4-DC, 45 gm of Aromatic 200ND, 31 gm of PAPI 27, 288 gm of water, 8 gm of REAX 88B, 31 gm of 43% HMDA and 37 gm of sodium nitrate.

Biological Testings

Consideration of "Weed Control"—For the purposes of the present invention, weed control at 85% or higher is acceptable and more importantly desirable. When weeds have 85% or higher injury, they cannot compete with crops for water, nutrients, and physical space, and probability of significant reduction in crop yield is reduced to a minimum. Generally weed control is assessed at 28 DAT. In view of these considerations, synergy was evaluated at 28 DAT while crop safety was assessed at 7 or 14 DAT. Synergy was calculated using the method of Colby. As used herein, the terms "synergy" and "synergistic", or the phrase "in a synergistic manner", refer to the in vivo interaction of two or more biologically active compounds, in the present case the 3-isoaxzolidinone compounds with a secondary active compound, so that their combined effect when administered together is greater than the sum of the effects observed when each is administered individually. That is, the herbicidal effect of administering the combination of for example 2,4-DC and the second agent as disclosed above and exemplified below. In this way the applied rate of the herbicidal combination can be lower than the registered use rates, thereby reducing the total chemical burden on the field to which such a combination is applied.

The method of Colby is for synergism is described in Colby, S. R., "Calculating Synergistic and Antagonistic Responses of Herbicide Combinations", Weeds 1967, 15, pg 20-22, which is incorporated herein by reference. According to this methodology, the presence of a synergistic effect between the two active ingredients is established with the aid of the Colby equation: $E=X+Y-(XY/100)$. Using the method of Colby, the presence of a synergistic interaction between two active ingredients is established by first calculating the expected activity, 'E', of the mixture based on activities of the two components applied alone. In the equation above, 'X' is the herbicidal activity in percentage control of the disclosed 3-isoxazolidinone applied as a mixture at rate 'x'. The 'Y' term is the herbicidal activity of the second active applied as a mixture at rate 'y'. The equation calculates 'E', the herbicidal activity of the mixture of 'X' at rate 'x' with 'Y' at rate 'y'. If 'E' is lower than the observed activity, synergy is present. If the herbicidal effect is strictly additive and no interaction has occurred, 'E' will be equal to or higher than the observed activity. The following Tables in examples below summarize the % control of tested weed and the expected value verses observed % control of mixtures of 3-isoxazolidinone compound tested and the other actives in all greenhouse trials. As intended herein, control of the weed species at 85% or higher, by the exemplified 3-isoxazolidinoine compounds in combination with a second active ingredient would show synergy according to Colby.

In at least one observation, those of ordinary skill in the art can appreciate that the inventive combinations described herein provide synergistic weed control (with the 85% cutoff) in at least 26 weed species. These species include annual bluegrass, Benghal dayflower, black nightshade, blackgrass, cheat, common chickweed, common cocklebur, common lambsquarters, common ragweed, hairy beggarticks, Italian ryegrass, ivyleaf morningglory, jimsonweed, johnsongrass, littleseed canarygrass, Pennsylvania smartweed, pitted morningglory, purple nutsedge, quackgrass, shepherd's purse, velvetleaf, wild buckwheat, wild mustard, wild oat, wild poinsettia, yellow nutsedge. While synergistic efficacy is at least one unexpected observation, those of ordinary skill in the art can appreciate the improved safety profile of the same lending the instantly disclosed combination highly desirable in various stages of crop development.

Consideration of "Crop Injury"—For the purposes of the present invention, the upper limit of acceptable crop injury (phytotoxicity) is 10% for most crops because injury higher than 10% may result in significant reduction in crop yield. Early crop safety is desirable (within 7 to 14 DAT) in order for the crop to be able to outcompete weeds for water, nutrients, and physical space. The following examples are submitted to further provide and highlight the findings of the biological tests in accordance to the present invention.

Example 10: Weed Control with 2,4-DC and Aclonifen Tank-Mix Combinations

In this example a greenhouse study was conducted to determine the weed efficacy of 2,4-DC, when 2,4-DC alone or in combination with aclonifen as preemergence (PRE) treatment against the following weeds: Blackgrass (*Alopecurus myosuroides*, ALMOY), redroot pigweed (*Amaranthus retroflexus*, AMARE), littleseed canarygrass (*Phalaris minor*, PHAMI), common lambsquarters (*Chenopodium album*, CHEAL), ivyleaf morningglory (*Ipomoea hederacea*, IPOHE), shepherd's-purse (*Capsella bursa-pastoris*, CAPBP), wild oat (*Avena fatua*, AVEFA), quackgrass (*Elymus repens*, AGRRE), annual bluegrass (*Poa annua*, POAAN), black nightshade (*Solanum nigrum*, SOLNI).

Methods:

2,4-DC (CS 36.7%) was applied at 0, 125, 170, 210, or 250 g ai/ha alone or as tank-mix with aclonifen (53% WP) and Aclonifen rates for alone or tank-mix application were 1500, 1800, or 2100 g ai/ha. Treatments 1-12 of 2,4-DC and aclonifen tank-mix combinations follow same rates listed above. A non-treated check was included as reference standard. All plant species were direct seeded into 6×10" fiber flats utilizing Pennington soil. Sulfentrazone (Spartan 4F® 39.6%) at 280 g ai/ha, pendimethalin (Prowl 3.3®EC, 37.4%) at 784 g ai/ha, or S-metolachlor (Dual II Magnum® 82.4%) at 1084 g ai/ha were applied as commercial standards. Treatments were replicated 3 times and flats were watered after planting but before the treatment and lightly watered after treatment application. Thereafter flats were watered and fertilized routinely. Treatments were applied with compressed air in a track spray chamber at 30 GPA using a TeeJet 8001E nozzle at 40 PSI. Visual percent weed control was recorded at 14, 21, and 28 days after treatment (DAT), using a scale of 0 (no control) to 100 (complete plant death). Shepherd's-purse was rated at 21 and 28 DAT only, due to delayed emergence. Data (not included) were analyzed using Minitab statistical software at 95% confidence interval.

Results at 28 DAT:

All twelve 2,4-DC and aclonifen tank-mix combinations gave ≥85% control of wild oat, common lambsquarters, quackgrass, black nightshade, redroot pigweed, littleseed canarygrass, annual bluegrass, blackgrass, and shepherd's-purse. No combination controlled ivyleaf morningglory. 2,4-DC alone at 250 g ai/ha controlled common lambsquarters and control of shepherd's-purse was seen at all rates except at 170 g. Aclonifen alone at all three rates controlled common lambsquarters, quackgrass, redroot pigweed, littleseed canarygrass, annual bluegrass, blackgrass, and shepherd's purse. Sulfentrazone at 280 g provided control of all weeds except quackgrass, annual bluegrass, and blackgrass. Pendimethalin at 784 g gave control of 5 out of 10 weeds. S-metolachlor at 1064 g controlled only two weeds. The tables below highlight analysis of data representing unexpected synergistic effects of the tested combinations.

| 2,4-DC + Aclonifen-(28 DAT)-PRE emergence against Wild oat-28 DAT | | | | | | | |
|---|---|---|---|---|---|---|---|
| Tmt | X | Y | Expected | observed | synergy$^\alpha$ | 2,4-DC$^\beta$ | Aclonifen$^\rho$ |
| 1 | 34 | 80 | 86.8 | 100 | Y | 125 | 1500 |
| 2 | 34 | 88 | 92.08 | 100 | Y | 125 | 1800 |
| 3 | 34 | 65 | 76.9 | 97 | Y | 125 | 2100 |
| 4 | 37 | 80 | 87.4 | 93 | Y | 170 | 1500 |
| 5 | 37 | 88 | 92.44 | 100 | Y | 170 | 1800 |
| 6 | 37 | 65 | 77.95 | 97 | Y | 170 | 2100 |
| 7 | 48 | 80 | 89.6 | 97 | Y | 210 | 1500 |
| 8 | 48 | 88 | 93.76 | 100 | Y | 210 | 1800 |
| 9 | 48 | 65 | 81.8 | 97 | Y | 210 | 2100 |
| 10 | 73 | 80 | 94.6 | 93 | N | 250 | 1500 |

-continued

| 2,4-DC + Aclonifen-(28 DAT)-PRE emergence against Wild oat-28 DAT | | | | | | | |
|---|---|---|---|---|---|---|---|
| Tmt | X | Y | Expected | observed | synergy$^\alpha$ | 2,4-DC$^\beta$ | Aclonifen$^\rho$ |
| 11 | 73 | 88 | 96.76 | 100 | Y | 250 | 1800 |
| 12 | 73 | 65 | 90.55 | 100 | Y | 250 | 2100 |

$^\alpha$measurement of synergistic behavior as Y = YES; N = NO
$^\beta$and $^\rho$Rate - g ai/ha

| 2,4-DC + Aclonifen-(28 DAT)-Black nightshade-28 DAT | | | | | | | |
|---|---|---|---|---|---|---|---|
| Tmt | X | Y | Expected | observed | synergy$^\alpha$ | 2,4-DC$^\beta$ | Aclonifen$^\rho$ |
| 1 | 33 | 80 | 86.6 | 100 | Y | 125 | 1500 |
| 2 | 33 | 83 | 88.61 | 88 | N | 125 | 1800 |
| 3 | 33 | 77 | 84.59 | 100 | Y | 125 | 2100 |
| 4 | 47 | 80 | 89.4 | 100 | Y | 170 | 1500 |
| 5 | 47 | 83 | 90.99 | 100 | Y | 170 | 1800 |
| 6 | 47 | 77 | 87.81 | 100 | Y | 170 | 2100 |
| 7 | 67 | 80 | 93.4 | 100 | Y | 210 | 1500 |
| 8 | 67 | 83 | 94.39 | 100 | Y | 210 | 1800 |
| 9 | 67 | 77 | 92.41 | 100 | Y | 210 | 2100 |
| 10 | 83 | 80 | 96.6 | 100 | Y | 250 | 1500 |
| 11 | 83 | 83 | 97.11 | 100 | Y | 250 | 1800 |
| 12 | 83 | 77 | 96.09 | 87 | N | 250 | 2100 |

$^\alpha$measurement of synergistic behavior as Y = YES; N = NO
$^\beta$and $^\rho$Rate - g ai/ha

Example 11: Preemergence (PRE) Efficacy and Oilseed Rape Selectivity with 2,4-DC and Clomazone Tank-Mix Combinations In this example a greenhouse study was conducted to determine the efficacy and oilseed rape injury when 2,4-DC and clomazone tank-mix combinations are applied at different rate as preemergence treatment against the following weeds: redroot pigweed (*Amaranthus retroflexus*, AMARE), tall morningglory (*Ipomoea purpurea*, PHBPU), wild mustard (*Sinapis arvensis*, SINAR), common lambsquarters (*Chenopodium album*, CHEAL), Italian ryegrass (*Lolium multiflorum*, LOLMU), common chickweed (*Stellaria media*, STEME), corn poppy (*Papaver rhoeas*, PAPRH), and wild buckwheat (*Polygonum convolvulus*, POLCO). The crop tested was Oilseed rape.

Materials and Methods

To determine PRE efficacy and oilseed rape injury, four rates of 2,4-DC (36.7% CS) and three rates clomazone (Command 3ME®, 31.4%) were applied either alone or as tank-mix. 2,4-DC was applied at 125, 170, 210, or 250 g ai/ha and clomazone was applied at 60, 90, or 120 g ai/ha in combination treatments 1-12. Additional treatments included applications of metazachlor (Butisan®, 43.1%) at 750 g ai/ha, napropamide (Devrinol DF®, 50%) at 1260 g, and dimethachlor (Teridox®, 48%) at 1000 g. A non-treated check was included as reference standard. Treatments were applied just after the planting of tall morningglory, wild mustard, common lambsquarters, Italian ryegrass, wild buckwheat, redroot pigweed, common chickweed, corn poppy, and oilseed rape.

Plant species were planted in fiber flats (6"×10") containing Pennington soil and flats were watered well before application and watered lightly after application. Flats were watered and fertilized routinely after treatment application. Each treatment was replicated three times. Treatments were applied using compressed air track spray chamber at 30 GPA using a TeeJet 8001E nozzle at 40 PSI. Visual percent weed control and oilseed rape injury were recorded at 14, 21, and 28 days after treatment using a scale of 0 (no control/no injury) to 100 (complete plant death).

Oilseed rape injury was rated for bleaching and stunting. Data (not included) were analyzed using Minitab statistical software at 95% confidence interval.

Results at 28 DAT:

Data collected at 28 DAT suggested that out of twelve 2,4-DC and clomazone combinations, no combination gave control of tall morningglory, wild mustard, redroot pigweed, and corn poppy. Eight combinations controlled common lambsquarters, seven combinations controlled wild buckwheat, and three combinations controlled Italian ryegrass. All twelve combinations controlled common chickweed. Six 2,4-DC and clomazone combinations caused greater than 10% injury (bleaching) to oilseed rape. 2,4-DC or clomazone alone at any rate did not able to control any species except common chickweed. Metazachlor controlled all weeds except tall morningglory and wild mustard. Napropamide controlled Italian ryegrass, wild buckwheat, redroot pigweed, common chickweed, and corn poppy. Dimethachlor controlled only two species, Italian ryegrass and corn poppy. All three herbicides, metazachlor, napropamide, or dimethachlor at the rates mentioned in the methodology were safe on oilseed rape.

In summary all 2,4 DC plus clomazone combinations controlled (≥85%) common chickweed while most of the combinations controlled common lambsquarters and wild buckwheat. Six combinations were safe (≤10% injury) on oilseed rape. The following tables highlight the unexpected results observed in connection to this study. The tables below highlight analysis of data representing unexpected synergistic effects of the tested combinations.

| 2,4-DC + Clomazone-(28 DAT)-PRE Common lambsquarters-28 DAT | | | | | | | |
|---|---|---|---|---|---|---|---|
| Tmt | X | Y | Ex-pected | observed | synergy$^\alpha$ | 2,4-DC$^\beta$ | Clomazone$^\rho$ |
| 1 | 30 | 77 | 83.9 | 82 | N | 125 | 60 |
| 2 | 30 | 80 | 86 | 82 | N | 125 | 90 |
| 3 | 30 | 80 | 86 | 83 | N | 125 | 120 |
| 4 | 33 | 77 | 84.59 | 83 | N | 170 | 60 |
| 5 | 33 | 80 | 86.6 | 87 | Y | 170 | 90 |
| 6 | 33 | 80 | 86.6 | 85 | N | 170 | 120 |
| 7 | 42 | 77 | 86.66 | 85 | N | 210 | 60 |
| 8 | 42 | 80 | 88.4 | 86 | N | 210 | 90 |
| 9 | 42 | 80 | 88.4 | 85 | N | 210 | 120 |
| 10 | 51 | 77 | 88.73 | 85 | N | 250 | 60 |
| 11 | 51 | 80 | 90.2 | 85 | N | 250 | 90 |
| 12 | 51 | 80 | 90.2 | 88 | N | 250 | 120 |

$^\alpha$measurement of synergistic behavior as Y = YES; N = NO
$^\beta$ and $^\rho$Rate - g ai/ha

| 2,4-DC + Clomazone-(28 DAT)-PRE Italian ryegrass-28 DAT | | | | | | | |
|---|---|---|---|---|---|---|---|
| Tmt | X | Y | Ex-pected | observed | synergy$^\alpha$ | 2,4-DC$^\beta$ | Clomazone$^\rho$ |
| 1 | 32 | 42 | 60.56 | 58 | N | 125 | 60 |
| 2 | 32 | 58 | 71.44 | 66 | N | 125 | 90 |
| 3 | 32 | 70 | 79.6 | 73 | N | 125 | 120 |
| 4 | 38 | 42 | 64.04 | 68 | Y | 170 | 60 |
| 5 | 38 | 58 | 73.96 | 67 | N | 170 | 90 |
| 6 | 38 | 70 | 81.4 | 76 | N | 170 | 120 |
| 7 | 58 | 42 | 75.64 | 78 | Y | 210 | 60 |
| 8 | 58 | 58 | 82.36 | 88 | Y | 210 | 90 |

-continued

| 2,4-DC + Clomazone-(28 DAT)-PRE Italian ryegrass-28 DAT | | | | | | | |
| Tmt | X | Y | Ex-pected | observed | synergy[α] | 2,4-DC[β] | Clomazone[ρ] |
| --- | --- | --- | --- | --- | --- | --- | --- |
| 9 | 58 | 70 | 87.4 | 75 | N | 210 | 120 |
| 10 | 68 | 42 | 81.44 | 88 | Y | 250 | 60 |
| 11 | 68 | 58 | 86.56 | 76 | N | 250 | 90 |
| 12 | 68 | 70 | 90.4 | 93 | Y | 250 | 120 |

[α]measurement of synergistic behavior as Y = YES; N = NO
[β]and [ρ]Rate - g ai/ha

| 2,4-DC + Clomazone-(28 DAT)-Wild buckwheat-28 DAT | | | | | | | |
| Tmt | X | Y | Ex-pected | observed | synergy[α] | 2,4-DC[β] | Clomazone[ρ] |
| --- | --- | --- | --- | --- | --- | --- | --- |
| 1 | 10 | 70 | 73 | 83 | Y | 125 | 60 |
| 2 | 10 | 80 | 82 | 87 | Y | 125 | 90 |
| 3 | 10 | 79 | 81.1 | 86 | Y | 125 | 120 |
| 4 | 30 | 70 | 79 | 90 | Y | 170 | 60 |
| 5 | 30 | 80 | 86 | 78 | N | 170 | 90 |
| 6 | 30 | 79 | 85.3 | 88 | Y | 170 | 120 |
| 7 | 22 | 70 | 76.6 | 88 | Y | 210 | 60 |
| 8 | 22 | 80 | 84.4 | 87 | Y | 210 | 90 |
| 9 | 22 | 79 | 83.62 | 82 | N | 210 | 120 |
| 10 | 27 | 70 | 78.1 | 72 | N | 250 | 60 |
| 11 | 27 | 80 | 85.4 | 90 | Y | 250 | 90 |
| 12 | 27 | 79 | 84.67 | 70 | N | 250 | 120 |

[α]measurement of synergistic behavior as Y = YES; N = NO
[β]and [ρ]Rate - g ai/ha

Example 12: Weed Control and Crop Tolerance with 2,4 DC and Dimethenamid-P Combinations In this example a greenhouse study was conducted to determine weed efficacy and crop tolerance when 2,4 DC is applied alone or in combination with dimethenamid-P as preemergence. The tested weeds include: wild buckwheat (*Polygonum convolvulus*, POLCO), velvetleaf (*Abutilon theophrasti*, ABUTH), cheat (*Bromus secalinus*, BROSE), wild oat (*Avena fatua*, AVEFA), radish (*Raphanus sativus*, RAPSN), corn poppy (*Papaver rhoeas*, PAPRH), yellow foxtail (*Setaria pumila*, SETLU), Italian ryegrass (*Lolium perenne* ssp. *multiflorum*, LOLMU). The tested crop was Oilseed rape.

Methods:

This greenhouse study was conducted to assess the preemergence (PRE) weed control and oilseed rape tolerance with 2,4 DC (CS 36.7%) and dimethenamid-P (Outlook®, 63.9%) tank-mix combinations. 2,4 DC was applied at 125, 170, 210, or 250 g ai/ha alone or as tank-mix with dimethenamid-P. Dimethenamid-P rates for tank-mix application were applied at 250, 375, or 500 g ai/ha for the treatment numbers 1-12, whereas single application of dimethenamid-P was made at 750 g in addition to three above-mentioned rates. A non-treated check was included as reference standard.

All plant species were direct seeded into 6×10" fiber flats utilizing Pennington soil. Metazachlor (Butisan, 43.1%) plus dimethenamid-P applied as tank mix at 500 g each was applied as commercial standard. Treatments were replicated 3 times and flats were watered after planting but before the treatment and then lightly watered after treatment application. Thereafter flats were watered and fertilized routinely. Treatments were applied with compressed air in a track spray chamber at 30 GPA using a TeeJet 8001E nozzle at 40

PSI. Visual percent weed control and oilseed rape injury were recorded at 14, 21, and 28 days after treatment (DAT), using a scale of 0 (no control/no injury) to 100 (complete plant death). Data (not included) were analyzed using Minitab statistical software at 95% confidence interval.

Results at 28 DAT:

All twelve combinations of 2,4 DC and dimethenamid-P tank-mix gave ≥85% control of corn poppy, yellow foxtail, and Italian ryegrass. Out of 12 tank-mix combinations, cheat and wild oat were controlled with 11 and 4 combinations, respectively. 2,4 DC alone at all rates did not control any weed species. Dimethenamid-P alone at all three rates controlled cheat, corn poppy, yellow foxtail, and Italian ryegrass. Control of wild oat was seen at 500 g or 750 g ai/ha. Metazachlor plus dimethenamid-P tank-mix treatment controlled all weeds except velvetleaf and radish.

All 2,4 DC plus dimethenamid-P combinations were safe (≤10% injury) on oilseed rape. 2,4 DC alone or diflufenican alone were safe on oilseed rape. Metazachlor plus dimethenamid-P was also safe on oilseed rape.

In summary, 2,4 DC and dimethenamid-P combinations controlled (≥85%) 5 out of 8 weeds. At the rates used in this study, 2,4 DC alone did not give control of any weeds; on the other hand, dimethenamid-P gave control of 5 weeds. In most cases, 2, 4 DC plus dimethenamid-P combinations were safe on oilseed rape. The tables below highlight analysis of data representing unexpected synergistic effects of the tested combinations.

| 2,4-DC + dimethenamid-P-Wild buckwheat-28 DAT | | | | | | | |
| Tmt | X | Y | Ex-pected | ob-served | synergy[α] | 2,4-DC[β] | Dimethenamid-P[ρ] |
| --- | --- | --- | --- | --- | --- | --- | --- |
| 1 | 8 | 32 | 37.44 | 58 | Y | 125 | 250 |
| 2 | 8 | 70 | 72.4 | 65 | N | 125 | 375 |
| 3 | 8 | 63 | 65.96 | 90 | Y | 125 | 500 |
| 4 | 25 | 32 | 49 | 35 | N | 170 | 250 |
| 5 | 25 | 70 | 77.5 | 60 | N | 170 | 375 |
| 6 | 25 | 63 | 72.25 | 87 | Y | 170 | 500 |
| 7 | 28 | 32 | 51.04 | 56 | Y | 210 | 250 |
| 8 | 28 | 70 | 78.4 | 83 | Y | 210 | 375 |
| 9 | 28 | 63 | 73.36 | 65 | N | 210 | 500 |
| 10 | 38 | 32 | 57.84 | 37 | N | 250 | 250 |
| 11 | 38 | 70 | 81.4 | 60 | N | 250 | 375 |
| 12 | 38 | 63 | 77.06 | 43 | N | 250 | 500 |

[α]measurement of synergistic behavior as Y = YES; N = NO
[β]and [ρ]Rate - g ai/ha

| 2,4-DC + dimethenamid-P-Wild oat-28 DAT | | | | | | | |
| Tmt | X | Y | Ex-pected | ob-served | synergy[α] | 2,4-DC[β] | Dimethenamid-P[ρ] |
| --- | --- | --- | --- | --- | --- | --- | --- |
| 1 | 9 | 66 | 69.06 | 70 | Y | 125 | 250 |
| 2 | 9 | 73 | 75.43 | 60 | N | 125 | 375 |
| 3 | 9 | 90 | 90.9 | 80 | N | 125 | 500 |
| 4 | 27 | 66 | 75.18 | 65 | N | 170 | 250 |
| 5 | 27 | 73 | 80.29 | 69 | N | 170 | 375 |
| 6 | 27 | 90 | 92.7 | 85 | N | 170 | 500 |
| 7 | 27 | 66 | 75.18 | 73 | N | 210 | 250 |
| 8 | 27 | 73 | 80.29 | 85 | Y | 210 | 375 |
| 9 | 27 | 90 | 92.7 | 73 | N | 210 | 500 |
| 10 | 29 | 66 | 75.86 | 84 | Y | 250 | 250 |
| 11 | 29 | 73 | 80.83 | 90 | Y | 250 | 375 |
| 12 | 29 | 90 | 92.9 | 89 | N | 250 | 500 |

[α]measurement of synergistic behavior as Y = YES; N = NO
[β]and [ρ]Rate - g ai/ha

Example 13: Weed Control with 2,4 DC and Diflufenican Combinations

In this example a greenhouse study was conducted to determine the weed efficacy of 2,4-DC, when 2,4-DC is applied alone or in combination with diflufenican as preemergence (PRE) treatment against Blackgrass (*Alopecurus myosuroides*, ALMOY), silky windgrass (*Apera spica-venti*, APESV), redroot pigweed (*Amaranthus retroflexus*, AMARE), littleseed canarygrass (*Phalaris minor*, PHAMI), wild buckwheat (*Polygonum convolvulus*, POLCO), green foxtail (*Setaria viridis*, SETVI), common lambsquarters (*Chenopodium album*, CHEAL), wild mustard (*Sinapis arvensis*, SINAR), tall morningglory (*Ipomoea purpurea*, PHPBU), shepherd's-purse (*Capsella bursa-pastoris*, CAPBP).

Methods:

2,4-DC (CS 36.7%) was applied at 125, 170, 210, or 250 g ai/ha alone or as tank-mix with diflufenican. Diflufenican rates for alone or tank-mix application were 50, 75, or 100 g ai/ha. All plant species were direct seeded into 6×10" fiber flats utilizing Pennington soil. Pyroxasulfone (KIH-485, 85%) at 74.3 g ai/ha, pendimethalin (Prowl 3.3EC, 37.4%) at 1200 g ai/ha, or a premix of chlorsulfuron plus metsulfuron-methyl (Report Extra, 75%) at 15.8 g ai/ha were applied as commercial standards. A non-treated check was included as reference standard. Treatments were replicated 3 times and flats were watered after planting before the treatment and lightly watered after treatment application. Thereafter flats were watered and fertilized routinely. Treatments were applied with compressed air in a track spray chamber at 30 GPA using a TeeJet 8001E nozzle at 40 PSI.

Visual percent weed control was recorded at 14, 21, and 28 DAT, using a scale of 0 (no control) to 100 (complete plant death). Data (not included) were analyzed using Minitab statistical software at 95% confidence interval.

Results at 28 DAT:

All twelve 2,4 DC and difulfenican tank-mix combinations gave ≥85% control of silky windgrass, redroot pigweed, green foxtail, common lambsquarters, and shepherd's-purse. Control of blackgrass was noticed when 2,4 DC was applied at 250 g with 75 g ai/ha or higher rates of diflufenican. Complete control of wild buckwheat was observed with 2,4 DC at 210 g plus diflufenican at 75 g. Addition of diflufenican at 100 g to 2,4 DC at any rate controlled (≥85%) wild mustard.

Except for shepherd's-purse 2,4 DC alone at all rates did not control most of the species. Diflufenican alone at all three rates to some degree controlled silky windgrass, redroot pigweed, green foxtail, and shepherd's purse. Wild buckwheat and wild mustard were controlled at 75 g or higher rate. Diflufenican controlled common lambsquarters at 100 g only. Pyroxasulfone at 74.3 g controlled all weeds except tall morningglory and shepherd's-purse. Pendimethalin at 1200 g gave control of 6 out of 10 weeds. Chlorsulfuron plus metsulfuron-methyl at 15.8 g controlled all 10 weeds except blackgrass and littleseed canarygrass.

In summary, 2,4 DC and diflufenican combinations controlled (≥85%) 8 out of 10 weeds. At the rates used in this study, 2,4 DC alone gave control of one weed while diflufenican alone controlled 7 weeds. The tables below highlight analysis of data representing unexpected synergistic effects of the tested combinations.

| 2,4-DC + Diflufenican against Blackgrass 28 DAT | | | | | | | |
|---|---|---|---|---|---|---|---|
| Tmt | X | Y | Expected | observed | synergy$^\alpha$ | 2,4-DC$^\beta$ | Diflufenican$^\rho$ |
| 1 | 23 | 33 | 48.41 | 37 | N | 125 | 50 |
| 2 | 23 | 17 | 36.09 | 43 | Y | 125 | 75 |
| 3 | 23 | 27 | 43.79 | 61 | Y | 125 | 100 |
| 4 | 53 | 33 | 68.51 | 62 | N | 170 | 50 |
| 5 | 53 | 17 | 60.99 | 77 | Y | 170 | 75 |
| 6 | 53 | 27 | 65.69 | 66 | Y | 170 | 100 |
| 7 | 66 | 33 | 77.22 | 58 | N | 210 | 50 |
| 8 | 66 | 17 | 71.78 | 78 | Y | 210 | 75 |
| 9 | 66 | 27 | 75.18 | 77 | Y | 210 | 100 |
| 10 | 68 | 33 | 78.56 | 67 | N | 250 | 50 |
| 11 | 68 | 17 | 73.44 | 86 | Y | 250 | 75 |
| 12 | 68 | 27 | 76.64 | 88 | Y | 250 | 100 |

$^\alpha$measurement of synergistic behavior as Y = YES; N = NO
$^\beta$ and $^\rho$Rate - g ai/ha

| 2,4-DC + Diflufenican - Common lambsquarters-28 DAT | | | | | | | |
|---|---|---|---|---|---|---|---|
| Tmt | X | Y | Expected | observed | synergy$^\alpha$ | 2,4-DC$^\beta$ | Diflufenican$^\rho$ |
| 1 | 15 | 65 | 70.25 | 90 | Y | 125 | 50 |
| 2 | 15 | 73 | 77.05 | 91 | Y | 125 | 75 |
| 3 | 15 | 85 | 87.25 | 92 | Y | 125 | 100 |
| 4 | 26 | 65 | 74.1 | 88 | Y | 170 | 50 |
| 5 | 26 | 73 | 80.02 | 93 | Y | 170 | 75 |
| 6 | 26 | 85 | 88.9 | 98 | Y | 170 | 100 |
| 7 | 58 | 65 | 85.3 | 96 | Y | 210 | 50 |
| 8 | 58 | 73 | 88.66 | 96 | Y | 210 | 75 |
| 9 | 58 | 85 | 93.7 | 93 | N | 210 | 100 |
| 10 | 60 | 65 | 86 | 87 | Y | 250 | 50 |
| 11 | 60 | 73 | 89.2 | 97 | Y | 250 | 75 |
| 12 | 60 | 85 | 94 | 92 | N | 250 | 100 |

$^\alpha$measurement of synergistic behavior as Y = YES; N = NO
$^\beta$ and $^\rho$Rate - g ai/ha

| 2,4-DC + Diflufenican - Wild mustard-28 DAT | | | | | | | |
|---|---|---|---|---|---|---|---|
| Tmt | X | Y | Expected | observed | synergy$^\alpha$ | 2,4-DC$^\beta$ | Diflufenican$^\rho$ |
| 1 | 10 | 42 | 47.8 | 83 | Y | 125 | 50 |
| 2 | 10 | 89 | 90.1 | 97 | Y | 125 | 75 |
| 3 | 10 | 100 | 100 | 100 | N | 125 | 100 |
| 4 | 15 | 42 | 50.7 | 77 | Y | 170 | 50 |
| 5 | 15 | 89 | 90.65 | 83 | N | 170 | 75 |
| 6 | 15 | 100 | 100 | 100 | N | 170 | 100 |
| 7 | 26 | 42 | 57.08 | 88 | Y | 210 | 50 |
| 8 | 26 | 89 | 91.86 | 97 | Y | 210 | 75 |
| 9 | 26 | 100 | 100 | 100 | N | 210 | 100 |
| 10 | 23 | 42 | 55.34 | 79 | Y | 250 | 50 |
| 11 | 23 | 89 | 91.53 | 87 | N | 250 | 75 |
| 12 | 23 | 100 | 100 | 93 | N | 250 | 100 |

$^\alpha$measurement of synergistic behavior as Y = YES; N = NO
$^\beta$ and $^\rho$Rate - g ai/ha

Example 14: POST Crop Selectivity and Weed Control with 2,4 DC and Bromoxynil Combinations In this example a greenhouse study was conducted to study the postemergence (POST) weed control and wheat and barley selectivity with 2,4 DC alone or in combination with bromoxynil tank-mix against the following weeds Wild oat (*Avena fatua*, AVEFA) wild buckwheat (*Polygonum convolvulus*, POLCO), common chickweed (*Stellaria media*, STEME), common lambsquarters (*Chenopodium*

*album*, CHEAL), wild mustard (*Sinapis arvensis*, SINAR), Italian ryegrass (*Lolium multiflorum*, LOLMU). The study further assessed post crop safety on Wheat and Barley.

Methods:

2,4-DC (SC 36%) was applied at 125, 170, 210, or 250 g ai/ha alone or as tank-mix with bromoxynil. Bromoxynil rates for alone or tank-mix application were 140, 210, or 280 g ai/ha. Thifensulfuron-methyl+tribenuron-methyl+metsulfuron-methyl (Accurate Extra, 37.5%+18.75%+15%) at 31.48 g ai/ha or thifensulfuron-methyl+tribenuron-methyl (Harmony Extra SG, 33.33%+16.67%) at 19.95 g ai/ha were applied as commercial standards, an untreated control was also included for comparison. Nonionic surfactant at 0.5% (v/v) was included with commercial standards application. No adjuvant was applied with any other treatments. All plant species were direct seeded into 3" plastic pots using metro-mix as growth media. At treatment application common lambsquarters was 1.75", common chickweed was 2", wild mustard was 2.25", wild oat was 5.5", wild buckwheat was 2-5", Italian ryegrass was 2-3", wheat was 5.5", and barley was 4.5" in height. Plants were watered well before application and not watered 24 h after application. Plants were watered and fertilized routinely after treatment application. Each treatment was replicated four times. Treatments were applied with compressed air in a track spray chamber at 30 GPA using a TeeJet 8001E nozzle at 40 PSI.

Visual percent wheat and barley injury and weed control were recorded at 7, 14, 21, and 28 days after treatment (DAT), using a scale of 0 (no control/no crop injury) to 100 (complete plant death). Data (not included) were analyzed using Minitab statistical software at 95% confidence interval.

Results at 28 DAT:

All tank-mix applications of 2,4-DC (SC 36%) plus bromoxynil gave ≥85% control of wild buckwheat and wild mustard, 11 combinations controlled common lambsquarters, while 3 combinations controlled common chickweed. Wild oat and Italian ryegrass were not controlled by any tank-mix combination, however, Italian ryegrass was suppressed (70-84% injury) by certain combinations.

Wheat was not injured by any combination; barley was moderately injured by 1 combination and safe with all other tank-mix combinations. 2,4-DC (SC 36%) applied alone did not control any weed in the assay, and was safe at all rates on both wheat and barley. Bromoxynil alone controlled wild buckwheat, wild mustard, and common lambsquarters at all rates and was safe on both crops at all rates. Thifensulfuron-methyl+tribenuron-methyl+metsulfuron-methyl or thifensulfuron-methyl+tribenuron-methyl both controlled wild buckwheat, wild mustard, common chickweed, and common lambsquarters and were safe on barley and wheat; neither treatment controlled wild oat or Italian ryegrass.

Italian ryegrass was not controlled by any application in the assay. It was observed however that when 2,4-DC (SC 36%) was applied at ≥210 g ai/ha with any rate of bromoxynil, injury level of Italian ryegrass increased to suppression levels in all cases. That same level of control was not achieved by either herbicide when applied alone.

In summary POST application of all twelve 2,4-DC and bromoxynil tank-mix combinations controlled (≥85%) wild mustard and wild buckwheat, common lambsquarters was controlled with 11 combinations, common chickweed was controlled with 3 combinations. Wild oat and Italian ryegrass were not controlled by any combination. All combinations except one were safe on both barley and wheat. 2,4-DC alone did not control any of the tested weeds in this example, bromoxynil alone controlled wild buckwheat, wild mustard and common lambsquarters. The tables below highlight analysis of data representing unexpected synergistic effects of the tested combinations.

| | | | | | | | |
|---|---|---|---|---|---|---|---|
| \multicolumn{8}{c}{2,4-DC + bromoxynil-3129 (28 DAT)- Common chickweed-28 DAT} | | | | | | | |
| Tmt | X | Y | Expected | observed | syn-ergy[α] | 2,4-DC[β] | Bromoxynil[ρ] |
| 1 | 9 | 35 | 40.85 | 76 | Y | 125 | 140 |
| 2 | 9 | 65 | 68.15 | 74 | Y | 125 | 210 |
| 3 | 9 | 38 | 43.58 | 76 | Y | 125 | 280 |
| 4 | 7 | 35 | 39.55 | 72 | Y | 170 | 140 |
| 5 | 7 | 65 | 67.45 | 83 | Y | 170 | 210 |
| 6 | 7 | 38 | 42.34 | 82 | Y | 170 | 280 |
| 7 | 14 | 35 | 44.1 | 88 | Y | 210 | 140 |
| 8 | 14 | 65 | 69.9 | 88 | Y | 210 | 210 |
| 9 | 14 | 38 | 46.68 | 80 | Y | 210 | 280 |
| 10 | 28 | 35 | 53.2 | 79 | Y | 250 | 140 |
| 11 | 28 | 65 | 74.8 | 84 | Y | 250 | 210 |
| 12 | 28 | 38 | 55.36 | 86 | Y | 250 | 280 |

[α]measurement of synergistic behavior as Y = YES; N = NO
[β] and [ρ]Rate - g ai/ha

Example 15: Preemergence (PRE) Efficacy Against Weeds and Selectivity of 2,4 DC and S-Metolachlor Tank-Mix Combinations in Corn In this example a greenhouse study was conducted to determine the weed efficacy of 2,4-DC in combination with S-metolachlor in tank-mix combinations as applied to corn at different rates. The weeds tested in this study were redroot pigweed (*Amaranthus retroflexus*, AMARE), Jimsonweed (*Datura stramonium*, DATST), black nightshade (*Solanum nigrum*, SOLNI), large crabgrass (*Digitaria sanguinalis*, DIGSA), Pennsylvania smartweed (*Polygonum pensylvanicum*, POLPY), horseweed (*Conyza canadensis*, ERICA), wild buckwheat (*Polygonum convolvulus*, POLCO). The crop tested was Corn (var. Viking).

Methods:

To determine PRE efficacy and corn injury, five rates of each 2,4 DC (36.7% CS) and S-metolachlor (Dual II Magnum®, 82.4%) were applied either alone or as tank-mix. 2,4 DC was applied at 0, 125, 170, 210, or 250 g ai/ha and S-metolachlor was applied at 0, 267, 534, 801, or 1070 g ai/ha. Additional treatments included application of premix of pyroxasulfone plus fluthiacet-methyl (Anthem™ 23.3%) at 169.9 g ai/ha and tank-mix of mesotrione (Callisto®, 40%) at 123 g plus S-metolachlor at 1252 g. Treatments were applied just after the planting of large crabgrass, Jimsonweed, black nightshade, redroot pigweed, Pennsylvania smartweed, horseweed, wild buckwheat, and corn. A non-treated check was included as reference standard.

Weed species were planted in fiber flats (6"×10") containing Pennington soil and flats were watered well before application and watered lightly after application. Flats were watered and fertilized routinely after treatment application. Each treatment was replicated three times. Treatments were applied using compressed air track spray chamber at 30 GPA using a TeeJet 8001E nozzle at 40 PSI. Visual percent weed control and corn injury were recorded at 14, 21, and 28 days after treatment using a scale of 0 (no control/no injury) to 100 (complete plant death). Corn injury was rated for bleaching and stunting. Data (not included) were analyzed using Minitab statistical software at 95% confidence interval.

Results:

All sixteen combinations controlled (≥85%) large crabgrass, black nightshade, redroot pigweed, Pennsylvania smartweed, and horseweed. Nine combinations gave control of Jimsonweed and only three combinations controlled wild buckwheat.

All sixteen combinations caused 5% or lower bleaching of corn foliage while 12 combinations caused greater than 10% stunting of corn. 2,4 DC alone controlled large crabgrass at 170 g ai/ha or 250 g and it was safe on corn at all rate. S-metolachlor alone gave control of all species at different rates except Jimsonweed. S-metolachlor alone caused less than 10% bleaching or stunting to corn at 267 g or 534 g. Premix of pyroxasulfone plus fluthiacet-methyl and tank-mix of mesotrione plus S-metolachlor controlled all species except pyroxasulfone plus fluthiacet-methyl did not control Jimsonweed. Corn injury with pyroxasulfone plus fluthiacet-methyl and mesotrione plus S-metolachlor was severe stunting (≥50%).

In summary, all 2,4 DC plus S-metolachlor combinations controlled (≥85%) large crabgrass, black nightshade, redroot pigweed, Pennsylvania smartweed, and horseweed. In many cases, these combinations caused greater than 10% stunting to corn. 2,4 DC alone controlled only large crabgrass, preferably at three rates of 170, 210 and 250 and was safe on corn at all rates. S-metolachlor gave control of six out of seven species and it was safe on corn at 534 g or lower rates. The tables below highlight analysis of data representing unexpected synergistic effects of the tested combinations.

| | | | 2,4-DC + S-metolachlor- Jimsonweed-28 DAT | | | | |
|---|---|---|---|---|---|---|---|
| Tmt | X | Y | Expected | observed | syn-ergy[α] | 2,4-DC[β] | S-metolachlor[ρ] |
| 1 | 37 | 17 | 47.71 | 63 | Y | 125 | 267 |
| 2 | 37 | 17 | 47.71 | 88 | Y | 125 | 534 |
| 3 | 37 | 23 | 51.49 | 73 | Y | 125 | 801 |
| 4 | 37 | 28 | 54.64 | 88 | Y | 125 | 1070 |
| 5 | 40 | 17 | 50.2 | 57 | Y | 170 | 267 |
| 6 | 40 | 17 | 50.2 | 80 | Y | 170 | 534 |
| 7 | 40 | 23 | 53.8 | 90 | Y | 170 | 801 |
| 8 | 40 | 28 | 56.8 | 92 | Y | 170 | 1070 |
| 9 | 48 | 17 | 56.84 | 85 | Y | 210 | 267 |
| 10 | 48 | 17 | 56.84 | 62 | Y | 210 | 534 |
| 11 | 48 | 23 | 59.96 | 68 | Y | 210 | 801 |
| 12 | 48 | 28 | 62.56 | 85 | Y | 210 | 1070 |
| 13 | 53 | 17 | 60.99 | 62 | Y | 250 | 267 |
| 14 | 53 | 17 | 60.99 | 89 | Y | 250 | 534 |
| 15 | 53 | 23 | 63.81 | 95 | Y | 250 | 801 |
| 16 | 53 | 28 | 66.16 | 75 | Y | 250 | 1070 |

[α]measurement of synergistic behavior as Y = YES; N = NO
[β] and [ρ]Rate - g ai/ha

| | | | 2,4-DC + s-metolachlor- Black nightshade-28 DAT | | | | |
|---|---|---|---|---|---|---|---|
| Tmt | X | Y | Expected | observed | syn-ergy[α] | 2,4-DC[β] | S-metolachlor[ρ] |
| 1 | 32 | 46 | 63.28 | 99 | Y | 125 | 267 |
| 2 | 32 | 85 | 89.8 | 93 | Y | 125 | 534 |
| 3 | 32 | 90 | 93.2 | 88 | N | 125 | 801 |
| 4 | 32 | 95 | 96.6 | 100 | Y | 125 | 1070 |
| 5 | 33 | 46 | 63.82 | 90 | Y | 170 | 267 |
| 6 | 33 | 85 | 89.95 | 97 | Y | 170 | 534 |
| 7 | 33 | 90 | 93.3 | 93 | N | 170 | 801 |
| 8 | 33 | 95 | 96.65 | 99 | Y | 170 | 1070 |
| 9 | 47 | 46 | 71.38 | 93 | Y | 210 | 267 |
| 10 | 47 | 85 | 92.05 | 97 | Y | 210 | 534 |
| 11 | 47 | 90 | 94.7 | 100 | Y | 210 | 801 |

-continued

| | | | 2,4-DC + s-metolachlor- Black nightshade-28 DAT | | | | |
|---|---|---|---|---|---|---|---|
| Tmt | X | Y | Expected | observed | syn-ergy[α] | 2,4-DC[β] | S-metolachlor[ρ] |
| 12 | 47 | 95 | 97.35 | 100 | Y | 210 | 1070 |
| 13 | 50 | 46 | 73 | 100 | Y | 250 | 267 |
| 14 | 50 | 85 | 92.5 | 99 | Y | 250 | 534 |
| 15 | 50 | 90 | 95 | 100 | Y | 250 | 801 |
| 16 | 50 | 95 | 97.5 | 100 | Y | 250 | 1070 |

[α]measurement of synergistic behavior as Y = YES; N = NO
[β] and [ρ]Rate - g ai/ha

| | | | 2,4-DC + S-metolachlor- Pennsylvania smartweed-28 DAT | | | | |
|---|---|---|---|---|---|---|---|
| Tmt | X | Y | Expected | observed | syn-ergy[α] | 2,4-DC[β] | S-metolachlor[ρ] |
| 1 | 38 | 75 | 84.5 | 96 | Y | 125 | 267 |
| 2 | 38 | 95 | 96.9 | 100 | Y | 125 | 534 |
| 3 | 38 | 100 | 100 | 100 | N | 125 | 801 |
| 4 | 38 | 100 | 100 | 100 | N | 125 | 1070 |
| 5 | 67 | 75 | 91.75 | 100 | Y | 170 | 267 |
| 6 | 67 | 95 | 98.35 | 100 | Y | 170 | 534 |
| 7 | 67 | 100 | 100 | 100 | N | 170 | 801 |
| 8 | 67 | 100 | 100 | 100 | N | 170 | 1070 |
| 9 | 80 | 75 | 95 | 100 | Y | 210 | 267 |
| 10 | 80 | 95 | 99 | 100 | Y | 210 | 534 |
| 11 | 80 | 100 | 100 | 100 | N | 210 | 801 |
| 12 | 80 | 100 | 100 | 100 | N | 210 | 1070 |
| 13 | 78 | 75 | 94.5 | 100 | Y | 250 | 267 |
| 14 | 78 | 95 | 98.9 | 100 | Y | 250 | 534 |
| 15 | 78 | 100 | 100 | 100 | N | 250 | 801 |
| 16 | 78 | 100 | 100 | 100 | N | 250 | 1070 |

[α]measurement of synergistic behavior as Y = YES; N = NO
[β] and [ρ]Rate - g ai/ha

| | | | 2,4-DC + S-metolachlor- Wild buckwheat -28 DAT | | | | |
|---|---|---|---|---|---|---|---|
| Tmt | X | Y | Expected | observed | syn-ergy[α] | 2,4-DC[β] | S-metolachlor[ρ] |
| 1 | 15 | 33 | 43.05 | 25 | N | 125 | 267 |
| 2 | 15 | 65 | 70.25 | 43 | N | 125 | 534 |
| 3 | 15 | 82 | 84.7 | 62 | N | 125 | 801 |
| 4 | 15 | 85 | 87.25 | 97 | Y | 125 | 1070 |
| 5 | 43 | 33 | 61.81 | 35 | N | 170 | 267 |
| 6 | 43 | 65 | 80.05 | 47 | N | 170 | 534 |
| 7 | 43 | 82 | 89.74 | 77 | N | 170 | 801 |
| 8 | 43 | 85 | 91.45 | 75 | N | 170 | 1070 |
| 9 | 30 | 33 | 53.1 | 53 | N | 210 | 267 |
| 10 | 30 | 65 | 75.5 | 58 | N | 210 | 534 |
| 11 | 30 | 82 | 87.4 | 72 | N | 210 | 801 |
| 12 | 30 | 85 | 89.5 | 68 | N | 210 | 1070 |
| 13 | 32 | 33 | 54.44 | 37 | N | 250 | 267 |
| 14 | 32 | 65 | 76.2 | 63 | N | 250 | 534 |
| 15 | 32 | 82 | 87.76 | 92 | Y | 250 | 801 |
| 16 | 32 | 85 | 89.8 | 88 | N | 250 | 1070 |

[α]measurement of synergistic behavior as Y = YES; N = NO
[β] and [ρ]Rate - g ai/ha

Example 16: Preemergence (PRE) Efficacy of 2,4 DC and Pyroxasulfone Tank-Mix Combinations In this example a greenhouse study was conducted to determine preemergence efficacy of 2,4 DC and pyroxasulfone tank-mixes when 2,4 DC or pyroxasulfone are applied at different rates against weeds selected from the group of giant foxtail (*Setaria faberi*, SETFA), green foxtail (*Setaria virdis*, SETVI), yellow foxtail (*Setaria pumila*, SETLU), black nightshade (*Solanum nigrum*, SOLNI), *kochia* (*Kochia scoparia*, KCHSC), redroot pigweed (*Amaranthus retroflexus*, AMARE), common ragweed (*Ambrosia artemisiifolia*, AMBEL), barnyardgrass (*Echinochloa crusgalli*, ECHCG), large crabgrass (*Digitaria sanguinalis*, DIGSA).

Methods:

To determine PRE efficacy, five levels of 2,4 DC (36.7% CS) 0, 125, 170, 210, or 250 g ai/ha and five levels of pyroxasulfone (KIH485-85WG) 0, 50, 65, 80, or 95 g ai/ha were applied either alone or as tank-mix. Additional treatments consisted of premix of pyroxasulfone plus fluthiacet-methyl (Anthem™ 23.3%) at 169.9 g ai/ha, S-metolachlor (Dual II Magnum, 82.4%) at 1388 g, and tank-mix of mesotrione (Callisto, 40%) at 123 g plus S-metolachlor at 1252 g. A non-treated check was included as reference standard. Treatments were applied before the emergence of black nightshade, giant foxtail, green foxtail, yellow foxtail, large crabgrass, *kochia*, redroot pigweed, common ragweed, and barnyardgrass.

Weed species were planted in fiber flats (6"×10") containing Pennington soil and flats were watered well before application and watered lightly after application. Flats were watered and fertilized routinely after treatment application. Each treatment was replicated three times. Treatments were applied using compressed air track spray chamber at 30 GPA using a TeeJet 8001E nozzle at 40 PSI. Visual percent weed control data were recorded at 14, 21, and 28 days after treatment using a scale of 0 (no control) to 100 (complete plant death). Data (not included) were analyzed using Minitab statistical software at 95% confidence interval.

Results:

All sixteen combinations controlled (≥85%) black nightshade, *kochia*, redroot pigweed, barnyardgrass, large crabgrass, giant foxtail, green foxtail, and yellow foxtail. Out of 16 combinations, 14 combinations gave control of common ragweed. 2,4 DC alone controlled *kochia* at 210 g ai/ha, barnyardgrass and large crabgrass at 125 g, giant foxtail and green foxtail at 170 g.

Regardless of rates, pyroxasulfone controlled all species except common ragweed which was not controlled at any rate. Premix of pyroxasulfone plus fluthiacet-methyl and tank-mix of mesotrione plus S-metolachlor controlled all species. S-metolachlor controlled black nightshade, redroot pigweed, barnyardgrass, large crabgrass, and all three foxtail species.

In summary, nearly all combinations performed effectively (≥85% control) on all weed species. 2,4 DC alone provided control of *kochia* at 210 g ai/ha and controlled all grass species except yellow foxtail at 170 g. Pyroxasulfone at all rates controlled all weeds except common ragweed. The tables below highlight analysis of data representing unexpected synergistic effects of the tested combinations.

| 2,4-DC + pyroxasulfone- Common ragweed-28 DAT | | | | | | | |
|---|---|---|---|---|---|---|---|
| Tmt | X | Y | Expected | observed | syn-ergy[α] | 2,4-DC[β] | Pyroxasulfone[ρ] |
| 1 | 33 | 40 | 59.8 | 83 | Y | 125 | 50 |
| 2 | 33 | 53 | 68.51 | 88 | Y | 125 | 65 |
| 3 | 33 | 40 | 59.8 | 97 | Y | 125 | 80 |
| 4 | 33 | 70 | 79.9 | 95 | Y | 125 | 95 |
| 5 | 40 | 40 | 64 | 80 | Y | 170 | 50 |
| 6 | 40 | 53 | 71.8 | 85 | Y | 170 | 65 |
| 7 | 40 | 40 | 64 | 90 | Y | 170 | 80 |
| 8 | 40 | 70 | 82 | 93 | Y | 170 | 95 |

-continued

| 2,4-DC + pyroxasulfone- Common ragweed-28 DAT | | | | | | | |
|---|---|---|---|---|---|---|---|
| Tmt | X | Y | Expected | observed | syn-ergy[α] | 2,4-DC[β] | Pyroxasulfone[ρ] |
| 9 | 40 | 40 | 64 | 90 | Y | 210 | 50 |
| 10 | 40 | 53 | 71.8 | 82 | Y | 210 | 65 |
| 11 | 40 | 40 | 64 | 93 | Y | 210 | 80 |
| 12 | 40 | 70 | 82 | 83 | Y | 210 | 95 |
| 13 | 45 | 40 | 67 | 90 | Y | 250 | 50 |
| 14 | 45 | 53 | 74.15 | 85 | Y | 250 | 65 |
| 15 | 45 | 40 | 67 | 90 | Y | 250 | 80 |
| 16 | 45 | 70 | 83.5 | 90 | Y | 250 | 95 |

[α]measurement of synergistic behavior as Y = YES; N = NO
[β] and [ρ]Rate - g ai/ha

Example 17: Preemergence Weed Efficacy and Sugarcane Selectivity with 2,4 DC and Isoxaflutole Tank-Mix Combinations In this example a study was conducted to determine weed efficacy and sugarcane injury when 2,4 DC or isoxaflutole are applied either alone or tank-mix as preemergence against the weeds: Ivyleaf morningglory (*Ipomoea hederacea*, IPOHE), hairy beggartickss (*Bidens pilosa*, BIDPI), yellow nutsedge (*Cyperus esculentus*, CYPES), large crabgrass (*Digitaria sanguinalis*, DIGSA), and redroot pigweed (*Amaranthus retroflexus*, AMARE). The crop tested in this study was Sugarcane (var. CTC 20).

Methods:

To determine weed efficacy and sugarcane selectivity, 2,4 DC (SC 36%) and isoxaflutole (Balance Flexx®, 20%) were applied PRE either alone or as tank-mix partners at rates mentioned below. 2,4 DC was applied at 500, 750, and 1000 g ai/ha while isoxaflutole was applied at 80, 100, and 120 g ai/ha. Two commercial standards, clomazone (Command®3ME, 31.4%) at 1120 g ai/ha and mesotrione (Callisto® 40%) at 105 g were included. A non-treated check was included as reference standard. Treatments were applied PRE to sugarcane (var. CTC 20), ivyleaf morningglory, hairy beggarticks, yellow nutsedge, large crabgrass, and redroot pigweed. Weed species were planted in fiber flats (6"×10") containing Pennington soil. Soil was watered before application and watered lightly after application. Flats were watered and fertilized routinely after treatment application. Treatments were applied using compressed air track spray chamber at 30 GPA using a TeeJet 8001E nozzle at 40 PSI. Percent weed control and sugarcane injury were recorded at 14, 21, and 28 days after treatment (DAT) using a scale of 0 (no control) to 100 (complete plant death). Data (not included) were analyzed using Minitab statistical software at 95% confidence interval.

Results:

Tank-mix treatments of 2,4 DC with isoxaflutole at all rates controlled ((≥85% weed control) ivyleaf morningglory, hairy beggarticks, large crabgrass, and redroot pigweed. No tank-mix treatment controlled yellow nutsedge. All tank-mix treatments caused sugarcane bleaching greater than 20%. Ivyleaf morningglory control with 2,4 DC alone was achieved at 1000 g whereas hairy beggarticks was controlled at 750 g of 2,4 DC. Large crabgrass and redroot pigweed were controlled with 2,4 DC alone at 500 g or higher rates. Isoxaflutole alone at 80 g or higher rates controlled hairy beggarticks, large crabgrass, and redroot pigweed. Isoxaflutole alone at three rates caused sugarcane bleaching in the range from 26 to 42%. Mesotrione at 105 g controlled all weeds except ivyleaf morningglory. Clomazone at 1120 g controlled hairy beggarticks, large crabgrass, and redroot pigweed.

In summary, tank-mix combinations of 2,4 DC and isoxaflutole controlled (≥85% weed control) all weeds except yellow nutsedge. All 12 tank-mix combinations caused >20% bleaching on sugarcane at 28 DAT. 2,4 DC alone controlled four out of five, Ivyleaf morningglory, hairy beggarticks, large crabgrass and redroot pigweed were controlled. The tables below highlight analysis of data representing unexpected synergistic effects of the tested combinations.

| 2,4 DC + isoxaflutole- Ivyleaf morningglory-28 DAT | | | | | | | |
|---|---|---|---|---|---|---|---|
| Tmt | X | Y | Expected | observed | syn-ergy$^\alpha$ | 2,4-DC$^\beta$ | Isoxaflutole$^\rho$ |
| 1 | 67 | 69 | 89.77 | 90 | Y | 500 | 80 |
| 2 | 67 | 73 | 91.09 | 92 | Y | 500 | 100 |
| 3 | 67 | 81 | 93.73 | 98 | Y | 500 | 120 |
| 4 | 78 | 69 | 93.18 | 95 | Y | 750 | 80 |
| 5 | 78 | 73 | 94.06 | 98 | Y | 750 | 100 |
| 6 | 78 | 81 | 95.82 | 97 | Y | 750 | 120 |
| 7 | 88 | 69 | 96.28 | 98 | Y | 1000 | 80 |
| 8 | 88 | 73 | 96.76 | 99 | Y | 1000 | 100 |
| 9 | 88 | 81 | 97.72 | 100 | Y | 1000 | 120 |

$^\alpha$measurement of synergistic behavior as Y = YES; N = NO
$^\beta$ and $^\rho$Rate - g ai/ha

Example 18: Preemergence (PRE) Efficacy with 2,4 DC and Clomazone Tank-Mix Combinations In this example preemergence efficacy was studied when 2,4 DC and clomazone tank-mix combinations are applied at different rates against the following weeds: Annual bluegrass (*Poa annua*, POAAN); cheat (*Bromus secalinus*, BROSE); wild oat (*Avena fatua*, AVEFA); quackgrass (*Elymus repens*, AGRRE); field violet (*Viola arvensis*, VIOAR); blackgrass (*Alopecurus myosuroides*, ALOMY); littleseed canarygrass (*Phalaris minor*, PHAMI); silky windgrass (*Apera spica-venti*; APESP); yellow foxtail (*Setaria pumila*, SETPU); goosegrass (*Eleusine indica*, ELEIN)
Methods To determine PRE efficacy, four rates of 2,4 DC (36.7% CS) and three rates of clomazone (Command 3ME, 31.4%) were applied either alone or as tank-mix. 2,4 DC was applied at 0, 125, 170, 210, or 250 g ai/ha and clomazone was applied at 0, 60, 90, or 120 g ai/ha. Additional treatments included application of metazachlor (Butisan®, 43.1%) at 750 g ai/ha, napropamide (Devrinol DF®, 50%) at 1260 g ai/ha, and dimethachlor (Teridox®, 48%) at 1000 g ai/ha. A non-treated check was included as reference standard. Treatments were applied just after the seeding of annual bluegrass, cheat, wild oat, quackgrass, field violet, blackgrass, littleseed canarygrass, silky windgrass, yellow foxtail, and goosegrass. Plant species were planted in fiber flats (6"×10") containing Pennington soil and flats were watered well before application and watered lightly after application. Flats were watered and fertilized routinely after treatment application. Each treatment was replicated three times. Treatments were applied using compressed air track spray chamber at 30 GPA using a TeeJet 8001E nozzle at 40 PSI. Visual percent weed control was recorded at 14, 21, and 28 days after treatment using a scale of 0 (no control) to 100 (complete plant death). Raw Data (not included) were analyzed using Minitab statistical software at 95% confidence interval.

Results:

Out of twelve 2,4 DC and clomazone combinations, no combination gave control (≥85% injury) of annual bluegrass, blackgrass, or littleseed canarygrass. Three combinations suppressed (70-84% injury) field violet, quackgrass, and yellow foxtail, six combinations suppressed silky windgrass. Wild oat was controlled by five combinations, cheat by 10 combinations, and goosegrass was controlled by all tank-mix combinations.

Applied alone, 2,4 DC controlled goosegrass at ≥170 g ai/ha while clomazone controlled goosegrass at all rates and cheat at 120 g, other weeds were not controlled by either herbicide applied alone. Metazachlor controlled all weeds; napropamide controlled all weeds except blackgrass. Dimethachlor controlled annual bluegrass, quackgrass, littleseed canarygrass, silky windgrass, yellow foxtail, and goosegrass.

In summary, 2,4 DC alone provides good coverage against goosegrass. 2,4 DC plus clomazone combinations controlled (≥85%) goosegrass. Cheat was synergistically controlled by the tested combinations. Although wild oat was controlled by 5 combinations, the table below provides specific unexpected synergistic effects by the instant combinations. No combination controlled or suppressed annual bluegrass, blackgrass, or littleseed canarygrass.

| 2,4-DC + clomazone- Cheat-28 DAT | | | | | | | |
|---|---|---|---|---|---|---|---|
| Tmt | X | Y | Expected | observed | syn-ergy$^\alpha$ | 2,4-DC$^\beta$ | Comazone$^\rho$ |
| 1 | 6 | 40 | 43.6 | 67 | Y | 125 | 60 |
| 2 | 6 | 75 | 76.5 | 87 | Y | 125 | 90 |
| 3 | 6 | 97 | 97.18 | 97 | N | 125 | 120 |
| 4 | 11 | 40 | 46.6 | 76 | Y | 170 | 60 |
| 5 | 11 | 75 | 77.75 | 89 | Y | 170 | 90 |
| 6 | 11 | 97 | 97.33 | 98 | Y | 170 | 120 |
| 7 | 12 | 40 | 47.2 | 86 | Y | 210 | 60 |
| 8 | 12 | 75 | 78 | 92 | Y | 210 | 90 |
| 9 | 12 | 97 | 97.36 | 96 | N | 210 | 120 |
| 10 | 25 | 40 | 55 | 89 | Y | 250 | 60 |
| 11 | 25 | 75 | 81.25 | 95 | Y | 250 | 90 |
| 12 | 25 | 97 | 97.75 | 96 | N | 250 | 120 |

$^\alpha$measurement of synergistic behavior as Y = YES; N = NO
$^\beta$ and $^\rho$Rate - g ai/ha

| 2,4-DC + clomazone -Wild oat-28 DAT | | | | | | | |
|---|---|---|---|---|---|---|---|
| Tmt | X | Y | Expected | observed | syn-ergy$^\alpha$ | 2,4-DC$^\beta$ | Comazone$^\rho$ |
| 1 | 0 | 40 | 40 | 55 | Y | 125 | 60 |
| 2 | 0 | 47 | 47 | 86 | Y | 125 | 90 |
| 3 | 0 | 77 | 77 | 83 | Y | 125 | 120 |
| 4 | 0 | 40 | 40 | 72 | Y | 170 | 60 |
| 5 | 0 | 47 | 47 | 77 | Y | 170 | 90 |
| 6 | 0 | 77 | 77 | 91 | Y | 170 | 120 |
| 7 | 10 | 40 | 46 | 63 | Y | 210 | 60 |
| 8 | 10 | 47 | 52.3 | 87 | Y | 210 | 90 |
| 9 | 10 | 77 | 79.3 | 94 | Y | 210 | 120 |
| 10 | 20 | 40 | 52 | 59 | Y | 250 | 60 |
| 11 | 20 | 47 | 57.6 | 82 | Y | 250 | 90 |
| 12 | 20 | 77 | 81.6 | 88 | Y | 250 | 120 |

$^\alpha$measurement of synergistic behavior as Y = YES; N = NO
$^\beta$ and $^\rho$Rate - g ai/ha

Example 19: 2,4 DC Weed Efficacy and Crop Safety when Tank-Mixed with Diflufenican and Applied PRE In this example a greenhouse study was conducted to determine crop selectivity and weed efficacy when 2,4 DC is applied Preemergence (PRE) multiple rates alone or combined with diflufenican against the following weeds: Italian ryegrass (*Lolium perenne* L. ssp. *multiflorum*, LOLMU); corn poppy (*Papaver rhoeas*, PAPRH); wild oat (*Avena fatua*, AVEFA); annual bluegrass (*Poa annua*, POAAN); quackgrass (*Elymus repens*, AGRRE); cheat (*Bromus secalinus*, BROSE). In this study, the crops tested included Wheat, barley, and oil seed rape (OSR).

Methods:

To determine weed efficacy and wheat, barley or OSR selectivity, 2,4 DC (CS 36.7%) and Diflufenican (CS 19.5%) were applied preemergence either alone or as tank-mix partners at the following rates. 2,4 DC was applied at 125, 170, 210 and 250 g ai/ha while Diflufenican was applied at 50, 75, and 100 g ai/ha. Pyroxasulfone (KIH-485, 85%) at 74.3 g ai/ha, pendimethalin (Prowl 3.3EC, 37.4%) at 1200 g ai/ha, or a premix of chlorsulfuron plus metsulfuron-methyl (Report Extra, 75%) at 15.8 g ai/ha were applied as commercial standards. A non-treated check was included as reference standard.

All plants were direct seeded into 6×10" fiber flats utilizing Pennington soil. 2,4 DC and diflufenican were applied alone or combined as tank-mix at each rate mentioned below. Herbicides included as standards for comparison were pyroxasulfone, pendimethalin, and a pre mix of chlorsulfuron plus metsulfuron methyl, all applied at labeled rates as indicated above. Treatments were replicated 3 times. Flats were watered after seeding but prior to treatment. After application flats were placed in the greenhouse and lightly watered. Thereafter flats were watered and fertilized routinely. Treatments were applied with compressed air in a track spray chamber at 30 GPA using a TeeJet 8001E nozzle at 40 PSI. Visual percent weed control and crop safety were recorded at 14, 21, and 28 days after treatment (DAT), using a scale of 0 (no control/no injury) to 100 (complete plant death). Data (not included) were analyzed using Minitab statistical software at 95% confidence interval.

Results:

2,4 DC (36.7% CS) applied at 125 g ai/ha provided suppression (70-84% injury) to corn poppy, higher rates controlled (≥85% injury) corn poppy. No other weeds in this assay were controlled by any stand alone application of 2,4 DC. Wheat, barley, and oilseed rape (OSR) were safe (≤10% injury) with all stand alone treatments of 2,4 DC. 2,4 DC plus diflufenican as tank-mix controlled field violet with all combinations, corn poppy with 11 of 12 combinations, annual bluegrass with 7 combinations, and Italian ryegrass with 6 combinations. All combinations were safe on barley; wheat was moderately injured (12%) by only one tank-mix combination, while OSR was injured by all combinations of 2,4 DC plus diflufenican.

Herbicide standards tested to compare efficacy and safety included pyroxasulfone at 74.3 g, which controlled all weeds except field violet and was safe on wheat only; pendimethalin applied at 1200 g, controlled corn poppy and field violet and was safe on barley; and a pre-mix of chlorsulfuron plus metsulfuron methyl (Report Extra) at 15.8 g, which also controlled corn poppy and field violet, while providing selectivity to wheat.

In summary, 2,4 DC applied alone controlled corn poppy when applied ≥170 g ai/ha and was safe on all crops at all rates. Corn poppy and annual bluegrass were controlled with most combinations of 2,4 DC plus diflufenican, while field violet was controlled with all combinations. 2,4 DC plus diflufenican controlled Italian ryegrass with most combinations when 2,4 DC was applied at ≥210 g. Barley was not injured by any combination while wheat was moderately injured (12%) by one combination; oilseed rape was injured by all tank-mix combinations of 2,4 DC plus diflufenican. The tables below highlight the data analysis with concerning the unexpected synergistic effects of the tested combinations.

| | | | 2,4-DC + diflufenican- Italian ryegrass-28 DAT | | | | |
|---|---|---|---|---|---|---|---|
| Tmt | X | Y | Expected | observed | syn-ergy$^\alpha$ | 2,4-DC$^\beta$ | Diflufenican$^P$ |
| 1 | 22 | 1 | 22.78 | 47 | Y | 125 | 50 |
| 2 | 22 | 20 | 37.6 | 63 | Y | 125 | 75 |
| 3 | 22 | 55 | 64.9 | 70 | Y | 125 | 100 |
| 4 | 37 | 1 | 37.63 | 83 | Y | 170 | 50 |
| 5 | 37 | 20 | 49.6 | 70 | Y | 170 | 75 |
| 6 | 37 | 55 | 71.65 | 87 | Y | 170 | 100 |
| 7 | 47 | 1 | 47.53 | 73 | Y | 210 | 50 |
| 8 | 47 | 20 | 57.6 | 91 | Y | 210 | 75 |
| 9 | 47 | 55 | 76.15 | 93 | Y | 210 | 100 |
| 10 | 63 | 1 | 63.37 | 86 | Y | 250 | 50 |
| 11 | 63 | 20 | 70.4 | 87 | Y | 250 | 75 |
| 12 | 63 | 55 | 83.35 | 93 | Y | 250 | 100 |

$^\alpha$measurement of synergistic behavior as Y = YES; N = NO
$^\beta$Rate - g ai/ha

| | | | 2,4-DC + diflufenican- Annual bluegrass-28 DAT | | | | |
|---|---|---|---|---|---|---|---|
| Tmt | X | Y | Expected | observed | syn-ergy$^\alpha$ | 2,4-DC$^\beta$ | Diflufenican$^P$ |
| 1 | 0 | 57 | 57 | 83 | Y | 125 | 50 |
| 2 | 0 | 85 | 85 | 68 | N | 125 | 75 |
| 3 | 0 | 86 | 86 | 81 | N | 125 | 100 |
| 4 | 0 | 57 | 57 | 85 | Y | 170 | 50 |
| 5 | 0 | 85 | 85 | 75 | N | 170 | 75 |
| 6 | 0 | 86 | 86 | 92 | Y | 170 | 100 |
| 7 | 3 | 57 | 58.29 | 73 | Y | 210 | 50 |
| 8 | 3 | 85 | 85.45 | 88 | Y | 210 | 75 |
| 9 | 3 | 86 | 86.42 | 89 | Y | 210 | 100 |
| 10 | 13 | 57 | 62.59 | 89 | Y | 250 | 50 |
| 11 | 13 | 85 | 86.95 | 92 | Y | 250 | 75 |
| 12 | 13 | 86 | 87.82 | 90 | Y | 250 | 100 |

$^\alpha$measurement of synergistic behavior as Y = YES; N = NO
$^\beta$ and $^P$Rate - g ai/ha

Example 20: 2,4 DC Plus Dimethenamid-P-Preemergence (PRE) Weed Efficacy

In this example a greenhouse study was conducted to determine weed efficacy when 2,4 DC is applied PRE at multiple rates alone or combined with dimethenamid-P as preemergence treatment against the following weeds: Common lambsquarters (*Chenopodium album*, CHEAL); Canada thistle (*Cirsium arvense*, CIRAR); wild mustard (*Sinapis arvensis*, SINAR), shepherd's-purse (*Capsella bursa-pastoris*, CAPBU); redroot pigweed (*Amaranthus retroflexus*, AMARE); blackgrass (*Alopecurus myosuroides*, ALOMY), giant foxtail (*Setaria faberi*, SETFA); goosegrass (*Eleusine indica*, ELEIN); common chickweed (*Stellaria media*, STEME)

Materials:

Herbicides:

2,4 DC-21 (36.7% CS): 125, 170, 210, or 250 g ai/ha alone and as tank-mix with dimethenamid-P Dimethanamid-P (Outlook, 63.9%): 250, 375, 500 g ai/ha in combination with 2,4 DC and alone, additional treatment alone at 750 g ai/ha.

Metazachlor (Butisan 43.1%): 500 g ai/ha

Weeds:

Common lambsquarters

Canada thistle

Wild mustard

Shepherd's-purse

Redroot pigweed

Blackgrass

Giant foxtail

Goosegrass

Common chickweed

Methods:

All plants were direct seeded into 6×10" fiber flats utilizing Pennington soil. 2,4 DC and dimethenamid-P were applied alone or combined as tank-mix at each rate mentioned below. Herbicides included as standards for comparison were metazachlor plus dimethenamid-P (500 g) as tank mix combination. A non-treated check was included as reference standards. Treatments were replicated 3 times. Flats were watered after seeding but prior to treatment. After application flats were placed in the greenhouse and lightly watered. Thereafter flats were watered and fertilized routinely. Treatments were applied with compressed air in a track spray chamber at 30 GPA using a TeeJet 8001E nozzle at 40 PSI. Visual percent weed control was recorded at 14, 21, and 28 days after treatment (DAT), using a scale of 0 (no control) to 100 (complete plant death). Data were analyzed using Minitab statistical software at 95% confidence interval.

Results:

2,4 DC (36.7% CS) applied alone at 125 g ai/ha controlled (≥85% injury) Canada thistle, giant foxtail, goosegrass, and common chickweed; at 210 g shepherd's-purse was also controlled by 2,4 DC. All tank mix combinations of 2,4 DC plus dimethenamid-P controlled Canada thistle, giant foxtail, goosegrass, common chickweed, shepherd's-purse, and redroot pigweed. Common lambsquarters was controlled or suppressed (70-84% injury) when 2,4 DC was applied at 250 g as tank mix with any rate of dimethenamid-P. Wild mustard was suppressed with 4 tank-mix combinations; blackgrass was suppressed with one combination. Dimethenamid-P alone controlled redroot pigweed, giant foxtail, and goosegrass at all rates; common chickweed at ≥375 g; shepherd's-purse at ≥500 g; and Canada thistle at 750 g.

Common lambsquarters or wild mustard were suppressed by certain rates of dimethenamid-P alone, blackgrass was not controlled or suppressed by any rate of dimethenamid-P applied alone. The combination of metazachlor at 500 g plus dimethenamid-P at 500 g included for comparison controlled all weeds tested except wild mustard.

In summary, 2,4 DC applied alone controlled Canada thistle, giant foxtail, goosegrass, and common chickweed at all rates, shepherd's-purse was controlled at ≥210 g ai/ha. 2,4 DC tank-mixes with dimethenamid-P in all cases controlled all weeds previously mentioned in addition to redroot pigweed; common lambsquarters was controlled with certain combinations when 2,4 DC was applied at 250 g. The tables below highlight unexpected synergistic effects of the tested combinations.

| 2,4-DC + Dimethenamid-P- Common lambsquarters-28 DAT | | | | | | | |
|---|---|---|---|---|---|---|---|
| Tmt | X | Y | Expected | observed | syn-ergy [α] | 2,4-DC [β] | Dimethenamid [P] |
| 1 | 27 | 22 | 43.06 | 72 | Y | 125 | 250 |
| 2 | 27 | 43 | 58.39 | 55 | N | 125 | 375 |
| 3 | 27 | 84 | 88.32 | 68 | N | 125 | 500 |
| 4 | 28 | 22 | 43.84 | 68 | Y | 170 | 250 |
| 5 | 28 | 43 | 58.96 | 58 | N | 170 | 375 |
| 6 | 28 | 84 | 88.48 | 48 | N | 170 | 500 |
| 7 | 33 | 22 | 47.74 | 48 | Y | 210 | 250 |
| 8 | 33 | 43 | 61.81 | 55 | N | 210 | 375 |
| 9 | 33 | 84 | 89.28 | 75 | N | 210 | 500 |
| 10 | 62 | 22 | 70.36 | 83 | Y | 250 | 250 |
| 11 | 62 | 43 | 78.34 | 94 | Y | 250 | 375 |
| 12 | 62 | 84 | 93.92 | 86 | N | 250 | 500 |

[α] measurement of synergistic behavior as Y = YES; N = NO

[β] and [P] Rate - g ai/ha

| 2,4 DC + Dimethenamid-P-Shepherd's-purse-28 DAT | | | | | | | |
|---|---|---|---|---|---|---|---|
| Tmt | X | Y | Expected | observed | synergy | 2,4-DC | Dimethenamid [P] |
| 1 | 60 | 20 | 68 | 98 | Y | 125 | 250 |
| 2 | 60 | 58 | 83.2 | 98 | Y | 125 | 375 |
| 3 | 60 | 94 | 97.6 | 98 | Y | 125 | 500 |
| 4 | 68 | 20 | 74.4 | 96 | Y | 170 | 250 |
| 5 | 68 | 58 | 86.56 | 95 | Y | 170 | 375 |
| 6 | 68 | 94 | 98.08 | 96 | N | 170 | 500 |
| 7 | 86 | 20 | 88.8 | 96 | Y | 210 | 250 |
| 8 | 86 | 58 | 94.12 | 96 | Y | 210 | 375 |
| 9 | 86 | 94 | 99.16 | 98 | N | 210 | 500 |
| 10 | 95 | 20 | 96 | 99 | Y | 250 | 250 |
| 11 | 95 | 58 | 97.9 | 98 | Y | 250 | 375 |
| 12 | 95 | 94 | 99.7 | 98 | N | 250 | 500 |

α—measurement of synergistic behavior as Y = YES; N = NO

β and [P] Rate - g ai/ha

Example 21: 2,4 DC Weed Efficacy when Tank-Mixed with S-Metolachlor Preemergence (PRE) on European Weeds In this example a greenhouse study was conducted to determine weed efficacy when multiple rates of 2,4 DC are applied alone or as a tank-mix with S-metolachlor at various rates against weeds: Quackgrass (*Elymus repens*, AGREE) common chickweed (*Stellaria media*, STEME); velvetleaf (*Abutilon theophrasti*, ABUTH); yellow foxtail (*Setaria pumila*, SETLU); green foxtail (*Setaria viridis*, SETVI); common lambsquarters (*Chenopodium album*, CHEAL); bamyardgrass (*Echinochloa crus-galli*, ECHCG).

Methods:

2,4 DC (36.7% CS) was applied PRE at 0, 125, 170, 210, or 250 g ai/ha alone or as a tank-mix with S-metolachlor (Dual II Magnum®, 82.4%) at 0, 267, 534, 801, or 1070 g ai/ha. Pyroxasulfone plus fluthiacet-methyl (Anthem™, 23.3%) applied at 169.9 g ai/ha, and the tank-mix of mesotrione (Callisto®, 40%) at 123 g plus S-metolachlor (Dual II Magnum®, 82.4%) at 1252 g were included as standards for comparison. Quackgrass, common chickweed, velvetleaf, yellow foxtail, green foxtail, common lambsquarters, and bamyardgrass were direct seeded into 6"×10" fiber flats utilizing Pennington soil. Flats were watered after seeding but prior to treatment. After application flats were placed in the greenhouse and lightly watered. Thereafter flats were watered and fertilized routinely. Each treatment was replicated three times. Treatments were applied using compressed air in a track spray chamber at 40 psi and a spray volume of 30 GPA using a TeeJet 8001E nozzle. Visual percent weed control was recorded at 14, 21, and 28 days after treatment (DAT). Weed control was evaluated using a scale of 0 (no control) to 100 (complete plant death). Data (not included) were analyzed using Minitab statistical software at 95% confidence interval.

Results at 28 DAT:

2,4 DC applied alone controlled (≥85% injury) common chickweed at all rates, bamyardgrass at ≥210 g ai/ha, and green foxtail at 250 g. S-metolachlor applied alone controlled yellow foxtail, green foxtail, and barnyardgrass at all rates, quackgrass or common chickweed at ≥534 g, and common lambsquarters at ≥801 g. All 16 tankmixes of encapsulated 2,4 DC plus S-metolachlor controlled common chickweed, yellow foxtail, green foxtail, and bamyardgrass. Quackgrass was controlled by 10 tank-mix combinations; the other 6 combinations provided quackgrass suppression (in the range of 70-84% control).

Common lambsquarters was controlled by 13 combinations of 2,4 DC plus S-metolachlor, suppressed by 2 combinations, and not controlled by 1 combination. Velvetleaf was not control or suppressed by any treatment containing 2,4 DC or S-metolachlor, either alone or in combination. Both standards tested, the premix of fluthiacet-methyl plus pyroxasulfone (Anthem), or mesotrione plus S-metolachlor as tank-mix, controlled all weeds in this study.

In summary, 2,4 DC applied alone controlled common chickweed at all rates, bamyardgrass and green foxtail with certain rates, while other species were not controlled by 2,4 DC alone at any rate. S-metolachlor alone controlled yellow foxtail, green foxtail, and bamyardgrass at all rates; quackgrass, common chickweed, and common lambsquarters were controlled at certain rates. All tank-mix combinations of 2,4 DC plus S-metolachlor controlled common chickweed, yellow foxtail, green foxtail, and bamyardgrass; most combinations controlled common lambsquarters and quackgrass. The table below highlights unexpected synergistic effects of the tested combinations.

| 2,4 DC + S-metolachlor- Common lambsquarters-28 DAT | | | | | | | |
| Tmt | X | Y | Expected | observed | synergy[α] | 2,4-DC[β] | S-metolachlor[ρ] |
| --- | --- | --- | --- | --- | --- | --- | --- |
| 1 | 2 | 7 | 8.86 | 65 | Y | 125 | 267 |
| 2 | 2 | 75 | 75.5 | 85 | Y | 125 | 534 |
| 3 | 2 | 97 | 97.06 | 95 | N | 125 | 801 |
| 4 | 2 | 96 | 96.08 | 94 | N | 125 | 1070 |
| 5 | 2 | 7 | 8.86 | 75 | Y | 170 | 267 |
| 6 | 2 | 75 | 75.5 | 87 | Y | 170 | 534 |
| 7 | 2 | 97 | 97.06 | 94 | N | 170 | 801 |
| 8 | 2 | 96 | 96.08 | 96 | N | 170 | 1070 |
| 9 | 8 | 7 | 14.44 | 86 | Y | 210 | 267 |
| 10 | 8 | 75 | 77 | 89 | Y | 210 | 534 |
| 11 | 8 | 97 | 97.24 | 95 | N | 210 | 801 |
| 12 | 8 | 96 | 96.32 | 96 | N | 210 | 1070 |
| 13 | 8 | 7 | 14.44 | 82 | Y | 250 | 267 |
| 14 | 8 | 75 | 77 | 91 | Y | 250 | 534 |
| 15 | 8 | 97 | 97.24 | 96 | N | 250 | 801 |
| 16 | 8 | 96 | 96.32 | 96 | N | 250 | 1070 |

[α]measurement of synergistic behavior as Y = YES; N = NO
[β] and [ρ]Rate - g ai/ha

Example 22: 2,4 DC Weed Efficacy when Tank-Mixed with S-Metolachlor Preemergence (PRE) on Brazilian Weed Spectrum In this example a greenhouse study was conducted to determine weed efficacy when multiple rates of 2,4 DC are applied alone or as a tank-mix with S-metolachlor at various rates Preemergence against the following weeds: Johnsongrass (Sorghum halepense, SORHA); wild mustard (Sinapis arvensis, SINAR); Benghal dayflower (Commelina benghalensis, COMBE); prickly sida (Sida spinosa, SIDSP); hairy beggarticks (Bidens pilosa, BIDPI); morningglory (Ipomoea spp. IPO sp): common lambsquarters (Chenopodium album, CHEAL); goosegrass (Eleusine indica, ELEIN).

Materials and Methods 2,4 DC (36.7% CS) was applied PRE at 0, 125, 170, 210, or 250 g ai/ha alone or as a tank-mix with S-metolachlor (Dual II Magnum®, 82.4%) at 0, 267, 534, 801, or 1070 g ai/ha. Pyroxasulfone plus fluthiacet-methyl (Anthem™, 23.3%) applied at 169.9 g ai/ha, and the tank-mix of mesotrione (Callisto®, 40%) at 123 g plus S-metolachlor (Dual II Magnum®, 82.4%) at 1252 g were included as a standards for comparison. Johnsongrass, wild mustard, Benghal dayflower, prickly sida, hairy beggarticks, morningglory, common lambsquarters, and goosegrass were direct seeded into 6"×10" fiber flats utilizing Pennington soil. Flats were watered after seeding but prior to treatment. After application flats were placed in the greenhouse and lightly watered.

Thereafter flats were watered and fertilized routinely. Each treatment was replicated three times. Treatments were applied using compressed air in a track spray chamber at 40 psi and a spray volume of 30 GPA using a TeeJet 8001E nozzle. Visual percent weed control was recorded at 14, 21, and 28 days after treatment (DAT). Weed control was evaluated using a scale of 0 (no control) to 100 (complete plant death). Data were analyzed using Minitab statistical software at 95% confidence interval.

Results at 28 DAT:

2,4 DC applied alone controlled (≥85% injury) Johnsongrass at 210 g ai/ha, common lambsquarters at 250 g and goosegrass at all rates. 2,4 DC plus S-metolachlor as tank-mix controlled Johnsongrass, common lambsquarters, and goosegrass with all combinations, Benghal dayflower was controlled with 13 of 16 combinations, (the other 3 combinations provided control in the range of 70-84%). Eleven combinations gave fair control to prickly sida, while three combinations provided control. Five combinations controlled hairy beggarticks, and no combination controlled wild mustard or morningglory. S-metolachlor applied alone controlled Johnsongrass and goosegrass at all rates and controlled Benghal dayflower, prickly sida and common lambsquarters at 801 g. Mesotrione plus S-metolachlor as tank-mix controlled all weeds, the premix of fluthiacet-methyl plus pyroxasulfone controlled all weeds except hairy beggarticks.

In summary, 2,4 DC applied alone controlled goosegrass at all rates while controlling Johnsongrass and common lambsquarters at certain rates, other species were not controlled by 2,4 DC alone. S-metolachlor alone controlled Johnsongrass and goosegrass at all rates, Benghal dayflower, prickly sida, and common lambsquarters at certain rates. All tank-mix combinations controlled Johnsongrass, common lambsquarters, and goosegrass; most controlled Benghal dayflower while certain combinations controlled prickly sida and hairy beggarticks. Wild mustard and morningglory were not controlled by any treatment containing 2,4 DC or S-metolachlor. The tables below highlight unexpected synergistic effects of the tested combinations.

| 2,4-DC + S-metolachlor-Benghal dayflower-28 DAT | | | | | | |
|---|---|---|---|---|---|---|
| Tmt | X | Y | Expected | observed | synergy[α] | 2,4-DC[β] | S-metolachlor[ρ] |
| 1 | 8 | 67 | 69.64 | 84 | Y | 125 | 267 |
| 2 | 8 | 72 | 74.24 | 92 | Y | 125 | 534 |
| 3 | 8 | 94 | 94.48 | 95 | Y | 125 | 801 |
| 4 | 8 | 90 | 90.8 | 96 | Y | 125 | 1070 |
| 5 | 13 | 67 | 71.29 | 95 | Y | 170 | 267 |
| 6 | 13 | 72 | 75.64 | 94 | Y | 170 | 534 |
| 7 | 13 | 94 | 94.78 | 98 | Y | 170 | 801 |
| 8 | 13 | 90 | 91.3 | 98 | Y | 170 | 1070 |
| 9 | 43 | 67 | 81.19 | 82 | Y | 210 | 267 |
| 10 | 43 | 72 | 84.04 | 92 | Y | 210 | 534 |
| 11 | 43 | 94 | 96.58 | 95 | N | 210 | 801 |
| 12 | 43 | 90 | 94.3 | 96 | Y | 210 | 1070 |
| 13 | 40 | 67 | 80.2 | 80 | N | 250 | 267 |
| 14 | 40 | 72 | 83.2 | 93 | Y | 250 | 534 |
| 15 | 40 | 94 | 96.4 | 97 | Y | 250 | 801 |
| 16 | 40 | 90 | 94 | 96 | Y | 250 | 1070 |

[α]measurement of synergistic behavior as Y = YES; N = NO
[β] and [ρ]Rate - g ai/ha

| 2,4-DC + S-metolachlor- Hairy beggarticks-28 DAT | | | | | | |
|---|---|---|---|---|---|---|
| Tmt | X | Y | Expected | observed | synergy[α] | 2,4-DC[β] | S-metolachlor[ρ] |
| 1 | 37 | 40 | 62.2 | 40 | N | 125 | 267 |
| 2 | 37 | 50 | 68.5 | 40 | N | 125 | 534 |
| 3 | 37 | 52 | 69.76 | 65 | N | 125 | 801 |
| 4 | 37 | 62 | 76.06 | 53 | N | 125 | 1070 |
| 5 | 40 | 40 | 64 | 40 | N | 170 | 267 |
| 6 | 40 | 50 | 70 | 62 | N | 170 | 534 |
| 7 | 40 | 52 | 71.2 | 89 | Y | 170 | 801 |
| 8 | 40 | 62 | 77.2 | 91 | Y | 170 | 1070 |
| 9 | 50 | 40 | 70 | 53 | N | 210 | 267 |
| 10 | 50 | 50 | 75 | 63 | N | 210 | 534 |
| 11 | 50 | 52 | 76 | 77 | Y | 210 | 801 |
| 12 | 50 | 62 | 81 | 95 | Y | 210 | 1070 |
| 13 | 40 | 40 | 64 | 53 | N | 250 | 267 |
| 14 | 40 | 50 | 70 | 80 | Y | 250 | 534 |
| 15 | 40 | 52 | 71.2 | 90 | Y | 250 | 801 |
| 16 | 40 | 62 | 77.2 | 90 | Y | 250 | 1070 |

[α]measurement of synergistic behavior as Y = YES; N = NO
[β] and [ρ]Rate - g ai/ha

Example 23: Weed Efficacy and Sugarcane Selectivity when 2,4 DC Plus Sulfentrazone are Applied Premergence (PRE) as Tank-Mix In this example a greenhouse study was conducted to determine weed efficacy and sugarcane selectivity when 2,4 DC is applied PRE at multiple rates alone or combined with sulfentrazone as tank-mix against the following weeds: Large crabgrass (*Digitaria sanguinalis*, DIGSA); redroot pigweed (*Amaranthus retroflexus*, AMARE); yellow nutsedge (*Cyperus esculentus*, CYPES); hairy beggarticks (*Biden pilosa*, BIDPI); morningglory sp. (*Ipomoea* spp). The tested crop in this study was Sugarcane (CTC20).

Materials:
Herbicides:
2,4 DC (36% SC): 500, 750, or 1000 g ai/ha alone and as tank-mix with sulfentrazone Sulfentrazone (Spartan 4F, 39.6%): 210, 315, or 420 g ai/ha alone or in combination with 2,4 DC
Isoxaflutole (Balance Flexx, 20%): 85 g ai/ha
Mesotrione (Callisto, 40%): 105 g ai/ha
Clomazone (Command 3ME, 31.4%): 1120 g ai/ha
Weeds:
Large crabgrass
Yellow nutsedge Redroot pigweed
Hairy beggarticks
Morningglory sp
Crop:
Sugarcane (CTC20)

Methods:

All weeds were direct seeded into 6×10" fiber flats utilizing Pennington soil. Sugarcane was direct seeded into 6" plastic pots using 3-4" sugarcane setts, oriented bud up, with bud leaf shield removed. 2,4 DC and sulfentrazone were applied alone or combined as tank-mix at each rate mentioned below. Herbicides included as standards for comparison were isoxaflutole, mesotrione, and clomazone. Treatments were replicated 3 times. Flats were watered after seeding but prior to treatment. After application flats were placed in the greenhouse and lightly watered. Thereafter flats were watered and fertilized routinely. Treatments were applied with compressed air in a track spray chamber at 30 GPA using a TeeJet 8001E nozzle at 40 PSI. Visual percent weed control was recorded at 14, 21, and 28 days after treatment (DAT), using a scale of 0 (no control) to 100 (complete plant death). Visual percent sugarcane injury was recorded at 21 and 28 DAT, using a scale of 0 (no injury, observed as bleaching, stunting or necrosis) to 100 (complete plant death). Data were analyzed using Minitab statistical software at 95% confidence interval.

Results at 28 DAT:

2,4 DC (36% SC) applied alone at ≥500 g ai/ha controlled (≥85% injury) large crabgrass and redroot pigweed. 2,4 DC at 1000 g suppressed (70-84% injury) hairy beggarticks and morningglory. All tank mix combinations of 2,4 DC plus sulfentrazone controlled large crabgrass, yellow nutsedge, redroot pigweed, hairy beggarticks, and morningglory. Sulfentrazone alone controlled hairy beggarticks at 315 g; all other weeds were controlled with all rates of sulfentrazone. Mesotrione at 105 g controlled all weeds except morningglory, isoxaflutole at 85 g or clomazone at 1120 g controlled large crabgrass, redroot pigweed and hairy beggarticks. Sugarcane was safe (≤10% injury) with all treatments in this assay except isoxaflutole, which caused 12% injury.

The combination of 2,4 DC plus sulfentrazone provided good efficacy on all weeds while maintained crop selectivity. Other crop segments should be explored for weed spectrum and crop selectivity with these two herbicides.

In summary, 2,4 DC-4 SC applied alone controlled large crabgrass and redroot pigweed at all rates. All 2,4 DC tank-mix combinations with sulfentrazone controlled all weeds in the assay. Sugarcane was safe with all applications of 2,4 DC or sulfentrazone, alone or combined. The table below highlights unexpected synergistic effects of the tested combinations.

| 2,4 DC + sulfentrazone- Hairy beggarticks-28 DAT | | | | | | |
|---|---|---|---|---|---|---|
| Tmt | X | Y | Expected | observed | synergy[α] | 2,4-DC[β] | Sulfentrazone[ρ] |
| 1 | 47 | 62 | 79.86 | 97 | Y | 500 | 210 |
| 2 | 47 | 100 | 100 | 97 | N | 500 | 315 |
| 3 | 47 | 98 | 98.94 | 97 | N | 500 | 420 |
| 4 | 68 | 62 | 87.84 | 94 | Y | 750 | 210 |
| 5 | 68 | 100 | 100 | 97 | N | 750 | 315 |
| 6 | 68 | 98 | 99.36 | 97 | N | 750 | 420 |
| 7 | 77 | 62 | 91.26 | 95 | Y | 1000 | 210 |
| 8 | 77 | 100 | 100 | 100 | N | 1000 | 315 |
| 9 | 77 | 98 | 99.54 | 100 | Y | 1000 | 420 |

[α]measurement of synergistic behavior as Y = YES; N = NO
[β] and [ρ]Rate - g ai/ha

Example 24: PRE Efficacy of 2,4 DC and Pyroxasulfone Tank-Mix Combinations

In this example a greenhouse study was conducted to determine preemergence (PRE) efficacy of 2,4 DC and pyroxasulfone tank-mixes when 2,4 DC or pyroxasulfone are applied at different rates. The tested weeds include Giant foxtail (*Setaria faberi*, SETFA), green foxtail (*Setaria virdis*, SETVI), yellow foxtail (*Setaria pumila*, SETLU), black nightshade (*Solanum nigrum*, SOLNI), *kochia* (*Kochia scoparia*, KCHSC), redroot pigweed (*Amaranthus retroflexus*, AMARE), common ragweed (*Ambrosia artemisiifolia*, AMBEL), barnyardgrass (*Echinochloa crus-galli*, ECHCG), large crabgrass (*Digitaria sanguinalis*, DIGSA).

Materials and Methods

To determine PRE efficacy, five levels of 2,4 DC-21 (36.7% CS) 0, 125, 170, 210, or 250 g ai/ha and five levels of pyroxasulfone (KIH485-85WG) 0, 50, 65, 80, or 95 g ai/ha were applied either alone or as tank-mix. Additional treatments consisted of premix of pyroxasulfone plus fluthiacet-methyl (Anthem™ 23.3%) at 169.9 g ai/ha, S-metolachlor (Dual II Magnum®, 82.4%) at 1388 g, and tank-mix of mesotrione (Callisto®, 40%) at 123 g plus S-metolachlor at 1252 g. A non-treated check was included as reference standard. Treatments were applied as before the emergence of black nightshade, giant foxtail, green foxtail, yellow foxtail, large crabgrass, *kochia*, redroot pigweed, common ragweed, and bamyardgrass. Weed species were planted in fiber flats (6"×10") containing Pennington soil and flats were watered well before application and watered lightly after application. Flats were watered and fertilized routinely after treatment application. Each treatment was replicated three times. Treatments were applied using compressed air track spray chamber at 30 GPA using a TeeJet 8001E nozzle at 40 PSI. Visual percent weed control data were recorded at 14, 21, and 28 days after treatment using a scale of 0 (no control) to 100 (complete plant death). Data (not included) were analyzed using Minitab statistical software at 95% confidence interval.

Results:

All sixteen combinations controlled (≥85%) black nightshade, *kochia*, redroot pigweed, bamyardgrass, large crabgrass, giant foxtail, green foxtail, and yellow foxtail. Out of 16 combinations, 14 combinations gave control of common ragweed. 2,4 DC alone controlled *kochia* at 210 g ai/ha, barnyardgrass and large crabgrass at 125 g, giant foxtail and green foxtail at 170 g. Regardless of rates, pyroxasulfone controlled all species except common ragweed which was not controlled at any rate. Premix of pyroxasulfone plus fluthiacet-methyl and tank-mix of mesotrione plus S-metolachlor controlled all species. S-metolachlor controlled black nightshade, redroot pigweed, bamyardgrass, large crabgrass, and all three foxtail species.

In summary, nearly all combinations performed effectively (≥85% control) on all weed species. 2,4 DC alone gave control of *kochia* at 210 g ai/ha and controlled all grass species except yellow foxtail at 170 g. Pyroxasulfone at all rates controlled all weeds except common ragweed. The table below highlights analyzed data for the unexpected synergistic effects of the tested combinations

| 2,4-DC + pyroxasulfone- Pitted morningglory-28 DAT | | | | | | | |
|---|---|---|---|---|---|---|---|
| Tmt | X | Y | Expected | observed | synergy[α] | 2,4-DC[β] | pyroxasulfone[ρ] |
| 2 | 10 | 73 | 75.7 | 96 | Y | 125 | 50 |
| 3 | 10 | 95 | 95.5 | 77 | N | 125 | 65 |

-continued

| 2,4-DC + pyroxasulfone- Pitted morningglory-28 DAT | | | | | | | |
|---|---|---|---|---|---|---|---|
| Tmt | X | Y | Expected | observed | synergy[α] | 2,4-DC[β] | pyroxasulfone[ρ] |
| 4 | 10 | 97 | 97.3 | 97 | N | 125 | 80 |
| 5 | 10 | 100 | 100 | 98 | N | 125 | 95 |
| 6 | 28 | 73 | 80.56 | 95 | Y | 170 | 50 |
| 7 | 28 | 95 | 96.4 | 97 | Y | 170 | 65 |
| 8 | 28 | 97 | 97.84 | 98 | Y | 170 | 80 |
| 9 | 28 | 100 | 100 | 83 | N | 170 | 95 |
| 10 | 17 | 73 | 77.59 | 17 | N | 210 | 50 |
| 11 | 17 | 95 | 95.85 | 91 | N | 210 | 65 |
| 12 | 17 | 97 | 97.51 | 99 | Y | 210 | 80 |
| 13 | 17 | 100 | 100 | 95 | N | 210 | 95 |
| 14 | 27 | 73 | 80.29 | 98 | Y | 250 | 50 |
| 15 | 27 | 95 | 96.35 | 100 | Y | 250 | 65 |
| 16 | 27 | 97 | 97.81 | 92 | N | 250 | 80 |
| 17 | 27 | 100 | 100 | 97 | N | 250 | 95 |

[α]measurement of synergistic behavior as Y = YES; N = NO

[β] and [ρ]Rate - g ai/ha

| 2,4-DC + pyroxasulfone-PRE Johnsongrass-28 DAT | | | | | | | |
|---|---|---|---|---|---|---|---|
| Tmt | X | Y | Expected | observed | synergy[α] | 2,4-DC[β] | pyroxasulfone[ρ] |
| 2 | 14 | 69 | 73.34 | 100 | Y | 125 | 50 |
| 3 | 17 | 100 | 100 | 100 | N | 125 | 65 |
| 4 | 23 | 100 | 100 | 100 | N | 125 | 80 |
| 5 | 33 | 100 | 100 | 100 | N | 125 | 95 |
| 6 | 14 | 69 | 73.34 | 100 | Y | 170 | 50 |
| 7 | 17 | 100 | 100 | 100 | N | 170 | 65 |
| 8 | 23 | 100 | 100 | 100 | N | 170 | 80 |
| 9 | 33 | 100 | 100 | 100 | N | 170 | 95 |
| 10 | 14 | 69 | 73.34 | 0 | N | 210 | 50 |
| 11 | 17 | 100 | 100 | 100 | N | 210 | 65 |
| 12 | 23 | 100 | 100 | 100 | N | 210 | 80 |
| 13 | 33 | 100 | 100 | 100 | N | 210 | 95 |
| 14 | 14 | 69 | 73.34 | 100 | Y | 250 | 50 |
| 15 | 17 | 100 | 100 | 100 | N | 250 | 65 |
| 16 | 23 | 100 | 100 | 100 | N | 250 | 80 |
| 17 | 33 | 100 | 100 | 100 | N | 250 | 95 |

[α]measurement of synergistic behavior as Y = YES; N = NO

[β] and [ρ]Rate - g ai/ha

| 2,4-DC + pyroxasulfone Quackgrass-28 DAT | | | | | | | |
|---|---|---|---|---|---|---|---|
| Tmt | X | Y | Expected | observed | synergy[α] | 2,4-DC[β] | pyroxasulfone[ρ] |
| 1 | 1 | 23 | 23.77 | 83 | Y | 125 | 50 |
| 2 | 1 | 35 | 35.65 | 83 | Y | 125 | 65 |
| 3 | 1 | 70 | 70.3 | 85 | Y | 125 | 80 |
| 4 | 1 | 85 | 85.15 | 92 | Y | 125 | 95 |
| 5 | 3 | 23 | 25.31 | 89 | Y | 170 | 50 |
| 6 | 3 | 35 | 36.95 | 83 | Y | 170 | 65 |
| 7 | 3 | 70 | 70.9 | 89 | Y | 170 | 80 |
| 8 | 3 | 85 | 85.45 | 92 | Y | 170 | 95 |
| 9 | 13 | 23 | 33.01 | 0 | N | 210 | 50 |
| 10 | 13 | 35 | 43.45 | 90 | Y | 210 | 65 |
| 11 | 13 | 70 | 73.9 | 83 | Y | 210 | 80 |
| 12 | 13 | 85 | 86.95 | 88 | Y | 210 | 95 |
| 13 | 15 | 23 | 34.55 | 78 | Y | 250 | 50 |
| 14 | 15 | 35 | 44.75 | 85 | Y | 250 | 65 |
| 15 | 15 | 70 | 74.5 | 86 | Y | 250 | 80 |
| 16 | 15 | 85 | 87.25 | 93 | Y | 250 | 95 |

[α]measurement of synergistic behavior as Y = YES; N = NO

[β] and [ρ]Rate - g ai/ha

Example 25: 2,4 DC Weed Efficacy and Crop Selectivity when Tank-Mixed with Pyroxasulfone Preemergence (PRE)

In this example a greenhouse study was conducted to determine weed efficacy and crop selectivity with multiple rates of 2,4 DC applied alone or as a tank-mix with pyroxasulfone at various rates PRE against Jimsonweed (*Datura stramonium*, DATST); wild poinsettia (*Euphorbia hetero-phylla*, EUHHL), hairy beggarticks (*Bidens pilosa*, BIDPI); black nightshade (*Solanum nigrum*, SOLNI). The crop tested in this study was Corn.

Materials and Methods:

2,4 DC-21 (36.7% CS) was applied PRE at 0, 125, 170, 210, or 250 g ai/ha alone or as a tank-mix with pyroxasulfone (KIH-485, 85% WP) at 0, 50, 65, 80, or 95 g ai/ha. Pyroxasulfone plus fluthiacet-methyl (Anthem™, 23.3%) applied at 169.9 g ai/ha, s-metolachlor (Dual II Magnum®, 82.4%) applied at 1389 g, and the tank-mix of mesotrione (Callisto®, 40%) at 123 g plus s-metolachlor (Dual II Magnum®, 82.4%) at 1252 g were included as a standards for comparison. A non-treated check was included as reference standard. Jimsonweed, wild poinsettia, hairy beggarticks, black nightshade, and corn were direct seeded into 6"×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 40 psi and a spray volume of 30 GPA using a TeeJet 8001E nozzle. Visual percent weed control and crop injury data were recorded at 14, 21, and 28 days after treatment (DAT). Weed control was evaluated using a scale of 0 (no control) to 100 (complete plant death). Crop injury was evaluated for bleaching, stunting and necrosis, using a scale of 0 (no injury) to 100 (complete plant death). Data (not included) were analyzed using Minitab statistical software at 95% confidence interval.

Results:

2,4 DC applied alone controlled (≥85% injury) black nightshade at 170 g ai/ha, did not provide control of other weeds tested when applied alone at any rate, and was safe on corn at all rates. 2,4 DC plus pyroxasulfone controlled black nightshade with all tank-mix combinations, controlled Jimsonweed with all except one combination, controlled wild poinsettia with two combinations and hairy beggarticks with one combination. No tank-mix combination caused bleaching injury (≥10%) to corn, 7 combinations caused moderate (11-20%) stunting to corn and 3 combinations caused severe stunting (≥20%) to corn. No tank-mix combination of 2,4 DC plus pyroxasulfone caused necrosis greater than 10%. When total combined injury was considered, (percent bleaching+percent stunting+percent necrosis) only one tank-mix combination was safe on corn; 5 combinations were moderately safe while 10 combinations caused severe injury to corn. Fluthiacet-methyl plus pyroxasulfone controlled Jimsonweed and black nightshade and caused severe stunting to corn. S-metolachlor controlled only black nightshade and also caused severe stunting to corn. Mesotrione plus s-metolachlor controlled all weeds tested and caused moderate stunting to corn.

In summary, 2,4 DC applied alone controlled black nightshade with most rates; other weeds were not controlled by 2,4 DC alone. 2,4 DC plus pyroxasulfone controlled black nightshade with all applications, Jimsonweed with most combinations, and wild poinsettia or hairy beggarticks with certain tank-mix applications. All rates of 2,4 DC alone were safe on corn, tank-mixes of 2,4 DC plus pyroxasulfone injured corn with most applications. The table below highlights the analyzed data for unexpected synergistic effects of the tested combinations.

| 2,4-DC + pyroxasulfone- Jimsonweed-28 DAT | | | | | | | |
|---|---|---|---|---|---|---|---|
| Tmt | X | Y | Expected | observed | synergy[α] | 2,4-DC[β] | pyroxasulfone[ρ] |
| 1 | 40 | 60 | 76 | 77 | Y | 125 | 50 |
| 2 | 40 | 70 | 82 | 91 | Y | 125 | 65 |
| 3 | 40 | 85 | 91 | 94 | Y | 125 | 80 |
| 4 | 40 | 85 | 91 | 95 | Y | 125 | 95 |
| 5 | 47 | 60 | 78.8 | 91 | Y | 170 | 50 |
| 6 | 47 | 70 | 84.1 | 92 | Y | 170 | 65 |
| 7 | 47 | 85 | 92.05 | 93 | Y | 170 | 80 |
| 8 | 47 | 85 | 92.05 | 96 | Y | 170 | 95 |
| 9 | 70 | 60 | 88 | 91 | Y | 210 | 50 |
| 10 | 70 | 70 | 91 | 95 | Y | 210 | 65 |
| 11 | 70 | 85 | 95.5 | 93 | N | 210 | 80 |
| 12 | 70 | 85 | 95.5 | 92 | N | 210 | 95 |
| 13 | 73 | 60 | 89.2 | 98 | Y | 250 | 50 |
| 14 | 73 | 70 | 91.9 | 96 | Y | 250 | 65 |
| 15 | 73 | 85 | 95.95 | 97 | Y | 250 | 80 |
| 16 | 73 | 85 | 95.95 | 98 | Y | 250 | 95 |

[α]measurement of synergistic behavior as Y = YES; N = NO
[β] and [ρ]Rate - g ai/ha

| 2,4-DC + pyroxasulfone-PRE- Wild poinsettia-28 DAT | | | | | | | |
|---|---|---|---|---|---|---|---|
| Tmt | X | Y | Expected | observed | synergy[α] | 2,4-DC[β] | pyroxasulfone[ρ] |
| 1 | 2 | 40 | 41.2 | 17 | N | 125 | 50 |
| 2 | 2 | 47 | 48.06 | 13 | N | 125 | 65 |
| 3 | 2 | 60 | 60.8 | 83 | Y | 125 | 80 |
| 4 | 2 | 79 | 79.42 | 97 | Y | 125 | 95 |
| 5 | 7 | 40 | 44.2 | 10 | N | 170 | 50 |
| 6 | 7 | 47 | 50.71 | 50 | N | 170 | 65 |
| 7 | 7 | 60 | 62.8 | 80 | Y | 170 | 80 |
| 8 | 7 | 79 | 80.47 | 83 | Y | 170 | 95 |
| 9 | 38 | 40 | 62.8 | 20 | N | 210 | 50 |
| 10 | 38 | 47 | 67.14 | 87 | Y | 210 | 65 |
| 11 | 38 | 60 | 75.2 | 30 | N | 210 | 80 |
| 12 | 38 | 79 | 86.98 | 57 | N | 210 | 95 |
| 13 | 47 | 40 | 68.2 | 12 | N | 250 | 50 |
| 14 | 47 | 47 | 71.91 | 40 | N | 250 | 65 |
| 15 | 47 | 60 | 78.8 | 53 | N | 250 | 80 |
| 16 | 47 | 79 | 88.87 | 83 | N | 250 | 95 |

[α]measurement of synergistic behavior as Y = YES; N = NO
[β] and [ρ]Rate - g ai/ha

| 2,4-DC + pyroxasulfone- Hairy beggarticks-28 DAT | | | | | | | |
|---|---|---|---|---|---|---|---|
| Tmt | X | Y | Expected | observed | synergy[α] | 2,4-DC[β] | pyroxasulfone[ρ] |
| 1 | 35 | 47 | 65.55 | 83 | Y | 125 | 50 |
| 2 | 35 | 63 | 75.95 | 78 | Y | 125 | 65 |
| 3 | 35 | 60 | 74 | 85 | Y | 125 | 80 |
| 4 | 35 | 75 | 83.75 | 82 | N | 125 | 95 |
| 5 | 50 | 47 | 73.5 | 72 | N | 170 | 50 |
| 6 | 50 | 63 | 81.5 | 74 | N | 170 | 65 |
| 7 | 50 | 60 | 80 | 77 | N | 170 | 80 |
| 8 | 50 | 75 | 87.5 | 73 | N | 170 | 95 |
| 9 | 57 | 47 | 77.21 | 84 | Y | 210 | 50 |
| 10 | 57 | 63 | 84.09 | 67 | N | 210 | 65 |
| 11 | 57 | 60 | 82.8 | 81 | N | 210 | 80 |
| 12 | 57 | 75 | 89.25 | 83 | N | 210 | 95 |
| 13 | 52 | 47 | 74.56 | 82 | Y | 250 | 50 |
| 14 | 52 | 63 | 82.24 | 65 | N | 250 | 65 |
| 15 | 52 | 60 | 80.8 | 60 | N | 250 | 80 |
| 16 | 52 | 75 | 88 | 70 | N | 250 | 95 |

[α]measurement of synergistic behavior as Y = YES; N = NO
[β] and [ρ]Rate - g ai/ha

Example 26: Preemergence (PRE) Efficacy of 2,4 DC and Sulfentrazone Combinations on Sedges In this example a greenhouse study was conducted to determine the sedge control when 2,4 DC or sulfentrazone are applied alone or in combination against Yellow nutsedge (*Cyperus esculentus*, CYPES), purple nutsedge (*Cyperus rotundus*, CYPRO), benghal dayflower (*Commelina benghalensis*, COMBE)

Materials and Methods:

To evaluate efficacy of 2,4 DC (36% SC) and sulfentrazone (Spartan 4F®, 39.6%) combinations on sedges, 2,4 DC at 50, 100, or 200 g ai/ha was applied as tank-mix with sulfentrazone at 105, 210, or 315 g ai/ha. Each herbicide was applied alone at the given rates and 2,4 DC alone at 400 g and clomazone (Command 3ME® 31.4%) at 100 g plus sulfentrazone at 315 g were applied as additional treatments. A non-treated check was included as reference standard. Treatments were applied at the time of planting to yellow nutsedge, purple nutsedge, and benghal dayflower. Plant species were planted in fiber flats containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control was recorded at 14, 21, and 28 days after treatment (DAT) using a scale of 0 (no control) to 100 (complete plant death). Data (not included) were analyzed using Minitab statistical software at 95% confidence interval.

Results:

When 2,4 DC and sulfentrazone were applied together, seven out of nine tank-mix combinations provided yellow nutsedge control at 28 DAT. 2,4 DC at all rates when applied with sulfentrazone at 315 g provided control of purple nutsedge. In most cases, benghal dayflower was controlled with combination when sulfentrazone was applied at 210 or 315 g 2,4 DC alone did not provide control of sedges at any rate except benghal dayflower at 400 g. Sulfentrazone alone controlled yellow nutsedge at all rates, benghal dayflower at 210 or 315 g and did not control purple nutsedge at any rate. Clomazone and sulfentrazone combination controlled all three sedges at 28 DAT.

In summary, 2,4 DC plus sulfentrazone combinations controlled yellow nutsedge in most cases while only three combinations controlled purple nutsedge. Benghal dayflower control was noted with tank-mix combination when sulfentrazone was applied at 315 g ai/ha. 2,4 DC alone gave control of Benghal dayflower at 400 g only. The following table highlights the unexpected synergistic results observed in the tested combination against purple nutsedge.

| 2,4 DC + sulfentrazone-PRE- Purple nutsedge-28 DAT | | | | | | | |
|---|---|---|---|---|---|---|---|
| Tmt | X | Y | Expected | observed | synergy[a] | 2,4 DC[β] | Sulfentrazone[ρ] |
| 1 | 7 | 77 | 78.61 | 70 | N | 50 | 105 |
| 2 | 7 | 77 | 78.61 | 77 | N | 50 | 210 |
| 3 | 7 | 83 | 84.19 | 87 | Y | 50 | 315 |
| 4 | 7 | 77 | 78.61 | 65 | N | 100 | 105 |
| 5 | 7 | 77 | 78.61 | 84 | Y | 100 | 210 |
| 6 | 7 | 83 | 84.19 | 85 | Y | 100 | 315 |
| 7 | 20 | 77 | 81.6 | 60 | N | 200 | 105 |
| 8 | 20 | 77 | 81.6 | 73 | N | 200 | 210 |
| 9 | 20 | 83 | 86.4 | 90 | Y | 200 | 315 |

[a]measurement of synergistic behavior as Y = YES; N = NO
[β] and [ρ]Rate - g ai/ha

Example 27: Tank-Mix Weed Efficacy/Crop Selectivity of 2,4 DC with Metazachlor In this example a greenhouse study was conducted to determine the weed efficacy/crop selectivity of 2,4 DC with metazachlor preemergence (PRE). The weeds tested in this study were Italian ryegrass (*Lolium perenne. multiflorum*, LOLMU), wild mustard (*Sinapis arvensis*, SINAR), annual bluegrass (*Poa annua* POAAN), wild oat (*Avena fatua*, AVEFA), blackgrass (*Alopecurus myosuroides*, ALOMY), common lambsquarters (*Chenopodium album* CHEAL), littleseed canarygrass (*Phalaris minor*, PHAMI), common chickweed (*Stellaria media*, STEME), corn poppy (*Papaver rhoeas* PAPRH). The crops tested were Wheat and canola.

Materials and Methods

To determine PRE weed efficacy and crop selectivity, 2,4 DC (36% SC) was applied alone at 31.25, 62.5, 125, 250 or 375 or in combination with metazachlor (Butisan® S 43.1%) at 250, 500, and 750 g ai/ha. Other treatments included the single application of metazachlor at rate mentioned previously, tank-mix of clomazone plus metazachlor at 250+750 g, and a premix of clomazone plus metazachlor at 100 g ai/ha. Treatments were applied before the emergence of Italian ryegrass, wild oat, blackgrass, littleseed canarygrass, common chickweed, common lambsquarters, corn poppy, wild mustard, annual bluegrass, canola, and wheat. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data (not included) were analyzed using Minitab statistical software at 95% confidence interval. Wheat and corn poppy were rated at 14 and 21 DAT only.

Results:

In this study 2,4 DC when administered alone provided good control of blackgrass at 375 g; controlled Italian ryegrass at ≥125 g and common chickweed at all rates. Metazachlor alone controlled blackgrass at 750 g and further controlled annual bluegrass, Italian ryegrass, lambsquarters, littleseed canarygrass, and common chickweed at all rates. When administered together, all fifteen combinations 2,4 DC in combination with Metazachlor controlled corn poppy, annual bluegrass, Italian ryegrass, lambsquarters, littleseed canarygrass, and common chickweed. Out of 15 combinations, wild oat and blackgrass were controlled by 6 and 8 combinations, respectively. All combinations caused severe injury to wheat (>60%) at 21 DAT and to canola at 28 DAT. No combination yielded control of wild mustard.

Clomazone and Metazachlor (Tank-mix) controlled annual bluegrass, Italian ryegrass, littleseed canary grass, lambsquarters, and chickweed. Clomazone and Metazachlor (Premix) however provided control of annul bluegrass, Italian ryegrass, lambsquarters, littleseed canarygrass, and chickweed.

In summary, all 2,4 DC and metazachlor combinations completely controlled corn poppy, annual bluegrass, Italian ryegrass, lambsquarters, littleseed canarygrass, and common chickweed at 28 DAT. Control of wild oat and blackgrass was noted with nearly half of the combinations. All combinations resulted in high injury to wheat at 21 DAT and to canola at 28 DAT. 2,4 DC alone gave control of chickweed at all rates, Italian ryegrass at 125 g and blackgrass at 375 g. The following tables highlight the unexpected synergistic results observed in the tested combinations.

| 2,4-DC + metazachlor-Wild oat-28 DAT | | | | | | |
|---|---|---|---|---|---|---|
| Tmt | X | Y | Expected | observed | synergy$^\alpha$ | 2,4-DC$^\beta$ | Metazachlor$^\rho$ |
| 1 | 18 | 53 | 61.46 | 53 | N | 31.25 | 250 |
| 2 | 18 | 73 | 77.86 | 77 | N | 31.25 | 500 |
| 3 | 18 | 80 | 83.6 | 87 | Y | 31.25 | 750 |
| 4 | 27 | 53 | 65.69 | 60 | N | 62.5 | 250 |
| 5 | 27 | 73 | 80.29 | 75 | N | 62.5 | 500 |
| 6 | 27 | 80 | 85.4 | 85 | N | 62.5 | 750 |
| 7 | 37 | 53 | 70.39 | 65 | N | 125 | 250 |
| 8 | 37 | 73 | 82.99 | 78 | N | 125 | 500 |
| 9 | 37 | 80 | 87.4 | 87 | N | 125 | 750 |
| 10 | 55 | 53 | 78.85 | 72 | N | 250 | 250 |
| 11 | 55 | 73 | 87.85 | 80 | N | 250 | 500 |
| 12 | 55 | 80 | 91 | 90 | N | 250 | 750 |
| 13 | 43 | 53 | 73.21 | 75 | Y | 375 | 250 |
| 14 | 43 | 73 | 84.61 | 85 | Y | 375 | 500 |
| 15 | 43 | 80 | 88.6 | 95 | Y | 375 | 750 |

$^\alpha$measurement of synergistic behavior as Y = YES; N = NO
$^\beta$ and $^\rho$Rate - g ai/ha

| 2,4-DC + metazachlor-PRE-Blackgrass- 28 DAT | | | | | | |
|---|---|---|---|---|---|---|
| Tmt | X | Y | Expected | observed | synergy $^\alpha$ | 2,4-DC$^\beta$ | Metazachlor$^\rho$ |
| 1 | 13 | 77 | 79.99 | 47 | N | 31.25 | 250 |
| 2 | 13 | 83 | 85.21 | 70 | N | 31.25 | 500 |
| 3 | 13 | 93 | 93.91 | 95 | Y | 31.25 | 750 |
| 4 | 25 | 77 | 82.75 | 67 | N | 62.5 | 250 |
| 5 | 25 | 83 | 87.25 | 78 | N | 62.5 | 500 |
| 6 | 25 | 93 | 94.75 | 85 | N | 62.5 | 750 |
| 7 | 62 | 77 | 91.26 | 67 | N | 125 | 250 |
| 8 | 62 | 83 | 93.54 | 87 | N | 125 | 500 |
| 9 | 62 | 93 | 97.34 | 83 | N | 125 | 750 |
| 10 | 83 | 77 | 96.09 | 78 | N | 250 | 250 |
| 11 | 83 | 83 | 97.11 | 98 | Y | 250 | 500 |
| 12 | 83 | 93 | 98.81 | 88 | N | 250 | 750 |
| 13 | 92 | 77 | 98.16 | 88 | N | 375 | 250 |
| 14 | 92 | 83 | 98.64 | 100 | Y | 375 | 500 |
| 15 | 92 | 93 | 99.44 | 99 | N | 375 | 750 |

$^\alpha$ measurement of synergistic behavior as Y = YES; N = NO
$^\beta$ and $^\rho$Rate - g ai/ha

Example 28: Weed Efficacy/Crop Selectivity with Tank-Mix Combinations of 2,4 DC and Metazachlor Plus Napropamide Preemergence (PRE)

In this example a greenhouse study was conducted to determine the weed efficacy/crop selectivity when 2,4 DC or metazachlor plus napropamide when these herbicides are applied alone or in three-way combination. The tested weeds in this study are redroot pigweed (*Amaranth retroflexus*, AMARE), Italian ryegrass (*Lolium perenne. multiflorum*, LOLMU), wild mustard (*Sinapis arvensis*, SINAR), annual bluegrass (*Poa annua*, POAAN), wild oat (*Avena fatua*, AVEFA), blackgrass (*Alopecurus myosuroides*, ALOMY), common lambsquarters (*Chenopodium album*, CHEAL), littleseed canarygrass (*Phalaris minor*, PHAMI), common chickweed (*Stellaria media*, STEME), corn poppy (*Papaver rhoeas*, PAPRH), and silky windgrass (*Apera spica-venti*, APESV). The tested crops are wheat and canola.

Materials and Methods

To determine the efficacy and crop selectivity with 2,4 DC or its potential tank-mix partners, 2,4 DC or metazachlor plus napropamide were applied either alone or in three-way combinations at the following rates: 2,4 DC (36% SC) at 50, 100, or 200 g ai/ha; Metazachlor (43.1% Butisan® S) at 250, 500, or 750 g ai/ha; and Napropamide (Devrinol® 50DF) at 315 g ai/ha. Additionally, 2,4 DC was applied alone at 400 g ai/ha. Other treatments included tank-mix application of clomazone (Command 3ME®31.4%) plus metazachlor plus napropamide at 100+750+315 g ai/ha and an application of clomazone (2.13%) plus metazachlor (13%) plus napropamide (13.6%) premix at 1572 g ai/ha. A non-treated check was included as reference standard.

Treatments were applied before the emergence of redroot pigweed, Italian ryegrass, wild oat, blackgrass, littleseed canarygrass, common chickweed, common lambsquarters, corn poppy, wild mustard, annual bluegrass, silky windgrass, canola, and wheat. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data (not included) were analyzed using Minitab statistical software at 95% confidence interval.

Results at 28 DAT:

2,4 DC/Metazachlor/Napropamide at all three-way combinations provided good control of redroot pigweed, corn poppy, Italian ryegrass, annual bluegrass, wild oat, lambsquarters, canarygrass, chickweed and silky windgrass. Blackgrass was controlled with eight combinations. No combination was safe on wheat and canola.

2,4 DC alone provided control of pigweed and corn poppy at 400 g, Italian ryegrass at ≥200 g, blackgrass and lambsquarters at 400 g, and chickweed at all rates. 2,4 DC caused greater than 10% injury to canola at all rates and 2,4 DC was safe on wheat up to 200 g ai/ha.

Metazachlor plus Napropamide at all combinations provided control of nearly all species at all rates except mustard with metazachlor at ≤500 g and napropamide at 315 g and wild oat and blackgrass at the lowest rates of the combination. No combination was safe on canola and wheat.

Clomazone/Metazachlor/Napropamide three-way (tank-mix/premix) provided Control of all species except wild mustard and blackgrass that were not controlled with premix. Both tank-mix and premix caused severe injury to wheat and canola.

In summary, all 2,4 DC plus metazachlor plus napropamide combinations completely controlled redroot pigweed, corn poppy, Italian ryegrass, annual bluegrass, wild oat, common lambsquarters, littleseed canarygrass, common chickweed, and silky windgrass at 28 DAT. Blackgrass control with eight combinations was greater than or equal to 85%. Injury to wheat was severe with all combinations. 2,4 DC alone controlled pigweed, poppy, blackgrass, lambsquarters at 400 g, Italian ryegrass at 200 g and chickweed at all rates. Metazachlor plus napropamide gave similar control/crop injury as compared to three-way combinations. The following tables highlight the unexpected synergistic results observed in the tested combinations.

| 2,4-DC + metazachlor + napropamide- Wild oat- 28 DAT | | | | | | | |
|---|---|---|---|---|---|---|---|
| Tmt | X | Y | Expected | observed | synergy[α] | 2,4-DC[β] | Metazachlor + Napropamide[ρ] |
| 1 | 42 | 82 | 89.56 | 90 | Y | 50 | 250 + 315 |
| 2 | 42 | 93 | 95.94 | 95 | N | 50 | 500 + 315 |
| 3 | 42 | 93 | 95.94 | 100 | Y | 50 | 750 + 315 |
| 4 | 43 | 82 | 89.74 | 88 | N | 100 | 250 + 315 |
| 5 | 43 | 93 | 96.01 | 92 | N | 100 | 500 + 315 |
| 6 | 43 | 93 | 96.01 | 91 | N | 100 | 750 + 315 |
| 7 | 43 | 82 | 89.74 | 91 | Y | 200 | 250 + 315 |
| 8 | 43 | 93 | 96.01 | 98 | Y | 200 | 500 + 315 |
| 9 | 43 | 93 | 96.01 | 95 | N | 200 | 750 + 315 |

[α]measurement of synergistic behavior as Y = YES; N = NO
[β] and [ρ]Rate - g ai/ha

| 2,4-DC + metazachlor + napropamide- Blackgrass - 28 DAT | | | | | | | |
|---|---|---|---|---|---|---|---|
| Tmt | X | Y | Expected | observed | synergy | 2,4-DC[α] | Metazachlor + Napropamide[β] |
| 1 | 15 | 82 | 84.7 | 75 | N | 50 | 250 + 315 |
| 2 | 15 | 88 | 89.8 | 95 | Y | 50 | 500 + 315 |
| 3 | 15 | 87 | 88.95 | 96 | Y | 50 | 750 + 315 |
| 4 | 32 | 82 | 87.76 | 91 | Y | 100 | 250 + 315 |
| 5 | 32 | 88 | 91.84 | 90 | N | 100 | 500 + 315 |
| 6 | 32 | 87 | 91.16 | 88 | N | 100 | 750 + 315 |
| 7 | 75 | 82 | 95.5 | 90 | N | 200 | 250 + 315 |
| 8 | 75 | 88 | 97 | 99 | Y | 200 | 500 + 315 |
| 9 | 75 | 87 | 96.75 | 99 | Y | 200 | 750 + 315 |

[α]measurement of synergistic behavior as Y = YES; N = NO
[β] and [ρ]Rate - g ai/ha

Example 29: Tank-Mix Weed Efficacy/Crop Selectivity of 2,4 DC with Dimethachlor Preemergence (PRE)

In this example a greenhouse study was conducted to determine the weed efficacy/crop selectivity of 2,4 DC with dimethachlor. The tested weeds include Italian ryegrass (*Lolium perenne. multiflorum*, LOLMU), wild mustard (*Sinapis arvensis*, SINAR), annual bluegrass (*Poa annua*, POAAN), wild oat (*Avena fatua*, AVEFA), blackgrass (*Alopecurus myosuroides*, ALOMY), common lambsquarters (*Chenopodium album*, CHEAL), littleseed canarygrass (*Phalaris minor*, PHAMI), common chickweed (*Stellaria media*, STEME), corn poppy (*Papaver rhoeas*, PAPRH), redroot pigweed (*Amaranthus retroflexus*, AMARE), silky windgrass (*Apera spica-venti*, APSEV), wild buckwheat (*Polygonum convolvulus*, POLCO). The crops teased were Wheat and canola.

Materials and Methods

To determine PRE weed efficacy and crop selectivity, 2,4 DC (36% SC) was applied alone at 50, 100, or 200 g ai/ha in combination with dimethachlor (Teridox 48%) at 333, 667, or 1000 g ai/ha. Other treatments included the single application of 2,4 DC at 400 g ai/ha, dimethachlor alone at rate mentioned previously, and tank-mix of clomazone (Command 3ME 31.4%) plus dimethachlor at 100+1000 g ai/ha. A non-treated check was included as reference standard. Treatments were applied before the emergence of Italian ryegrass, wild oat, wild buckwheat, blackgrass, littleseed canarygrass, common chickweed, common lambsquarters, corn poppy, silky windgrass, redroot pigweed, wild mustard, annual bluegrass, canola, and wheat. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data (not included) were analyzed using Minitab statistical software at 95% confidence interval.

Result at 28 DAT:

2,4 DC alone gave control of pigweed and Italian ryegrass at ≥200 g ai/ha, corn poppy and wild oat at 400 g, blackgrass at ≥100 g, and common chickweed at all rates. 2,4 DC was selective on wheat up to 200 g and on canola up to 100 g. Dimethachlor alone provided control of lambsquarters at 1000 g ai/ha, wild oat, wild buckwheat, littleseed canarygrass, and annual bluegrass at ≥667 g, pigweed, silky windgrass, corn poppy, Italian ryegrass, and chickweed at all rates. Dimethachlor caused 18% injury to canola at 100 g, it was not selective to wheat at any rate.

All combination of 2,4 DC and dimethachlor nearly controlled corn poppy, annual bluegrass, Italian ryegrass, lambsquarters, pigweed, silky windgrass, wild buckwheat, littleseed canarygrass, wild oat, blackgrass, and common chickweed. However, all combinations caused severe injury to wheat (≥60%) and to canola at 28 DAT. No combination yielded control of wild mustard.

Clomazone and dimethachlor controlled all species except wild mustard. Tank-mix combination caused severe injury to wheat and canola.

In summary, in most cases, 2,4 DC and dimethachlor tank-mix combinations controlled all weed species at 28 DAT. Almost all combinations resulted in high injury to wheat and canola. 2,4 DC alone at 200 g was selective to wheat and gave control of redroot pigweed, Italian ryegrass, common chickweed, and blackgrass. The following tables highlight the unexpected synergistic results observed in the tested combination.

| 2,4-DC + dimethachlor- Common lambsquarters- 28 DAT | | | | | | | |
|---|---|---|---|---|---|---|---|
| Tmt | X | Y | Expected | observed | synergy[α] | 2,4-DC[β] | Dimethachor[ρ] |
| 1 | 50 | 80 | 90 | 83 | N | 50 | 333 |
| 2 | 50 | 78 | 89 | 87 | N | 50 | 667 |
| 3 | 50 | 93 | 96.5 | 94 | N | 50 | 100 |
| 4 | 53 | 80 | 90.6 | 88 | N | 100 | 333 |
| 5 | 53 | 78 | 89.66 | 94 | Y | 100 | 667 |
| 6 | 53 | 93 | 96.71 | 100 | Y | 100 | 100 |
| 7 | 65 | 80 | 93 | 97 | Y | 200 | 333 |
| 8 | 65 | 78 | 92.3 | 100 | Y | 200 | 667 |
| 9 | 65 | 93 | 97.55 | 100 | Y | 200 | 100 |

[α]measurement of synergistic behavior as Y = YES; N = NO
[β] and [ρ]Rate - g ai/ha

| 2,4-DC + dimethachlor- Wild oat - 28 DAT | | | | | | | |
|---|---|---|---|---|---|---|---|
| Tmt | X | Y | Expected | observed | synergy[α] | 2,4-DC[β] | Dimethachlor[ρ] |
| 1 | 18 | 67 | 72.94 | 82 | Y | 50 | 333 |
| 2 | 18 | 85 | 87.7 | 85 | N | 50 | 667 |
| 3 | 18 | 93 | 94.26 | 91 | N | 50 | 100 |
| 4 | 37 | 67 | 79.21 | 85 | Y | 100 | 333 |
| 5 | 37 | 85 | 90.55 | 94 | Y | 100 | 667 |
| 6 | 37 | 93 | 95.59 | 93 | N | 100 | 100 |
| 7 | 57 | 67 | 85.81 | 85 | N | 200 | 333 |

-continued

2,4-DC + dimethachlor- Wild oat - 28 DAT

| Tmt | X | Y | Expected | observed | syn-ergy[α] | 2,4-DC[β] | Dimethachlor[ρ] |
|-----|---|---|----------|----------|-------------|-----------|-----------------|
| 8 | 57 | 85 | 93.55 | 87 | N | 200 | 667 |
| 9 | 57 | 93 | 96.99 | 92 | N | 200 | 100 |

[α]measurement of synergistic behavior as Y = YES; N = NO

[β] and [ρ]Rate - g ai/ha

2,4-DC + dimethachlor- Wild buckwheat - 28 DAT

| Tmt | X | Y | Expected | observed | syn-ergy[α] | 2,4-DC[β] | Dimethachlor[ρ] |
|-----|---|---|----------|----------|-------------|-----------|-----------------|
| 1 | 20 | 67 | 73.6 | 100 | Y | 50 | 333 |
| 2 | 20 | 100 | 100 | 100 | N | 50 | 667 |
| 3 | 20 | 100 | 100 | 100 | N | 50 | 100 |
| 4 | 23 | 67 | 74.59 | 100 | Y | 100 | 333 |
| 5 | 23 | 100 | 100 | 100 | N | 100 | 667 |
| 6 | 23 | 100 | 100 | 100 | N | 100 | 100 |
| 7 | 33 | 67 | 77.89 | 100 | Y | 200 | 333 |
| 8 | 33 | 100 | 100 | 100 | N | 200 | 667 |
| 9 | 33 | 100 | 100 | 100 | N | 200 | 100 |

[α]measurement of synergistic behavior as Y = YES; N = NO

[β] and [ρ]Rate - g ai/ha

2,4-DC + dimethachlor- Littleseed canarygrass - 28 DAT

| Tmt | X | Y | Expected | observed | syn-ergy[α] | 2,4-DC[β] | Dimethachlor[ρ] |
|-----|---|---|----------|----------|-------------|-----------|-----------------|
| 1 | 20 | 75 | 80 | 90 | Y | 50 | 333 |
| 2 | 20 | 90 | 92 | 99 | Y | 50 | 667 |
| 3 | 20 | 100 | 100 | 100 | N | 50 | 100 |
| 4 | 39 | 75 | 84.75 | 82 | N | 100 | 333 |
| 5 | 39 | 90 | 93.9 | 99 | Y | 100 | 667 |
| 6 | 39 | 100 | 100 | 100 | N | 100 | 100 |
| 7 | 70 | 75 | 92.5 | 96 | Y | 200 | 333 |
| 8 | 70 | 90 | 97 | 99 | Y | 200 | 667 |
| 9 | 70 | 100 | 100 | 100 | N | 200 | 100 |

[α]measurement of synergistic behavior as Y = YES; N = NO

[β] and [ρ]Rate - g ai/ha

2,4-DC + dimethachlor- Blackgrass - 28 DAT

| Tmt | X | Y | Expected | observed | syn-ergy[α] | 2,4-DC[β] | Dimethachlor[ρ] |
|-----|---|---|----------|----------|-------------|-----------|-----------------|
| 1 | 58 | 57 | 81.94 | 82 | Y | 50 | 333 |
| 2 | 58 | 77 | 90.34 | 87 | N | 50 | 667 |
| 3 | 58 | 80 | 91.6 | 96 | Y | 50 | 100 |
| 4 | 91 | 57 | 96.13 | 88 | N | 100 | 333 |
| 5 | 91 | 77 | 97.93 | 99 | Y | 100 | 667 |
| 6 | 91 | 80 | 98.2 | 100 | Y | 100 | 100 |
| 7 | 97 | 57 | 98.71 | 100 | Y | 200 | 333 |
| 8 | 97 | 77 | 99.31 | 100 | Y | 200 | 667 |
| 9 | 97 | 80 | 99.4 | 100 | Y | 200 | 100 |

[α]measurement of synergistic behavior as Y = YES; N = NO;

[β] and [ρ]Rate - g ai/ha

2,4-DC + dimethachlor- Annual bluegrass - 28 DAT

| Tmt | X | Y | Expected | observed | syn-ergy[α] | 2,4-DC[β] | Dimethachlor[ρ] |
|-----|---|---|----------|----------|-------------|-----------|-----------------|
| 1 | 23 | 82 | 86.14 | 89 | Y | 50 | 333 |
| 2 | 23 | 100 | 100 | 100 | N | 50 | 667 |
| 3 | 23 | 100 | 100 | 100 | N | 50 | 100 |
| 4 | 30 | 82 | 87.4 | 85 | N | 100 | 333 |
| 5 | 30 | 100 | 100 | 100 | N | 100 | 667 |
| 6 | 30 | 100 | 100 | 100 | N | 100 | 100 |
| 7 | 47 | 82 | 90.46 | 100 | Y | 200 | 333 |
| 8 | 47 | 100 | 100 | 100 | N | 200 | 667 |
| 9 | 47 | 100 | 100 | 100 | N | 200 | 100 |

[α]measurement of synergistic behavior as Y = YES; N = NO

[β] and [ρ]Rate - g ai/ha

Example 30: Weed Control with 2,4-DC, and Dimethachlor Plus Metazachlor Tank-Mix Combinations In this example a greenhouse study was conducted to determine the weed efficacy of 2,4-DC, with 2,4-DC alone or in three-way combination with dimethachlor plus metazachlor as preemergence (PRE) treatment against the following weeds: Italian ryegrass (*Lolium perenne. multiflorum*, LOLMU), wild mustard (*Sinapis arvensis*, SINAR), annual bluegrass (*Poa annua*, POAAN), wild oat (*Avena fatua*, AVEFA), blackgrass (*Alopecurus myosuroides*, ALOMY), common lambsquarters (*Chenopodium album*, CHEAL), littleseed canarygrass (*Phalaris minor*, PHAMI), common chickweed (*Stellaria media*, STEME), corn poppy (*Papaver rhoeas*, PAPRH), redroot pigweed (*Amaranthus retroflexus*, AMARE), silky windgrass (*Apera spica-venti*, APSEV).

Methods:

2,4-DC (SC 36%) was applied at 50, 100, or 200 g ai/ha alone or as tank-mix with dimethachlor (48%) and metazachlor (43.1%). Dimethachlor rates for alone or tank-mix application were 500 or 1000 g ai/ha and metazachlor rates were 375 or 750 g ai/ha. A non-treated check was included as reference standard. Treatments were applied before the emergence of Italian ryegrass, wild oat, blackgrass, littleseed canarygrass, common chickweed, common lambsquarters, corn poppy, silky windgrass, redroot pigweed, wild mustard, annual bluegrass, canola, and wheat. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data (not included) were analyzed using Minitab statistical software at 95% confidence interval.

Results:

2,4-DC alone gave control of pigweed, corn poppy, and Italian ryegrass at ≥200 g ai/ha, wild oat at 400 g, blackgrass at ≥100 g, and common chickweed at all rates. 2,4-DC caused 11% injury to wheat at 200 g and 11% injury to canola at 100 g. (Dimethachlor+metazachlor) alone provided control of all weed species except mustard. All combinations were not safe on wheat; all combinations showed not more than 15% injury on canola except one with highest rates which caused 28% injury. All combinations of 2,4-

DC+dimethachlor+metazachlor gave control of all weed species except wild mustard which controlled with only four combinations. All combinations caused severe injury to wheat (≥80%) while injury to canola was >20%.

In summary, all three-way tank mix combinations of 2, 4 DC plus dimethachlor plus metazachlor controlled all weed species except mustard at 28 DAT. Almost all combinations resulted in high injury to wheat and canola. 2, 4 DC alone at 100 g and 200 g was selective to wheat and canola, respectively. 2, 4 DC at 200 g controlled blackgrass, Italian ryegrass, pigweed, corn poppy, and chickweed. The following table highlights the unexpected synergistic results observed in the tested combination.

| 2,4-DC + dimethachlor + metazachlor- Wild mustard- 28 DAT | | | | | | | |
|---|---|---|---|---|---|---|---|
| Tmt | X | Y | Expected | observed | syn-ergy$^\alpha$ | 2,4-DC $^\beta$ | Metazachlor + Napropamide$^\rho$ |
| 1 | 10 | 63 | 66.7 | 82 | Y | 50 | 500 + 375 |
| 2 | 10 | 73 | 75.7 | 74 | N | 50 | 1000 + 375 |
| 3 | 10 | 73 | 75.7 | 83 | Y | 50 | 500 + 750 |
| 4 | 10 | 76 | 78.4 | 85 | Y | 50 | 1000 + 750 |
| 5 | 25 | 63 | 72.25 | 75 | Y | 100 | 500 + 375 |
| 6 | 25 | 73 | 79.75 | 82 | Y | 100 | 1000 + 375 |
| 7 | 25 | 73 | 79.75 | 85 | Y | 100 | 500 + 750 |
| 8 | 25 | 76 | 82 | 87 | Y | 100 | 1000 + 750 |
| 9 | 28 | 63 | 73.36 | 78 | Y | 200 | 500 + 375 |
| 10 | 28 | 73 | 80.56 | 73 | N | 200 | 1000 + 375 |
| 11 | 28 | 73 | 80.56 | 73 | N | 200 | 500 + 750 |
| 12 | 28 | 76 | 82.72 | 90 | Y | 200 | 1000 + 750 |

$^\alpha$measurement of synergistic behavior as Y = YES; N = NO
$^\beta$ and $^\rho$Rate - g ai/ha

Example 31: Weed Control with 2,4-DC and Mesotrione Tank-Mix Combinations

In this example a greenhouse study was conducted to determine the weed efficacy of 2,4-DC, with 2,4-DC alone or in combination with mesotrione as preemergence (PRE) treatment against the following weeds: Jimsonweed (*Datura stramonium*, DATST), velvetleaf (*Abutilon theophrasti*, ABUTH), hairy beggarticks (*Asteraceae bidens*, BIDPA), common cocklebur (*Xanthium strumarium*, XANST), barnyardgrass (*Echinochloa crus-galli*, ECHCG).

Methods:

2,4-DC (SC 36%) was applied at 50, 100, or 200 g ai/ha alone or as tank-mix with mesotrione (Callisto® 40%) at 25, 50 or 100 g ai/ha. A non-treated check was included as reference standard. Other treatments included a tank-mix application of mesotrione plus S-metolachlor (Dual II Magnum® 82.4%) at 100+525 g and an application of 2,4-DC at 400 g applied alone only. Treatments were applied before the emergence of Jimsonweed, velvetleaf, hairy beggarticks, common cocklebur, barnyardgrass, sweet corn, yellow corn, and *sorghum*. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data (not included) were analyzed using Minitab statistical software at 95% confidence interval.

Results:

2,4-DC alone was safe on sweet corn and yellow corn at all three rates; safe on *sorghum* at 25 and 50 g, and controlled velvetleaf and Jimsonweed at 50 or 100 g; controlled common cocklebur and hairy beggarticks at 100 g.

Out of nine combinations of 2,4-DC plus mesotrione, two combinations were safe (≤10%) on sweet corn, five combinations were safe on *sorghum* and seven combinations were safe on yellow corn. Barnyardgrass was controlled with all combinations. Controlled velvetleaf and Jimsonweed when mesotrione was added at 50 or 100 g to the combination except velvetleaf was not controlled when mesotrione at 50 g was added to 2,4-DC at 50 g. Control of cocklebur and hairy beggarticks was seen with only three combinations.

In summary, 2, 4 DC and mesotrione combinations were not safe on sweet corn, were not safe on *sorghum* with 2, 4 DC at 100 g plus mesotrione at 100 g and with combinations containing 2, 4 DC at 200 g. Combinations were safe on yellow corn. All combinations were effective on barnyardgrass; nearly all combinations controlled velvetleaf and jimsonweed; only three combinations controlled cocklebur and hairy beggarstick. 2,4 DC alone was not safe on sweet corn and *sorghum* at all rates except at the lowest rate. 2, 4 DC alone did not control any weeds except barnyardgrass. Mesotrione was safe on both corn species while safe on *sorghum* at 25 or 50 g. Mesotrione alone gave control of velvetleaf and Jimsonweed at medium or highest rate while it controlled cocklebur and hairy beggarstick at the highest rate only. The following table highlights the unexpected synergistic results observed in the tested combination.

| 2,4-DC + mesotrione- Velvetleaf- 28 DAT | | | | | | | |
|---|---|---|---|---|---|---|---|
| Tmt | X | Y | Expected | observed | syn-ergy$^\alpha$ | 2,4-DC$^\beta$ | Mesotrione$^\rho$ |
| 1 | 25 | 73 | 79.75 | 87 | Y | 50 | 25 |
| 2 | 25 | 87 | 90.25 | 82 | N | 50 | 50 |
| 3 | 25 | 100 | 100 | 100 | N | 50 | 100 |
| 4 | 13 | 73 | 76.51 | 77 | Y | 100 | 25 |
| 5 | 13 | 87 | 88.69 | 99 | Y | 100 | 50 |
| 6 | 13 | 100 | 100 | 100 | N | 100 | 100 |
| 7 | 38 | 73 | 83.26 | 78 | N | 200 | 25 |
| 8 | 38 | 87 | 91.94 | 98 | Y | 200 | 50 |
| 9 | 38 | 100 | 100 | 100 | N | 200 | 100 |

$^\alpha$measurement of synergistic behavior as Y = YES; N = NO
$^\beta$ and $^\rho$Rate - g ai/ha

| 2,4-DC + mesotrione- Jimsonweed- 28 DAT | | | | | | | |
|---|---|---|---|---|---|---|---|
| Tmt | X | Y | Expected | observed | syn-ergy$^\alpha$ | 2,4-DC$^\beta$ | Mesotrione$^\rho$ |
| 1 | 33 | 68 | 78.56 | 87 | Y | 50 | 25 |
| 2 | 33 | 90 | 93.3 | 82 | N | 50 | 50 |
| 3 | 33 | 93 | 95.31 | 100 | Y | 50 | 100 |
| 4 | 35 | 68 | 79.2 | 77 | N | 100 | 25 |
| 5 | 35 | 90 | 93.5 | 99 | Y | 100 | 50 |
| 6 | 35 | 93 | 95.45 | 100 | Y | 100 | 100 |
| 7 | 68 | 68 | 89.76 | 78 | N | 200 | 25 |
| 8 | 68 | 90 | 96.8 | 98 | Y | 200 | 50 |
| 9 | 68 | 93 | 97.76 | 100 | Y | 200 | 100 |

$^\alpha$measurement of synergistic behavior as Y = YES; N = NO
$^\beta$ and $^\rho$Rate - g ai/ha

| | | | 2,4-DC + mesotrione- Common cocklebur- 28 DAT | | | | |
|---|---|---|---|---|---|---|---|
| Tmt | X | Y | Expected | observed | syn-ergy$^\alpha$ | 2,4-DC$^\beta$ | Mesotrione$^\rho$ |
| 1 | 28 | 60 | 71.2 | 80 | Y | 50 | 25 |
| 2 | 28 | 0 | 28 | 55 | Y | 50 | 50 |
| 3 | 28 | 90 | 92.8 | 98 | Y | 50 | 100 |
| 4 | 28 | 60 | 71.2 | 50 | N | 100 | 25 |
| 5 | 28 | 0 | 28 | 31 | Y | 100 | 50 |
| 6 | 28 | 90 | 92.8 | 66 | N | 100 | 100 |
| 7 | 63 | 60 | 85.2 | 63 | N | 200 | 25 |
| 8 | 63 | 0 | 63 | 100 | Y | 200 | 50 |
| 9 | 63 | 90 | 96.3 | 100 | Y | 200 | 100 |

$^\alpha$measurement of synergistic behavior as Y = YES; N = NO $^\beta$ and $^\rho$Rate - g ai/ha

| | | | 2,4-DC + mesotrione- Hairy beggarticks- 28 DAT | | | | |
|---|---|---|---|---|---|---|---|
| Tmt | X | Y | Expected | observed | syn-ergy$^\alpha$ | 2,4-DC$^\beta$ | Mesotrione$^\rho$ |
| 1 | 15 | 51 | 58.35 | 23 | N | 50 | 25 |
| 2 | 15 | 53 | 60.05 | 35 | N | 50 | 50 |
| 3 | 15 | 88 | 89.8 | 91 | Y | 50 | 100 |
| 4 | 31 | 51 | 66.19 | 27 | N | 100 | 25 |
| 5 | 31 | 53 | 67.57 | 66 | N | 100 | 50 |
| 6 | 31 | 88 | 91.72 | 84 | N | 100 | 100 |
| 7 | 51 | 51 | 75.99 | 45 | N | 200 | 25 |
| 8 | 51 | 53 | 76.97 | 88 | Y | 200 | 50 |
| 9 | 51 | 88 | 94.12 | 97 | Y | 200 | 100 |

$^\alpha$measurement of synergistic behavior as Y = YES; N = NO $^\beta$ and $^\rho$Rate - g ai/ha

Example 32: Weed Control with 2,4-DC, and Pyroxasulfone Plus Sulfentrazone Tank-Mix Combinations In this example a greenhouse study was conducted to determine the weed efficacy of 2,4-DC, with 2,4-DC alone or in combination with pyroxasulfone plus sulfentrazone as preemergence (PRE) treatment against the following weeds: Italian ryegrass (*Lolium perenne. multiflorum*, LOLMU), field bindweed (*Convolvulus arvensis*, CONAR), green foxtail (*Setaria viridis*, SETVI), quackgrass (*Elymus repens*, AGGRE), common chickweed (*Stellaria media*, STEME), wild oat (*Avena fatua*, AVEFA), littleseed canarygrass (*Phalaris minor*, PHAMI), white clover (*Trifolium repens*, TRFRE), dandelion (*Taraxacum officinale*, TAROF), yellow nutsedge (*Cyperus esculentus*, CYPES), and redroot pigweed (*Amaranthus retroflexus*, AMARE).

Methods:

2,4-DC (SC 36%) was applied at 0, 50, 100, or 200 g ai/ha alone or as tank-mix with pyroxasulfone (WG 85%) at 30, 60 or 90 g ai/ha and sulfentrazone at 105 or 210 g ai/ha. A non-treated check was included as reference standard. Other treatments included single application of 2,4-DC at 400 g and three-way tank-mix application of clomazone (Command 3ME 31.4%) at 200 g with pyroxasulfone at 90 g plus sulfentrazone either at 105 or 210 g. Treatments were applied at the time of planting to Italian ryegrass, green foxtail, littleseed canarygrass, wild oat, quackgrass, dandelion, common chickweed, white clover, yellow nutsedge, redroot pigweed, field bindweed, canola, and wheat. Plant species were planted in fiber flats containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury were recorded at 14, 21, and 28 days after treatment using a scale of 0 (no control/no injury) to 100 (complete plant death). Data (not included) were analyzed using Minitab statistical software at 95% confidence interval.

Results:

All eighteen three-way combinations gave control (≥85%) of Italian ryegrass, common chickweed, field bindweed, green foxtail, white clover, wild oat, littleseed canarygrass, redroot pigweed, and dandelion at 28 DAT. Quackgrass control was achieved with 13 combinations while yellow nutsedge was controlled with 10 combinations. All combinations were unsafe (>10% injury) on wheat at 21 DAT and canola at 28 DAT.

2,4-DC alone controlled Italian ryegrass and wild oat at 400 g; common chickweed was controlled at all rates; green foxtail was controlled at ≥100 g; littleseed canarygrass and redroot pigweed were controlled at 200 g. Control of quackgrass, field bindweed, white clover, and yellow nutsedge did not reach 85% with any rate. 2,4-DC was safe on wheat at ≤100 g.

All two-way tank-mix combinations of pyroxasulfone plus sulfentrazone controlled Italian ryegrass, common chickweed, field bindweed, green foxtail, white clover, littleseed canarygrass, redroot pigweed, and dandelion. Quackgrass was controlled with three combinations. Wild oat control was noted when pyroxasulfone was added either at 60 or 90 g with either rate of sulfentrazone. Control of yellow nutsedge was seen with sulfentrazone at 210 g irrespective the rates of pyroxasulfone. All combinations were not safe on wheat at 21 DAT and canola at 28 DAT.

In summary, all combinations of 2,4 DC plus pyroxasulfone plus sulfentrazone and all combinations of pyroxasulfone plus sulfentrazone provided control of Italian ryegrass, common chickweed, field bindweed, green foxtail, white clover, littleseed canarygrass, redroot pigweed, and dandelion. 2, 4 DC was safe on wheat up to 100 g ai/ha and it controlled Italian ryegrass (400 g), common chickweed (all rates), green foxtail (≥100 g), wild oat (400 g), littleseed canarygrass (≥200 g), pigweed (≥200 g), and dandelion (all rates). The table below highlights unexpected synergistic effects of the tested combinations.

| | | | 2,4-DC + Pyroxasulfone + Sulfentrazone - Quackgrass-28 DAT | | | | |
|---|---|---|---|---|---|---|---|
| Tmt | X | Y | Expected | ob-served | syn-ergy$^\alpha$ | 2,4-DC$^\beta$ | Pyroxasulfone + Sulfentrazone$^\rho$ |
| 1 | 0 | 78 | 78 | 85 | Y | 50 | 30 + 105 |
| 2 | 0 | 90 | 90 | 85 | N | 50 | 60 + 105 |
| 3 | 0 | 93 | 93 | 88 | N | 50 | 90 + 105 |
| 4 | 0 | 80 | 80 | 80 | N | 50 | 30 + 210 |
| 5 | 0 | 82 | 82 | 90 | Y | 50 | 60 + 210 |
| 6 | 0 | 96 | 96 | 94 | N | 50 | 90 + 210 |
| 7 | 7 | 78 | 79.54 | 83 | Y | 100 | 30 + 105 |
| 8 | 7 | 90 | 90.7 | 85 | N | 100 | 60 + 105 |
| 9 | 7 | 93 | 93.49 | 95 | Y | 100 | 90 + 105 |
| 10 | 7 | 80 | 81.4 | 79 | N | 100 | 30 + 210 |
| 11 | 7 | 82 | 83.26 | 78 | N | 100 | 60 + 210 |
| 12 | 7 | 96 | 96.28 | 88 | N | 100 | 90 + 210 |
| 13 | 10 | 78 | 80.2 | 83 | Y | 200 | 30 + 105 |
| 14 | 10 | 90 | 91 | 92 | Y | 200 | 60 + 105 |
| 15 | 10 | 93 | 93.7 | 88 | N | 200 | 90 + 105 |
| 16 | 10 | 80 | 82 | 88 | Y | 200 | 30 + 210 |
| 17 | 10 | 82 | 83.8 | 93 | Y | 200 | 60 + 210 |
| 18 | 10 | 96 | 96.4 | 95 | N | 200 | 90 + 210 |

$^\alpha$measurement of synergistic behavior as Y = YES; N = NO $^\beta$ and $^\rho$Rate - g ai/ha

| 2,4-DC + Pyroxasulfone + Sulfentrazone - Wild oat-28 DAT | | | | | | | |
|---|---|---|---|---|---|---|---|
| Tmt | X | Y | Expected | ob-served | syn-ergy$^α$ | 2,4-DC$^β$ | Pyroxasulfone + Sulfentrazone$^P$ |
| 1 | 28 | 72 | 79.84 | 98 | Y | 50 | 30 + 105 |
| 2 | 28 | 95 | 96.4 | 97 | Y | 50 | 60 + 105 |
| 3 | 28 | 95 | 96.4 | 100 | Y | 50 | 90 + 105 |
| 4 | 28 | 72 | 79.84 | 99 | Y | 50 | 30 + 210 |
| 5 | 28 | 90 | 92.8 | 100 | Y | 50 | 60 + 210 |
| 6 | 28 | 97 | 97.84 | 100 | Y | 50 | 90 + 210 |
| 7 | 28 | 72 | 79.84 | 94 | Y | 100 | 30 + 105 |
| 8 | 28 | 95 | 96.4 | 100 | Y | 100 | 60 + 105 |
| 9 | 28 | 95 | 96.4 | 97 | Y | 100 | 90 + 105 |
| 10 | 28 | 72 | 79.84 | 94 | Y | 100 | 30 + 210 |
| 11 | 28 | 90 | 92.8 | 100 | Y | 100 | 60 + 210 |
| 12 | 28 | 97 | 97.84 | 97 | N | 100 | 90 + 210 |
| 13 | 67 | 72 | 90.76 | 96 | Y | 200 | 30 + 105 |
| 14 | 67 | 95 | 98.35 | 98 | N | 200 | 60 + 105 |
| 15 | 67 | 95 | 98.35 | 100 | Y | 200 | 90 + 105 |
| 16 | 67 | 72 | 90.76 | 100 | Y | 200 | 30 + 210 |
| 17 | 67 | 90 | 96.7 | 97 | Y | 200 | 60 + 210 |
| 18 | 67 | 97 | 99.01 | 97 | N | 200 | 90 + 210 |

$^α$measurement of synergistic behavior as Y = YES; N = NO
$^β$ and $^P$Rate - g ai/ha

| 2,4-DC + Pyroxasulfone + Sulfentrazone - Yellow nutsedge-28 DAT | | | | | | | |
|---|---|---|---|---|---|---|---|
| Tmt | X | Y | Expected | ob-served | syn-ergy$^α$ | 2,4-DC$^β$ | Pyroxasulfone + Sulfentrazone$^P$ |
| 2 | 0 | 73 | 73 | 80 | Y | 50 | 30 + 105 |
| 2 | 0 | 83 | 83 | 88 | Y | 50 | 60 + 105 |
| 3 | 0 | 80 | 80 | 78 | N | 50 | 90 + 105 |
| 4 | 0 | 92 | 92 | 90 | N | 50 | 30 + 210 |
| 5 | 0 | 85 | 85 | 87 | Y | 50 | 60 + 210 |
| 6 | 0 | 100 | 100 | 91 | N | 50 | 90 + 210 |
| 7 | 0 | 73 | 73 | 73 | N | 100 | 30 + 105 |
| 8 | 0 | 83 | 83 | 80 | N | 100 | 60 + 105 |
| 9 | 0 | 80 | 80 | 76 | N | 100 | 90 + 105 |
| 10 | 0 | 92 | 92 | 91 | N | 100 | 30 + 210 |
| 11 | 0 | 85 | 85 | 91 | Y | 100 | 60 + 210 |
| 12 | 0 | 100 | 100 | 90 | N | 100 | 90 + 210 |
| 13 | 17 | 73 | 77.59 | 83 | Y | 200 | 30 + 105 |
| 14 | 17 | 83 | 85.89 | 65 | N | 200 | 60 + 105 |
| 15 | 17 | 80 | 83.4 | 95 | Y | 200 | 90 + 105 |
| 16 | 17 | 92 | 93.36 | 92 | N | 200 | 30 + 210 |
| 17 | 17 | 85 | 87.55 | 80 | N | 200 | 60 + 210 |
| 18 | 17 | 100 | 100 | 95 | N | 200 | 90 + 210 |

$^α$measurement of synergistic behavior as Y = YES; N = NO
$^β$ and $^P$Rate - g ai/ha

Example 33: Weed Control with 2,4-DC, and Fluthiacet-Methyl Plus Pyroxasulfone Tank-Mix Combinations In this example a greenhouse study was conducted to determine the weed efficacy of 2,4-DC, with 2,4-DC alone or in combination with and Fluthiacet-Methyl plus Pyroxasulfone as preemergence treatment against the following weeds: Palmer *amaranth* (*Amaranthus palmeri*, AMAPA); Pennsylvania smartweed (*Polygonum pensylvanicum*, POLPY); velvetleaf (*Abutilon theophrasti*, ABUTH); green foxtail (*Setaria viridis*, SETVI); morningglory spp. (*Ipomoea* spp.); Italian ryegrass (*Lolium perenne* L. ssp. *multiflorum*, LOLMU); prickly *sida* (*Sida spinosa*, SIDSP); yellow nutsedge (*Cyperus esculentus*, CYPES).

Methods:

2,4-DC (46.2%) was applied at 31, 63, 125, 350 or 375 g ai/ha alone or as tank-mix with Fluthiacet-methyl (CADET®, 10.3%) at 4.9 g ai/ha and pyroxasulfone (85WG, 85%) at 30, 60, or 90 g ai/ha were applied in combination alone or with 2,4-DC at above mentioned rates. ANTHEM® (fluthiacet-methyl, 0.69% plus pyroxasulfone, 22.61%) was included as a standard as labeled rate, Fluthiacet-methyl at 4.9 g ai/ha and pyroxasulfone at 165 g ai/ha. A non-treated check was included as reference standard. The following weeds were screened, Palmer *amaranth*, Pennsylvania smartweed, velvetleaf, green foxtail, morningglory, Italian ryegrass, prickly *sida*, and yellow nutsedge. Crops screened were cotton, lentil, mung bean, bush bean, and cowpea. All plants were direct seeded into 6"×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 30 GPA using a TeeJet 8001E nozzle at 40 PSI. Visual percent weed control and crop injury were recorded at 14, 21, and 28 days after treatment (DAT), using a scale of 0 (no control/no injury) to 100 (complete plant death). Data (not included) were analyzed using Minitab statistical software at 95% confidence interval.

Results:

All eighteen three-way combinations gave control (≥85%) of Italian ryegrass, common chickweed, field bindweed, green foxtail, white clover, wild oat, littleseed canarygrass, redroot pigweed, and dandelion at 28 DAT. Quackgrass control was achieved with 13 combinations while yellow nutsedge was controlled with 10 combinations. All combinations were unsafe (>10% injury) on wheat at 21 DAT and canola at 28 DAT.

Combinations of 2,4-DC plus Fluthiacet-methyl and pyroxasulfone applied PRE, controlled prickly *sida*, Palmer *amaranth*, green foxtail, and Italian ryegrass with all tankmix combinations. Pennsylvania smartweed was controlled with 14 of 15 combinations, velvetleaf with 11 combinations, morningglory with 1 combination and yellow nutsedge was not controlled by any combination. When applied alone at 31 g ai/ha, 2,4-DC controlled prickly *sida*, at 125 g controlled green foxtail. Pennsylvania smartweed and Italian ryegrass were controlled at 250 g; Palmer *amaranth* and velvet leaf at 375 g of 2,4-DC. Fluthiacet-methyl at 4.9 g plus pyroxasulfone at 30 g controlled prickly *sida*, Palmer *amaranth*, green foxtail, and Italian ryegrass, Fluthiacet-methyl at 4.9 g plus pyroxasulfone at 60 g controlled Pennsylvania smartweed and velvetleaf, Fluthiacet-methyl at 4.9 g plus pyroxasulfone at 90 g controlled morningglory. ANTHEM® controlled all weeds in the assay.

2, 4 DC plus Fluthiacet-methyl plus pyroxasulfone in was generally safe on cotton when pyroxasulfone was applied at rates less than 90 g. Mung bean was safe with 5 of 15 combinations of 2, 4 DC plus Fluthiacet-methyl plus pyroxasulfone, cowpea was safe with 4 combinations, bush bean with 3 combinations, and lentil was injured with all combinations. 2, 4 DC applied alone PRE was safe on cotton, mung bean, bush bean, and cowpea at all rates, lentil was not safe at any rate. Fluthiacet-methyl at 4.9 g plus pyroxasulfone at 30 g was safe on mung bean and cowpea, Fluthiacet-methyl at 4.9 g plus pyroxasulfone up to 60 g was safe on cotton. Bush bean and lentil were injured by all treatments of Fluthiacet-methyl and pyroxasulfone. Anthem was not safe on any crop in the assay In summary, 2, 4 DC alone controlled prickly *sida* at 31 g ai/ha, green foxtail at 125 g, Pennsylvania smartweed and Italian ryegrass at 250 g and Palmer *amaranth* and velvetleaf at 375 g. 2, 4 DC plus fluthiacet-methyl at 4.9 g and pyroxasulfone at 30, 60, or 90 g, controlled prickly *sida*, Palmer *amaranth*, green foxtail and Italian ryegrass with all combinations (Anthem, included as a standard at labeled rate of 9 fl oz/A, controlled all species in the assay.

2, 4 DC applied alone was safe on cotton, mung bean, cowpea and bush bean at all rates, while not safe on lentil at any rate. Fluthiacet-methyl plus pyroxasulfone injured mung bean and cowpea with pyroxasulfone at 60 g, injured cotton with pyroxasulfone at 90 g and injured lentil and bush bean at all rates. Anthem at labeled rate injured all crops.

The table below highlights unexpected synergistic effects of the tested combinations.

| 2,4-DC + Fluthiacet-methyl + Pyroxasulfone - Pennsylvania Smartweed-28 DAT | | | | | | | |
|---|---|---|---|---|---|---|---|
| Tmt | X | Y | Ex-pected | ob-served | syn-ergy$^{\alpha}$ | 2,4-DC$^{\beta}$ | Fluthiacet-methyl + Pyroxasulfone$^{\rho}$ |
| 1 | 10 | 43 | 48.7 | 70 | Y | 31 | 4.9 + 30 |
| 2 | 10 | 100 | 100 | 93 | N | 31 | 4.9 + 60 |
| 3 | 10 | 100 | 100 | 97 | N | 31 | 4.9 + 90 |
| 4 | 23 | 43 | 56.11 | 94 | Y | 63 | 4.9 + 30 |
| 5 | 23 | 100 | 100 | 97 | N | 63 | 4.9 + 60 |
| 6 | 23 | 100 | 100 | 99 | N | 63 | 4.9 + 90 |
| 7 | 57 | 43 | 75.49 | 100 | Y | 125 | 4.9 + 30 |
| 8 | 57 | 100 | 100 | 100 | N | 125 | 4.9 + 60 |
| 9 | 57 | 100 | 100 | 100 | N | 125 | 4.9 + 90 |
| 10 | 100 | 43 | 100 | 100 | N | 250 | 4.9 + 30 |
| 11 | 100 | 100 | 100 | 100 | N | 250 | 4.9 + 60 |
| 12 | 100 | 100 | 100 | 100 | N | 250 | 4.9 + 90 |
| 13 | 99 | 43 | 99.43 | 100 | Y | 375 | 4.9 + 30 |
| 14 | 99 | 100 | 100 | 100 | N | 375 | 4.9 + 60 |
| 15 | 99 | 100 | 100 | 100 | N | 375 | 4.9 + 90 |

$^{\alpha}$measurement of synergistic behavior as Y = YES; N = NO
$^{\beta}$ and $^{\rho}$Rate - g ai/ha

| 2,4-DC + Fluthiacet-methyl + Pyroxasulfone - Velvetleaf-28 DAT | | | | | | | |
|---|---|---|---|---|---|---|---|
| Tmt | X | Y | Ex-pected | ob-served | syn-ergy$^{\alpha}$ | 2,4-DC$^{\beta}$ | Fluthiacet-methyl + Pyroxasulfone$^{\rho}$ |
| 1 | 7 | 62 | 64.66 | 47 | N | 31 | 4.9 + 30 |
| 2 | 7 | 98 | 98.14 | 77 | N | 31 | 4.9 + 60 |
| 3 | 7 | 98 | 98.14 | 95 | N | 31 | 4.9 + 90 |
| 4 | 23 | 62 | 70.74 | 65 | N | 63 | 4.9 + 30 |
| 5 | 23 | 98 | 98.46 | 100 | Y | 63 | 4.9 + 60 |
| 6 | 23 | 98 | 98.46 | 99 | Y | 63 | 4.9 + 90 |
| 7 | 27 | 62 | 72.26 | 97 | Y | 125 | 4.9 + 30 |
| 8 | 27 | 98 | 98.54 | 78 | N | 125 | 4.9 + 60 |
| 9 | 27 | 98 | 98.54 | 99 | Y | 125 | 4.9 + 90 |
| 10 | 30 | 62 | 73.4 | 93 | Y | 250 | 4.9 + 30 |
| 11 | 30 | 98 | 98.6 | 99 | Y | 250 | 4.9 + 60 |
| 12 | 30 | 98 | 98.6 | 99 | Y | 250 | 4.9 + 90 |
| 13 | 89 | 62 | 95.82 | 99 | Y | 375 | 4.9 + 30 |
| 14 | 89 | 98 | 99.78 | 100 | Y | 375 | 4.9 + 60 |
| 15 | 89 | 98 | 99.78 | 99 | N | 375 | 4.9 + 90 |

$^{\alpha}$measurement of synergistic behavior as Y = YES; N = NO
$^{\beta}$ and $^{\rho}$Rate - g ai/ha

Example 34: Weed Control with 2,4-DC and Napropamide Tank-Mix Combinations

In this example a greenhouse study was conducted to determine the weed efficacy of 2,4-DC, with 2,4-DC alone or in combination with napropamide as preemergence (PRE) treatment against the following weeds: Littleseed canarygrass (*Phalaris minor*, PHAMI); common lambsquarters (*Chenopodium album*, CHEAL); blackgrass (*Alopecurus myosuroides*, ALOMY); wild buckwheat (*Polygonum con-*

*volvulus*, POLCO); wild oat (*Avena fatua*, AVEFA); annual bluegrass (*Poa annua*, POANN); common chickweed (*Stellaria media*, STEME); Italian ryegrass (*Lolium perenne* L. ssp. *multiflorum*, LOLMU); wild mustard (*Sinapis arvensis*, SINAR).

Methods:

2,4-DC (SC 36%) was applied at 31.2, 62.5, 125, 250, or 375 g ai/ha alone or as tank-mix with napropamide (Devrinol®-50DF) at 315, 630, or 1260 g ai/ha. A non-treated check was included as reference standard. Clomazone (Command 3ME®, 31.4%) plus napropamide at 1260 g ai/ha was added as standard. Littleseed canarygrass, common lambsquarters, blackgrass, wild buckwheat, wild oat, annual bluegrass, common chickweed, Italian ryegrass, wild mustard, and canola were direct seeded into 6×10" fiber flats filled with Pennington soil. Flats were watered after seeding but prior to treatment. After application flats were placed in the greenhouse and lightly watered. Thereafter flats were watered and fertilized routinely. Treatments were applied using compressed air in a track spray chamber at 30 GPA using a TeeJet 8001E nozzle at 40 PSI. Visual percent weed control/crop injury were recorded at 14, 21, and 27 days after treatment (DAT), using a scale of 0 (no control/no injury) to 100 (complete plant death). Data (not included) were analyzed using Minitab statistical software at 95% confidence interval.

Results:

2,4 DC plus napropamide provided control of common chickweed with all tank-mix combinations. Annual bluegrass was controlled with 11 of 15 tank-mixes, littleseed canarygrass and common lambsquarters were controlled by 12, Italian ryegrass by 10, blackgrass by 9, and wild buckwheat and wild oat by 1 combination. Canola was safe with 3 tank-mixes of 2,4-DC plus napropamide. 2,4-DC applied alone at 31.2 g ai/ha controlled common chickweed, at 125 g controlled common lambsquarters and injured canola, at 250 g controlled blackgrass and Italian ryegrass. Applied alone 2,4-DC failed to control littleseed canarygrass, wild buckwheat, wild oat, annual bluegrass, and wild mustard. Napropamide alone at 630 g controlled littleseed canarygrass, at 1260 g controlled common lambsquarters, annual bluegrass and Italian ryegrass and was safe on canola at all rates. Clomazone at 375 g plus napropamide at 1260 g controlled all weeds except wild mustard and injured canola.

In summary, 2, 4 DC napropamide controlled common chickweed at all rates, littleseed canarygrass, common lambsquarters and annual bluegrass with most rates, and blackgrass and Italian ryegrass with all tank-mix combinations with 2, 4 DC applied at ≥125 g. 2, 4 DC alone controlled common chickweed at all rates, common lambsquarters at 125 g and blackgrass and Italian ryegrass at 250 g. Napropamide alone controlled littleseed canarygrass at 630 g, and common lambsquarters, annual bluegrass and Italian ryegrass at 1260 g. Canola was not injured by 3 tank-mix combinations, when 2, 4 DC was applied alone at ≤62.5 g, or by napropamide alone at all three rates. Clomazone plus napropamide include as standard for comparison, controlled all weeds except wild mustard and was not safe on canola. The table below highlights unexpected synergistic effects of the tested combinations.

| 2,4-DC + napropamide - Littleseed canarygrass-28 DAT | | | | | | | |
|---|---|---|---|---|---|---|---|
| Tmt | X | Y | Ex-pected | ob-served | syn-ergy$^{\alpha}$ | 2,4-DC$^{\beta}$ | Napropamide$^{\rho}$ |
| 1 | 8 | 50 | 54 | 84 | Y | 31 | 315 |
| 2 | 8 | 87 | 88.04 | 93 | Y | 31 | 630 |

US 12,616,203 B2

79    80

-continued

2,4-DC + napropamide - Littleseed canarygrass-28 DAT

| Tmt | X | Y | Expected | observed | synergy[α] | 2,4-DC[β] | Napropamide[ρ] |
|---|---|---|---|---|---|---|---|
| 3 | 8 | 100 | 100 | 96 | N | 31 | 1260 |
| 4 | 12 | 50 | 56 | 78 | Y | 63 | 315 |
| 5 | 12 | 87 | 88.56 | 96 | Y | 63 | 630 |
| 6 | 12 | 100 | 100 | 100 | N | 63 | 1260 |
| 7 | 18 | 50 | 59 | 77 | Y | 125 | 315 |
| 8 | 18 | 87 | 89.34 | 98 | Y | 125 | 630 |
| 9 | 18 | 100 | 100 | 98 | N | 125 | 1260 |
| 10 | 27 | 50 | 63.5 | 88 | Y | 250 | 315 |
| 11 | 27 | 87 | 90.51 | 95 | Y | 250 | 630 |
| 12 | 27 | 100 | 100 | 100 | N | 250 | 1260 |
| 13 | 53 | 50 | 76.5 | 87 | Y | 375 | 315 |
| 14 | 53 | 87 | 93.89 | 90 | N | 375 | 630 |
| 15 | 53 | 100 | 100 | 99 | N | 375 | 1260 |

[α]measurement of synergistic behavior as Y = YES; N = NO
[β] and [ρ]Rate - g ai/ha

2,4-DC + napropamide - Common lambsquarters- 28 DAT

| Tmt | X | Y | Expected | observed | synergy[α] | 2,4-DC[β] | Napropamide[ρ] |
|---|---|---|---|---|---|---|---|
| 1 | 28 | 50 | 64 | 43 | N | 31 | 315 |
| 2 | 28 | 73 | 80.56 | 87 | Y | 31 | 630 |
| 3 | 28 | 91 | 93.52 | 89 | N | 31 | 1260 |
| 4 | 43 | 50 | 71.5 | 60 | N | 63 | 315 |
| 5 | 43 | 73 | 84.61 | 85 | Y | 63 | 630 |
| 6 | 43 | 91 | 94.87 | 90 | N | 63 | 1260 |
| 7 | 85 | 50 | 92.5 | 83 | N | 125 | 315 |
| 8 | 85 | 73 | 95.95 | 94 | N | 125 | 630 |
| 9 | 85 | 91 | 98.65 | 94 | N | 125 | 1260 |
| 10 | 91 | 50 | 95.5 | 92 | N | 250 | 315 |
| 11 | 91 | 73 | 97.57 | 94 | N | 250 | 630 |
| 12 | 91 | 91 | 99.19 | 97 | N | 250 | 1260 |
| 13 | 93 | 50 | 96.5 | 96 | N | 375 | 315 |
| 14 | 93 | 73 | 98.11 | 97 | N | 375 | 630 |
| 15 | 93 | 91 | 99.37 | 98 | N | 375 | 1260 |

[α]measurement of synergistic behavior as Y = YES; N = NO
[β] and [ρ]Rate - g ai/ha

2,4-DC + napropamide - Blackgrass-28 DAT

| Tmt | X | Y | Expected | observed | synergy[α] | 2,4-DC[β] | Napropamide[ρ] |
|---|---|---|---|---|---|---|---|
| 1 | 10 | 5 | 14.5 | 18 | Y | 31 | 315 |
| 2 | 10 | 7 | 16.3 | 62 | Y | 31 | 630 |
| 3 | 10 | 15 | 23.5 | 67 | Y | 31 | 1260 |
| 4 | 18 | 5 | 22.1 | 70 | Y | 63 | 315 |
| 5 | 18 | 7 | 23.74 | 72 | Y | 63 | 630 |
| 6 | 18 | 15 | 30.3 | 83 | Y | 63 | 1260 |
| 7 | 84 | 5 | 84.8 | 89 | Y | 125 | 315 |
| 8 | 84 | 7 | 85.12 | 91 | Y | 125 | 630 |
| 9 | 84 | 15 | 86.4 | 85 | N | 125 | 1260 |
| 10 | 93 | 5 | 93.35 | 93 | N | 250 | 315 |
| 11 | 93 | 7 | 93.49 | 96 | Y | 250 | 630 |
| 12 | 93 | 15 | 94.05 | 95 | Y | 250 | 1260 |
| 13 | 97 | 5 | 97.15 | 97 | N | 375 | 315 |
| 14 | 97 | 7 | 97.21 | 97 | N | 375 | 630 |
| 15 | 97 | 15 | 97.45 | 97 | N | 375 | 1260 |

[α]measurement of synergistic behavior as Y = YES; N = NO
[β] and [ρ]Rate - g ai/ha

2,4-DC + napropamide - Wild buckwheat-28 DAT

| Tmt | X | Y | Expected | observed | synergy[α] | 2,4-DC[β] | Napropamide[ρ] |
|---|---|---|---|---|---|---|---|
| 1 | 10 | 23 | 30.7 | 22 | N | 31 | 315 |
| 2 | 10 | 23 | 30.7 | 30 | N | 31 | 630 |
| 3 | 10 | 38 | 44.2 | 27 | N | 31 | 1260 |
| 4 | 8 | 23 | 29.16 | 37 | Y | 63 | 315 |
| 5 | 8 | 23 | 29.16 | 42 | Y | 63 | 630 |
| 6 | 8 | 38 | 42.96 | 43 | Y | 63 | 1260 |
| 7 | 8 | 23 | 29.16 | 73 | Y | 125 | 315 |
| 8 | 8 | 23 | 29.16 | 80 | Y | 125 | 630 |
| 9 | 8 | 38 | 42.96 | 73 | Y | 125 | 1260 |
| 10 | 23 | 23 | 40.71 | 75 | Y | 250 | 315 |
| 11 | 23 | 23 | 40.71 | 86 | Y | 250 | 630 |
| 12 | 23 | 38 | 52.26 | 80 | Y | 250 | 1260 |
| 13 | 37 | 23 | 51.49 | 57 | Y | 375 | 315 |
| 14 | 37 | 23 | 51.49 | 82 | Y | 375 | 630 |
| 15 | 37 | 38 | 60.94 | 78 | Y | 375 | 1260 |

[α]measurement of synergistic behavior as Y = YES; N = NO
[β] and [ρ]Rate - g ai/ha

2,4-DC + napropamide - Annual bluegrass-28 DAT

| Tmt | X | Y | Expected | observed | synergy[α] | 2,4-DC[β] | Napropamide[ρ] |
|---|---|---|---|---|---|---|---|
| 1 | 0 | 1 | 1 | 0 | N | 31 | 315 |
| 2 | 0 | 77 | 77 | 85 | Y | 31 | 630 |
| 3 | 0 | 92 | 92 | 94 | Y | 31 | 1260 |
| 4 | 2 | 1 | 2.98 | 82 | Y | 63 | 315 |
| 5 | 2 | 77 | 77.46 | 82 | Y | 63 | 630 |
| 6 | 2 | 92 | 92.16 | 93 | Y | 63 | 1260 |
| 7 | 12 | 1 | 12.88 | 83 | Y | 125 | 315 |
| 8 | 12 | 77 | 79.76 | 89 | Y | 125 | 630 |
| 9 | 12 | 92 | 92.96 | 100 | Y | 125 | 1260 |
| 10 | 40 | 1 | 40.6 | 87 | Y | 250 | 315 |
| 11 | 40 | 77 | 86.2 | 90 | Y | 250 | 630 |
| 12 | 40 | 92 | 95.2 | 100 | Y | 250 | 1260 |
| 13 | 63 | 1 | 63.37 | 86 | Y | 375 | 315 |
| 14 | 63 | 77 | 91.49 | 95 | Y | 375 | 630 |
| 15 | 63 | 92 | 97.04 | 99 | Y | 375 | 1260 |

[α]measurement of synergistic behavior as Y = YES; N = NO
[β] and [ρ]Rate - g ai/ha

Example 35: Weed Control with 2,4-DC, and Dimethachlor Plus Napropamide Tank-Mix Combinations In this example a greenhouse study was conducted to determine the weed efficacy of 2,4-DC, with 2,4-DC alone or in combination with dimethachlor plus napropamide as preemergence (PRE) treatment against the following weeds: Common lambsquarters (*Chenopodium album*, CHEAL); redroot pigweed (*Amaranthus retroflexus*, AMARE); silky windgrass (*Apera spica-venti*, APESV); Italian ryegrass (*Lolium perenne* L. ssp. *multiflorum*, LOLMU); corn poppy (*Papaver rhoeas*, PARPH); littleseed canarygrass (*Phalaris minor*, PHAMI); annual bluegrass (*Poa annua*, POAAN); shepherd's-purse (*Capsella bursa-pastoris*, CAPBP); blackgrass (*Alopecurus myosuroides*, ALOMY); wild buckwheat (*Polygonum convolvulus*, POLCO); wild oat (*Avena fatua*, AVEFA); wild mustard (*Sinapis arvensis*, SINAR); common chickweed (*Stellaria media*, STEME). Crops screened were wheat and canola.

Methods:

2,4-DC (SC 36%) was applied at, 50, 100, or 200 g ai/ha alone or as tank-mix with dimethachlor (48%) and napropamide (DF 50). Dimethachlor rates for alone or tank-mix application were 500 or 1000 g ai/ha and napropamide rates were 630 or 1260 g ai/ha. A non-treated check was included as reference standard. An application of clomazone (COMMAND® 3ME, 31.4%) at 100 g ai/ha plus dimethachlor at 1000 g plus napropamide at 1260 g was applied as a standard for comparison. Treatments were applied PRE to the following species, common lambsquarters, redroot pigweed, silky windgrass, Italian ryegrass, corn poppy, littleseed canarygrass, annual bluegrass, shepherd's-purse, blackgrass, wild buckwheat, wild oat, wild mustard, common chickweed, wheat, and canola. All plants were direct seeded into 6×10" fiber flats utilizing Pennington soil. Flats were watered after seeding but prior to treatment. After application flats were placed in the greenhouse and lightly watered. Thereafter flats were watered and fertilized routinely. Treatments were applied using compressed air at 40 PSI in a track spray chamber and 30 GPA spray volume using a TeeJet 8001E nozzle. Visual percent weed control and crop injury data were recorded at 14, 21, and 28 days after treatment (DAT).

Results:

2,4-DC alone at 50 g ai/ha controlled (≥85% injury) common chickweed, at 100 g controlled blackgrass and wild buckwheat. Common lambsquarters, redroot pigweed, Italian ryegrass, and corn poppy were controlled at 200 g; littleseed canarygrass, annual bluegrass, and shepherd's-purse were controlled by 400 g. 2,4-DC alone was safe on wheat and canola (≤10% injury) when applied at 50 and 100 g. 2,4-DC plus dimethachlor and napropamide controlled all weeds at all rates, except wild mustard. Wild mustard was controlled by 4 of 12 combinations. Canola was safe with one combination of 2,4-DC plus dimethachlor and napropamide, wheat was injured by all combinations. Clomazone plus dimethachlor and napropamide controlled all weeds and injured both crops.

In summary, 2,4 DC when applied alone at ≤200 g ai/ha controlled common lambsquarters, redroot pigweed, Italian ryegrass, corn poppy, blackgrass, wild oat, and common chickweed. 2,4 DC plus dimethachlor and napropamide controlled all weeds with all combinations except wild mustard.

The table below highlights unexpected synergistic effects of the tested combinations.

| | | | 2,4-DC + dimethachlor + napropamide - (28 DAT)-PRE Wild mustard-28 DAT | | | | |
|---|---|---|---|---|---|---|---|
| Tmt | X | Y | Expected | observed | synergy[α] | 2,4-DC[β] | Dimethachlor + Napropamide[P] |
| 1 | 12 | 0 | 12 | 50 | Y | 50 | 500 + 630 |
| 2 | 12 | 77 | 79.76 | 88 | Y | 50 | 1000 + 630 |
| 3 | 12 | 68 | 71.84 | 78 | Y | 50 | 500 + 1260 |
| 4 | 12 | 94 | 94.72 | 92 | N | 50 | 1000 + 1260 |
| 5 | 37 | 0 | 37 | 80 | Y | 100 | 500 + 630 |
| 6 | 37 | 77 | 85.51 | 78 | N | 100 | 1000 + 630 |
| 7 | 37 | 68 | 79.84 | 87 | Y | 100 | 500 + 1260 |
| 8 | 37 | 94 | 96.22 | 82 | N | 100 | 1000 + 1260 |
| 9 | 47 | 0 | 47 | 67 | Y | 200 | 500 + 630 |
| 10 | 47 | 77 | 87.81 | 87 | N | 200 | 1000 + 630 |
| 11 | 47 | 68 | 83.04 | 75 | N | 200 | 500 + 1260 |
| 12 | 47 | 94 | 96.82 | 83 | N | 200 | 1000 + 1260 |

[α]measurement of synergistic behavior as Y = YES; N = NO
[β] and [P]Rate - g ai/ha

Example 36: Weed Control with 2,4-DC and Metsulfuron-Methyl Tank-Mix Combinations In this example a greenhouse study was conducted to determine the weed efficacy of 2,4-DC, with 2,4-DC alone or in combination with methsulfuron-methyl (AlluXP 60%) as postemergence treatment against the following weeds: Italian ryegrass (*Lolium perenne* L. ssp. *multiflorum*, LOLMU); wild oat (*Avena fatua*, AVEFA); common lambsquarters (*Chenopodium album*, CHEAL); blackgrass (*Alopecurus myosuroides*, ALOMY); littleseed canarygrass (*Phalaris minor*, PHAMI); annual bluegrass (*Poa annua*, POAAN); corn poppy (*Papaver rhoeas*, PARPH); common chickweed (*Stellaria media*, STEME); redroot pigweed (*Amaranthus retroflexus*, AMARE); wild mustard (*Sinapis arvensis*, SINAR); wild buckwheat (*Polygonum convolvulus*, POLCO). Crops screened were wheat and barley.

Methods:

2,4-DC (SC 36%) was applied at 50, 100, or 200 g ai/ha alone or as tank-mix with metsulfuron-methyl (60%) at 6, 9, or 12 g ai/ha. A non-treated check was included as reference standard. An application of pyrasulfotole+bromoxynil (HUSKIE™, 26.3%) at 271 g ai/ha and an application of thifensulfuron (HARMONY® SG, 75%) at 17.4 g ai/ha were included as standards for comparison. Treatments were applied POST to the following species at the heights given in parenthesis, Italian ryegrass (2-4"), wild oat (3-4"), common lambsquarters (1"), blackgrass (2-3"), littleseed canarygrass (1-2"), annual bluegrass (0.5"), corn poppy (1"), common chickweed (0.5"), redroot pigweed (1"), wild mustard (1"), wild buckwheat (1"), wheat (3-4"), and barley (2-4"). All plants were direct seeded into 3" plastic pots utilizing Pennington soil. After application plants were placed in the greenhouse and foliage was allowed to dry for 24 h. Thereafter plants were watered and fertilized routinely. Treatments were applied using compressed air at 40 PSI in a track spray chamber and 30 GPA spray volume using a TeeJet 8001E nozzle. Visual percent weed control and crop injury were recorded at 7, 14, 21, and 28 days after treatment (DAT), using a scale of 0 (no control/no injury) to 100 (complete plant death). Data (not included) were analyzed using Minitab statistical software at 95% confidence interval.

Results:

2,4-DC alone applied to barley was safe at 50 g ai/ha and wheat at wheat at ≤100 g. 2,4-DC+metsulfuron-methyl controlled (≥85% injury) common lambsquarters, littleseed canarygrass, corn poppy, common chickweed, redroot pigweed, and wild mustard with all combinations, wild buckwheat, and Italian ryegrass were controlled with two combinations. Wild oat, black grass and annual bluegrass were not controlled by any tank-mix combination. Wheat was not injured by three combinations while barley was safe with one tank-mix combination. HUSKIE™ controlled common lambsquarters, corn poppy, redroot pigweed, wild mustard, and wild buckwheat and was safe on barley; HARMONY® controlled common lambsquarters, common chickweed, redroot pigweed, and wild buckwheat and was safe on wheat and barley.

In summary, 2,4 DC when applied alone POST at all rates failed to control any weed and was safe on barley at 50 g ai/ha and on wheat at ≤100 g. 2, 4 DC plus metsulfuron-methyl controlled common lambsquarters, littleseed canarygrass, corn poppy, common chickweed, redroot pigweed, and wild mustard with all tank-mix combinations and was safe on wheat with three combinations and barley with one. The table below highlights unexpected synergistic effects of the tested combinations.

| 2,4-DC + metsulfuron-methyl - Italian ryegrass- 28 DAT | | | | | | | |
|---|---|---|---|---|---|---|---|
| Tmt | X | Y | Ex-pected | ob-served | syn-ergy$^\alpha$ | 2,4-DC$^\beta$ | metsulfuron-methyl$^P$ |
| 1 | 22 | 6 | 26.68 | 22 | N | 50 | 6 |
| 2 | 22 | 18 | 36.04 | 45 | Y | 50 | 9 |
| 3 | 22 | 16 | 34.48 | 76 | Y | 50 | 12 |
| 4 | 18 | 6 | 22.92 | 52 | Y | 100 | 6 |
| 5 | 18 | 18 | 32.76 | 68 | Y | 100 | 9 |
| 6 | 18 | 16 | 31.12 | 86 | Y | 100 | 12 |
| 7 | 29 | 6 | 33.26 | 68 | Y | 200 | 6 |
| 8 | 29 | 18 | 41.78 | 85 | Y | 200 | 9 |
| 9 | 29 | 16 | 40.36 | 83 | Y | 200 | 12 |

$^\alpha$measurement of synergistic behavior as Y = YES; N = NO $^\beta$ and $^P$Rate - g ai/ha

Example 37: Weed Control with 2,4-DC and Atrazine Tank-Mix Combinations

In this example a greenhouse study was conducted to determine the weed efficacy of 2,4-DC, with 2,4-DC alone or in combination with atrazine as preemergence (PRE) treatment against the following weeds: Common cocklebur (*Xanthium strumarium*, XANST); velvetleaf (*Abutilon theophrasti*, ABUTH); Jimsonweed (*Datura stramonium*, DATST); barnyardgrass (*Echinochloa crus-galli*, ECHCG); redroot pigweed (*Amaranthus retroflexus*, AMARE).

Methods:

2,4-DC (SC 36%) was applied at 50, 100 or 200 g ai/ha alone or as tank-mix with atrazine (4 L, 42.6%) at 140, 280, or 560 g ai/ha. A non-treated check was included as reference standard. S-metolachlor (DUAL II MAGNUM®, 82.4%) at 525 g ai/h plus atrazine at 560 g ai/h was included as a standard for comparison. Common cocklebur, velvetleaf, Jimsonweed, barnyardgrass, redroot pigweed, corn, sweet corn, and *sorghum* were direct seeded into 6"×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 30 GPA using a TeeJet 8001E nozzle at 40 PSI. Visual percent weed control and crop injury were recorded at 14, 21, and 28 days after treatment (DAT) using a scale of 0 (no control/no injury) to 100 (complete plant death). Data were analyzed using Minitab statistical software at 95% confidence interval.

Results:

2,4-DC applied alone at ≥50 g ai/ha controlled barnyardgrass 28 DAT. 2,4-DC applied alone at ≥200 g controlled velvetleaf and redroot pigweed, applied alone at 400 g 2,4-DC controlled Jimsonweed. Common cocklebur was not controlled by any rate of 2,4-DC applied alone. 2,4-DC plus atrazine controlled velvetleaf, Jimsonweed, barnyardgrass and redroot pigweed with all combinations. Common cocklebur was controlled with 6 tank-mix combinations of 2,4-DC plus atrazine. 2,4 DC applied alone was safe on corn ≤200 g, sweet corn or *sorghum* were not injured (>10%) by 2, 4 DC≤100 g. 2,4 DC plus atrazine as tank-mix generally well tolerated on corn, sweet corn and on *sorghum*.

In summary, 2, 4 DC alone controlled barnyardgrass at all rates, velvetleaf and redroot pigweed at 200 g ai/ha, and Jimsonweed at 400 g. 2, 4 DC plus atrazine controlled common cocklebur with 6 out of 9 combinations and controlled velvetleaf, Jimsonweed, barnyardgrass and redroot pigweed with all combinations. The table below highlights unexpected synergistic effects of the tested combinations.

| 2,4-DC + Atrazine - Common cocklebur- 28 DAT | | | | | | | |
|---|---|---|---|---|---|---|---|
| Tmt | X | Y | Ex-pected | ob-served | syn-ergy$^\alpha$ | 2,4-DC$^\beta$ | Atrazine$^P$ |
| 1 | 0 | 57 | 57 | 59 | Y | 50 | 140 |
| 2 | 0 | 92 | 92 | 97 | Y | 50 | 280 |
| 3 | 0 | 97 | 97 | 100 | Y | 50 | 560 |
| 4 | 7 | 57 | 60.01 | 100 | Y | 100 | 140 |
| 5 | 7 | 92 | 92.56 | 100 | Y | 100 | 280 |
| 6 | 7 | 97 | 97.21 | 100 | Y | 100 | 560 |
| 7 | 60 | 57 | 82.8 | 75 | N | 200 | 140 |
| 8 | 60 | 92 | 96.8 | 82 | N | 200 | 280 |
| 9 | 60 | 97 | 98.8 | 100 | Y | 200 | 560 |

$^\alpha$measurement of synergistic behavior as Y = YES; N = NO $^\beta$ and $^P$Rate - g ai/ha

| 2,4-DC + Atrazine - Velvetleaf- 28 DAT | | | | | | | |
|---|---|---|---|---|---|---|---|
| Tmt | X | Y | Ex-pected | ob-served | syn-ergy$^\alpha$ | 2,4-DC$^\beta$ | Atrazine$^P$ |
| 1 | 18 | 53 | 61.46 | 97 | Y | 50 | 140 |
| 2 | 18 | 63 | 69.66 | 99 | Y | 50 | 280 |
| 3 | 18 | 96 | 96.72 | 93 | N | 50 | 560 |
| 4 | 19 | 53 | 61.93 | 89 | Y | 100 | 140 |
| 5 | 19 | 63 | 70.03 | 97 | Y | 100 | 280 |
| 6 | 19 | 96 | 96.76 | 100 | Y | 100 | 560 |
| 7 | 90 | 53 | 95.3 | 100 | Y | 200 | 140 |
| 8 | 90 | 63 | 96.3 | 100 | Y | 200 | 280 |
| 9 | 90 | 96 | 99.6 | 100 | Y | 200 | 560 |

$^\alpha$measurement of synergistic behavior as Y = YES; N = NO $^\beta$ and $^P$Rate - g ai/ha

Example 38: Weed Control with 2,4-DC and Pyroxasulfone Tank-Mix Combinations In this example a greenhouse study was conducted to determine the weed efficacy of 2,4-DC, with 2,4-DC alone or in combination with pyroxasulfone as preemergence (PRE) treatment against the following weeds: Yellow nutsedge (*Cyperus esculentus*, CYPES); Italian ryegrass (*Lolium perenne* spp. *multiflorum*, LOLMU); morningglory spp (*Ipomea* spp); redroot pigweed (*Amaranthus retroflexus*, AMARE); velvetleaf (*Abutilon theophrasti*, ABUTH); kochia (*Kochia scoparia*, KCHSC); field bindweed (*Convolvulus arvensis*, CONAR).

Methods:

2,4-DC (SC 36%) was applied at 0, 50, 100 or 200 g ai/ha alone or as tank-mix with pyroxasulfone (85%) at 30, 60, or 90 g ai/ha. A non-treated check was included as reference standard. Pyroxasulfone plus fluthiacet-methyl (AN-THEM™, 23.3%) applied at 165 g ai/ha was included as a standard for comparison. Yellow nutsedge, Italian ryegrass, morningglory, redroot pigweed, velvetleaf, *kochia*, field bindweed, wheat, and corn were direct seeded into 6"×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 40 psi and a spray volume of 30 GPA using a TeeJet 8001E nozzle. Visual percent weed control and crop injury were recorded at 14, 21, and 28 days after treatment (DAT) using a scale of 0 (no control/no injury) to 100 (complete plant death). Data were analyzed using Minitab statistical software at 95% confidence interval.

Results:

2,4-DC applied alone at ≥50 g ai/ha controlled (≥85%) *kochia*, at ≥200 g controlled Italian ryegrass or redroot pigweed, and controlled velvetleaf at 400 g. 2,4-DC was selective to (≤10% injury) wheat when applied at ≤100 g, and selective to corn when applied at ≤200 g. 2,4-DC plus pyroxasulfone controlled Italian ryegrass, redroot pigweed and *kochia* with all combinations. Velvetleaf was controlled with all combinations except when 2,4-DC was applied at 50 gai/ha and pyroxasulfone was applied at 30 g ai/ha. Yellow nutsedge, morningglory or field bindweed were not controlled by any combination of 2,4-DC plus pyroxasulfone. Wheat was injured by 8 of 9 combinations, while corn was injured by 6 of 9 combinations of 2,4-DC plus pyroxasulfone. ANTHEM™ applied at 165 g ai/ha controlled all weeds except morningglory and field bindweed.

In summary, 2, 4 DC applied alone controlled *kochia* at all rates, Italian ryegrass and redroot pigweed at 200 g ai/ha, and velvetleaf at 400 g ai/ha. Wheat was not injured by 50 or 100 g of 2, 4 DC alone, while corn was safe at rates up to and including 200 g ai/ha. Tank-mix of 2,4 DC plus pyroxasulfone controlled Italian ryegrass, redroot pigweed, and *kochia* with all combinations, velvet leaf with certain combinations and failed to control yellow nutsedge, morninggglory, or field bindweed with any combination. Wheat was not injured by one combination. Safety results were favorable for corn with the tested combinations.

The table below highlights unexpected synergistic effects of the tested combinations.

2,4-DC + pyroxasulfone - Morningglory sp.-28 DAT

| Tmt | X | Y | Ex-pected | ob-served | syn-ergy$^\alpha$ | 2,4-DC$^\beta$ | pyroxasulfone$^\rho$ |
|---|---|---|---|---|---|---|---|
| 1 | 0 | 9 | 9 | 8 | N | 50 | 30 |
| 2 | 0 | 60 | 60 | 30 | N | 50 | 60 |
| 3 | 0 | 65 | 65 | 45 | N | 50 | 90 |
| 4 | 2 | 9 | 10.82 | 0 | N | 100 | 30 |
| 5 | 2 | 60 | 60.8 | 12 | N | 100 | 60 |
| 6 | 2 | 65 | 65.7 | 87 | Y | 100 | 90 |
| 7 | 2 | 9 | 10.82 | 12 | Y | 200 | 30 |
| 8 | 2 | 60 | 60.8 | 67 | Y | 200 | 60 |
| 9 | 2 | 65 | 65.7 | 50 | N | 200 | 90 |

$^\alpha$measurement of synergistic behavior as Y = YES; N = NO
$^\beta$ and $^\rho$Rate - g ai/ha

Example 39: Weed Control with 2,4-DC, and Pyroxasulfone Plus Carfentrazone Tank-Mix Combinations In this example a greenhouse study was conducted to determine the weed efficacy of 2,4-DC, with 2,4-DC alone or in combination with Pyroxasulfone plus Carfentrazone as preemergence (PRE) treatment against the following weeds: Redroot pigweed (*Amaranthus retroflexus*, AMARE); littleseed canarygrass (*Phalaris minor*, PHAMI); Canada thistle (*Cirsium arvense*, CIRAR); dandelion (*Taraxacum officinale*, TAROF); green foxtail (*Setaria viridis*, SETVI); wild oat (*Avena fatua*, AVEFA); white clover (*Trifolium repens*, TRFRE); yellow nutsedge (*Cyperus esculentus*, CYPES); Italian ryegrass (*Lolium perenne* spp. *multiflorum*, LOLMU); common chickweed (*Stellaria media*, STEME); quackgrass (*Elytrigia repens*, AGRRE); field bindweed (*Convolvulus arvensis*, CONAR).

Methods:

2,4-DC (SC 36%) was applied at 50, 100, or 200 g ai/ha alone or as tank-mix with pyroxasulfone (KIH485 WG 85%) and carfentrazone-ethyl (AimEC® 22.3%.) Pyroxasulfone rates for alone or tank-mix application were 30, 60, or 90 g ai/ha and the carfentrazone-ethyl rate was 25 g ai/ha. A non-treated check was included as reference standard. Clomazone (COMMAND® 3ME) at 200 g plus pyroxasulfone at 90 g and carfentrazone-ethyl at 25 g was included as a standard for comparison. Redroot pigweed, littleseed canarygrass, Canada thistle, dandelion, green foxtail, wild oat, white clover, yellow nutsedge, Italian ryegrass, common chickweed, quackgrass, field bindweed, canola, and wheat were direct seeded into 6"×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 30 GPA using a TeeJet 8001E nozzle at 40 PSI. Visual percent weed control and crop injury were recorded at 14, 21, and 28 days after treatment (DAT) using a scale of 0 (no control/no injury) to 100 (complete plant death). Data (not included) were analyzed using Minitab statistical software at 95% confidence interval.

Results:

2,4-DC alone at ≥50 g ai/ha controlled (≥85%) Canada thistle, dandelion, or common chickweed. Applied at 100 g, 2,4-DC controlled redroot pigweed and Italian ryegrass; littleseed canarygrass and wild oat were controlled at 200 g. 2,4-DC combined as tank-mix with pyroxasulfone plus carfentrazone-ethyl controlled redroot pigweed, littleseed canarygrass, Canada thistle, dandelion, green foxtail, wild oat, white clover, Italian ryegrass and common chickweed with all combinations. Quackgrass and field bindweed were controlled with 8 of 9 tank-mix combinations; yellow nutsedge was controlled with 1 combination. Clomazone plus pyroxasulfone and carfentrazone-ethyl applied as a standard for comparison controlled all weeds except yellow nutsedge.

2, 4 DC applied alone controlled Canada thistle, dandelion, green foxtail, and common chickweed at all rates, redroot pigweed, Italian ryegrass, littleseed canary grass, and wild oat were controlled at certain rates. 2, 4 DC was safe on wheat at lower rates and canola at most rates. 2, 4 DC plus pyroxasulfone and carfentrazone-ethyl controlled all weeds with all combinations except quackgrass and field bindweed which were controlled with most combinations while yellow nutsedge was controlled with 1 combination. Canola was not safe with any combination. The table below highlights unexpected synergistic effects of the tested combinations.

2,4-DC + pyroxasulfone + carfentrazone - Yellow nutsedge-28 DAT

| Tmt | X | Y | Ex-pected | ob-served | syn-ergy$^\alpha$ | 2,4-DC$^\beta$ | pyroxasulfone + carfentrazone$^\rho$ |
|---|---|---|---|---|---|---|---|
| 1 | 1 | 2 | 2.98 | 0 | N | 50 | 30 + 25 |
| 2 | 1 | 17 | 17.83 | 32 | Y | 50 | 60 + 25 |
| 3 | 1 | 80 | 80.2 | 63 | N | 50 | 90 + 25 |
| 4 | 3 | 2 | 4.94 | 20 | Y | 100 | 30 + 25 |
| 5 | 3 | 17 | 19.49 | 53 | Y | 100 | 60 + 25 |
| 6 | 3 | 80 | 80.6 | 91 | Y | 100 | 90 + 25 |
| 7 | 3 | 2 | 4.94 | 23 | Y | 200 | 30 + 25 |
| 8 | 3 | 17 | 19.49 | 73 | Y | 200 | 60 + 25 |
| 9 | 3 | 80 | 80.6 | 79 | N | 200 | 90 + 25 |

$^\alpha$measurement of synergistic behavior as Y = YES; N = NO
$^\beta$ and $^\rho$Rate - g ai/ha Unexpected crop safety has been observed for at least 7 crops: barley, canola, corn, cowpea, *sorghum*, sweet corn, and wheat. This unexpected crop safety results is noted in the following PRE/POST studies.

Example 40: Crop Safety with 2,4-DC and Metsulfuron-Methyl Tank-Mix Combinations In this example a greenhouse study was conducted to determine crop safety and weed efficacy of 2,4-DC, with 2,4-DC alone or in combination with methsulfuron-methyl as postemergence (POST) treatment against the following weeds: Wild oat (*Avena fatua*, AVEFA) wild buckwheat (*Polygonum convolvulus*, POLCO), common chickweed (*Stellaria media*, STEME), common lambsquarters (*Chenopodium album*, CHEAL), wild mustard (*Sinapis arvensis*, SINAR), Italian ryegrass (*Lolium perenne* L. ssp. *multiflorum*, LOLMU). Treatments were applied to barley and wheat crops.

Methods:

2,4-DC (SC 36%) was applied at 125, 170, 210, or 250 g ai/ha alone or as tank-mix with metsulfuron-methyl (AllyXP 60%) 60%) at 2, 3, or 4 g ai/ha. A non-treated check was included as reference standard. Thifensulfuron-methyl+tribenuron-methyl+metsulfuron-methyl (ACCURATE EXTRA®, 37.5%+18.75%+15%) at 31.48 g ai/ha or thifensulfuron-methyl+tribenuron-methyl (HARMONY EXTRA®SG, 33.33%+16.67%) at 19.95 g ai/ha were applied as commercial standards. Non-ionic surfactant (NIS) was added to all treatments at 0.5% v/v. All plant species were direct seeded into 3" plastic pots using metro-mix as growth media. At treatment common lambsquarters was 1.75", common chickweed was 2", wild mustard was 2.25", wild oat was 5.5", wild buckwheat was 2-5", Italian ryegrass was 2-3", wheat was 5.5" and barley was 4.5" in height. Plants were watered well before application and not watered 24 h after application. Plants were watered and fertilized routinely after treatment application. Each treatment was replicated four times. Treated flats were placed in randomized block design in the greenhouse. Treatments were applied with compressed air in a track spray chamber at 30 GPA using a TeeJet 8001E nozzle at 40 PSI. Visual percent wheat and barley injury and weed control were recorded at 7, 14, 21, and 28 days after treatment (DAT), using a scale of 0 (no control/no crop injury) to 100 (complete plant death). Data were analyzed using Minitab statistical software at 95% confidence interval.

Results:

All tank-mix applications of 2,4-DC plus metsulfuron-methyl gave ≥85% control of common chickweed, wild mustard, and common lambsquarters, 10 combinations controlled wild buckwheat. Wild oat and Italian ryegrass were not controlled by any tank-mix combination. Wheat was not injured by any combination; barley was moderately injured by 2 combinations and safe with all other tank-mix combinations.

Metsulfuron-methyl alone controlled wild buckwheat, common chickweed, wild mustard, and common lambsquarters at all rates and was safe on both crops at all rates. Thifensulfuron-methyl plus tribenuron-methyl plus metsulfuron-methyl or thifensulfuron-methyl plus tribenuron-methyl both controlled wild buckwheat, wild mustard, common chickweed, and common lambsquarters and were safe on barley and wheat; neither standard controlled wild oat or Italian ryegrass.

The 7 days safety results indicated favorable injury profile for combination treatments compared to individual ingredients applied alone. 2,4-DC applied alone was safe at all rates on both wheat and barley. Plant injury was greater than 10% with 2,4 DC alone at 170 g ai/hec compared to when 2,4 DC was applied at the same rates with metsulfuron-methyl. As such, in general, the combination showed a better safety profile compared to 2, 4 DC application at 170 g ai/hec and metsulfuron-methyl at 3 g ai/hec.

| 2,4-DC + metsulfuron-methyl- Barley-7 DAT Crop Injury | | | | | | |
|---|---|---|---|---|---|---|
| Tmt | X | Y | Expected | observed[ε] | 2,,4-DC[β] | Metsulfuron-methyl[P] |
| 1 | 4 | 5 | 8.8 | 4 | 125 | 2 |
| 2 | 4 | 7 | 10.72 | 8 | 125 | 3 |
| 3 | 4 | 9 | 12.64 | 6 | 125 | 4 |
| 4 | 6 | 5 | 10.7 | 5 | 170 | 2 |
| 5 | 6 | 7 | 12.58 | 6 | 170 | 3 |
| 6 | 6 | 9 | 14.46 | 5 | 170 | 4 |
| 7 | 8 | 5 | 12.6 | 6 | 210 | 2 |
| 8 | 8 | 7 | 14.44 | 8 | 210 | 3 |
| 9 | 8 | 9 | 16.28 | 8 | 210 | 4 |
| 10 | 14 | 5 | 18.3 | 5 | 250 | 2 |
| 11 | 14 | 7 | 20.02 | 8 | 250 | 3 |
| 12 | 14 | 9 | 21.74 | 8 | 250 | 4 |

[ε] measurement of % crop injury: safe (0-10%); moderate (11-20%); injured (≥20)
[β] and [P] Rate - g ai/ha

| 2,4-DC + metsulfuron-methyl- Wheat-7 DAT Crop Injury | | | | | | |
|---|---|---|---|---|---|---|
| Tmt | X | Y | Expected | observed[ε] | 2,,4-DC[β] | Metsulfuron-methyl[P] |
| 1 | 5 | 1 | 5.95 | 2 | 125 | 2 |
| 2 | 5 | 0 | 5 | 2 | 125 | 3 |
| 3 | 5 | 2 | 6.9 | 2 | 125 | 4 |
| 4 | 14 | 1 | 14.86 | 2 | 170 | 2 |
| 5 | 14 | 0 | 14 | 5 | 170 | 3 |
| 6 | 14 | 2 | 15.72 | 3 | 170 | 4 |
| 7 | 17 | 1 | 17.83 | 5 | 210 | 2 |
| 8 | 17 | 0 | 17 | 4 | 210 | 3 |
| 9 | 17 | 2 | 18.66 | 3 | 210 | 4 |
| 10 | 31 | 1 | 31.69 | 4 | 250 | 2 |
| 11 | 31 | 0 | 31 | 4 | 250 | 3 |
| 12 | 31 | 2 | 32.38 | 2 | 250 | 4 |

[ε] measurement of % crop injury: safe (0-10%); moderate (11-20%); injured (≥20)
[β] and [P] Rate - g ai/ha

Example 41: Crop Safety with 2,4-DC and Thifensulfuron-Methyl Tank-Mix Combinations In this example, a greenhouse study was conducted to determine crop selectivity and weed efficacy of 2,4-DC, with 2,4-DC alone or in combination with thifensulfuron-methyl as postemergence (POST) treatment against the following weeds: Wild oat (*Avena fatua*, AVEFA) wild buckwheat (*Polygonum convolvulus*, POLCO), common chickweed (*Stellaria media*, STEME), common lambsquarters (*Chenopodium album*, CHEAL), wild mustard (*Sinapis arvensis*, SINAR). Treatments were applied to wheat and barley crops.

Methods:

2,4-DC (SC 36%) was applied at 0, 125, 170, 210, or 250 g ai/ha alone or as tank-mix with metsulfuron-methyl (AllyXP 60%) at 50, 75, or 100 g ai/ha. A non-treated check was included as reference standard. Thifensulfuron-methyl+tribenuron-methyl+metsulfuron-methyl (ACCURATE EXTRA®, 37.5%+18.75%+15%) at 49 g ai/ha or thifensulfuron-methyl+tribenuron-methyl (HARMONY EXTRA®

SG, 33.33%+16.67%) at 21 g ai/ha were applied as commercial standards. Nonionic surfactant was added at 0.5% v/v in all treatments. Treatments were applied to wheat (5.5"), barley (5"), wild oat (5.5"), common chickweed (2"), wild buckwheat (3"), and common lambsquarters (2"). All plant species were direct seeded into 3" plastic pots using metro-mix as growth media and pots were watered well before application and watered 24 h after application. Plants were watered and fertilized routinely after treatment application. Each treatment was replicated four times. Treatments were applied with compressed air in a track spray chamber at 30 GPA using a TeeJet 8001E nozzle at 40 PSI. Visual percent wheat and barley injury and weed control were recorded at 7, 14, 21, and 28 days after treatment (DAT), using a scale of 0 (no control/no crop injury) to 100 (complete plant death). Data were analyzed using Minitab statistical software at 95% confidence interval.

Results:

All tank-mix applications of 2,4-DC plus thifensulfuron-methyl gave ≥85% control of wild buckwheat, common chickweed, wild mustard, and common lambsquarters. Wild oat was not controlled by any combination. Wheat was safe with all 6 combinations when 2,4-DC was applied at 170 g ai/ha or lower rates with thifensulfuron-methyl and safe with two combinations when applied at 210 g of 2,4-DC. Seven tank-mix combinations of 2,4-DC+thifensulfuron-methyl were safe on barley. Wheat was safe with 2,4-DC alone up to 170 g ai/ha, barley was not safe with any rate of 2,4-DC alone. Thifensulfuron-methyl alone controlled all weeds except wild oat, and was safe on both crops. The data suggests that thifensulfuron-methyl has a safening effect as it decreased 2,4-DC injury on wheat and barley. Both barley and wheat injury decreased when 2,4-DC was applied with thifensulfuron-methyl as compared to the same rate of 2,4-DC alone.

Application of 2,4 DC alone at 125 g ai/ha and above or thifensulfuron-methyl alone at 50 g ai/ha caused injury on barley and wheat but co-application of herbicides reduced injury compared to 2,4 DC alone by ≥10% when applied together at the same rates. Therefore the combination provides a better safety profile than 2,4 DC alone.

| | 2,4-DC + thifensulfuron-methyl- Barley-14 DAT crop injury | | | | |
|---|---|---|---|---|---|
| Tmt | 2,,4-DC$^\Omega$ | Thifensulfuron-M$^\varphi$ | observed$^\epsilon$ | 2,,4-DC$^\beta$ | Thifensulfuron-M$^\rho$ |
| 1 | 17 | 2 | 8 | 125 | 50 |
| 2 | 17 | 2 | 12 | 125 | 75 |
| 3 | 17 | 2 | 14 | 125 | 100 |
| 4 | 17 | 2 | 16 | 170 | 50 |
| 5 | 17 | 2 | 15 | 170 | 75 |
| 6 | 17 | 2 | 14 | 170 | 100 |
| 7 | 18 | 2 | 20 | 210 | 50 |
| 8 | 18 | 2 | 14 | 210 | 75 |
| 9 | 18 | 2 | 14 | 210 | 100 |
| 10 | 23 | 2 | 16 | 250 | 50 |
| 11 | 23 | 2 | 19 | 250 | 75 |
| 12 | 23 | 2 | 0 | 250 | 100 |

$^\Omega$, $^\varphi$measurement of % crop injury for respective ai alone: safe (0-10%); moderate (11-20%); injured (≥20)
$^\epsilon$measurement of % crop injury with combination of the tested ais
$^\beta$ and $^\rho$Rate - g ai/ha

| | 2,4-DC + thifensulfuron-methyl- Wheat-14 DAT crop injury | | | | |
|---|---|---|---|---|---|
| Tmt | 2,,4-DC$^\Omega$ | Thifensulfuron-M$^\varphi$ | observed$^\epsilon$ | 2,,4-DC$^\beta$ | Thifensulfuron-M$^\rho$ |
| 1 | 26 | 0 | 2 | 125 | 50 |
| 2 | 26 | 0 | 5 | 125 | 75 |
| 3 | 26 | 1 | 6 | 125 | 100 |
| 4 | 30 | 0 | 8 | 170 | 50 |
| 5 | 30 | 0 | 10 | 170 | 75 |
| 6 | 30 | 1 | 10 | 170 | 100 |
| 7 | 31 | 0 | 13 | 210 | 50 |
| 8 | 31 | 0 | 11 | 210 | 75 |
| 9 | 31 | 1 | 9 | 210 | 100 |
| 10 | 32 | 0 | 12 | 250 | 50 |
| 11 | 32 | 0 | 13 | 250 | 75 |
| 12 | 32 | 1 | 15 | 250 | 100 |

$^\Omega$, $^\varphi$measurement of % crop injury for respective ai alone: safe (0-10%); moderate (11-20%); injured (≥20)
$^\epsilon$measurement of % crop injury with combination of the tested ais
$^\beta$ and $^\rho$Rate - g ai/ha

Example 42: Crop Safety with 2,4-DC and Sulfentrazone Tank-Mix Combinations

In this example, a greenhouse study was conducted to determine crop selectivity and weed efficacy of 2,4-DC, with 2,4-DC alone or in combination with sulfentrazone as preemergence (PRE) treatment against the following weeds: Palmer amaranth (Amaranthus palmeri, AMAPA); common ragweed (Ambrosia artemisiifolia, AMBEL); Pennsylvania smartweed (Polygonum pensylvanicum, POLPY); velvetleaf (Abutilon theophrasti, ABUTH); wild oat (Avena fatua, AVEFA); green foxtail (Setaria viridis, SETVI); morningglory spp. (Ipomoea spp.); Italian ryegrass (Lolium perenne L. ssp. multiflorum, LOLMU). Crops tested included corn, wheat, cotton, cowpea, and bush bean.

Methods:

2,4-DC (SC 42%) was applied at 0, 31.2, 62.5, 125, 250 or 375 g ai/ha alone or as tank-mix with sulfentrazone (SPARTAN® 4F, 39.6%) at 105, 210, or 315 g ai/ha. A non-treated check was included as reference standard. Palmer amaranth, common ragweed, Pennsylvania smartweed, velvetleaf, wild oat, green foxtail, morningglory, and Italian ryegrass were screened. Corn, wheat, cotton (cotton was not rated due to aphid infestation), cowpea, and bush bean (var. Supremo) were also included in the study. All plants were direct seeded into 6×10" fiber flats utilizing Pennington soil. Flats were watered after seeding but prior to treatment. After application flats were placed in the greenhouse and lightly watered. Thereafter flats were watered and fertilized routinely. Treatments were applied using compressed air in a track spray chamber at 30 GPA using a TeeJet 8001E nozzle at 40 PSI. Visual percent weed control was recorded at 14, 21, and 28 days after treatment (DAT), crop injury was recorded at 7, 14, 21, and 28 DAT, using a scale of 0 (no control/injury) to 100 (complete plant death). Data (not included) were analyzed using Minitab statistical software at 95% confidence interval.

Results:

2,4-DC applied alone was safe at all rates on all crops at 14 DAT. Sulfentrazone alone was safe on corn and bush bean only at 105 g, wheat and cowpea at 105 or 210 g 14 DAT. With 15 combinations of 2,4-DC+sulfentrazone, 6 were safe on wheat, 8 were safe on cowpea, and 11 were safe on corn. All tank-mix combinations injured bush bean at 14 DAT. 2,4-DC alone was safe on cowpea at all rates (data not included). Sulfentrazone alone at 28 DAT injured both crops at all rates. 2,4-DC plus sulfentrazone tank-mixes were safe on cowpea with 6 combinations, while all combinations injured bush bean. The table below highlights unexpected safening effects of the tested combinations.

| | 2,,4-DC[β] | Sulfentrazone[ρ] | observed[ε] | 2,,4-DC[β] | Sulfentrazone[ρ] |
|---|---|---|---|---|---|
| Tmt | | | | | |
| 1 | 0 | 3 | 2 | 31 | 105 |
| 2 | 0 | 10 | 7 | 31 | 210 |
| 3 | 0 | 38 | 7 | 31 | 315 |
| 4 | 2 | 3 | 7 | 63 | 105 |
| 5 | 2 | 10 | 12 | 63 | 210 |
| 6 | 2 | 38 | 17 | 63 | 315 |
| 7 | 0 | 3 | 6 | 125 | 105 |
| 8 | 0 | 10 | 7 | 125 | 210 |
| 9 | 0 | 38 | 15 | 125 | 315 |
| 10 | 1 | 3 | 6 | 250 | 105 |
| 11 | 1 | 10 | 17 | 250 | 210 |
| 12 | 1 | 38 | 25 | 250 | 315 |
| 13 | 3 | 3 | 5 | 375 | 105 |
| 14 | 3 | 10 | 15 | 375 | 210 |
| 15 | 3 | 38 | 22 | 375 | 315 |

2,4-DC + sulfentrazone - Corn-21 DAT crop injury

[ε]measurement of % crop injury: safe (0-10%); moderate (11-20%), injured (≥20)
[β] and [ρ]Rate - g ai/ha

Example 43: Crop Safety with 2,4-DC, and Pyroxasulfone Plus Carfentrazone Tank-Mix Combinations

In this example crop safety analysis of 2,4-DC, with 2,4-DC alone or in combination with Pyroxasulfone plus Carfentrazone as preemergence treatment was conducted against the following weeds: Redroot pigweed (*Amaranthus retroflexus*, AMARE); littleseed canarygrass (*Phalaris minor*, PHAMI); Canada thistle (*Cirsium arvense*, CIRAR); dandelion (*Taraxacum officinale*, TAROF); green foxtail (*Setaria viridis*, SETVI); wild oat (*Avena fatua*, AVEFA); white clover (*Trifolium repens*, TRFRE); yellow nutsedge (*Cyperus esculentus*, CYPES); Italian ryegrass (*Lolium perenne* spp. *multiflorum*, LOLMU); common chickweed (*Stellaria media*, STEME); quackgrass (*Elytrigia repens*, AGRRE); field bindweed (*Convolvulus arvensis*, CONAR). Treatments were applied to canola and wheat.

Results:

2,4 DC alone was safe (≤10% injury) on canola at ≤200 g ai/ha and safe on wheat at ≤100 g. 2,4 DC plus pyroxasulfone plus carfentrazone-ethyl was not safe on canola with any tank-mix combination and was safe on wheat with 1 tank-mix combination. Clomazone plus pyroxasulfone plus carfentrazone-ethyl injured both crops. 2,4 DC alone provided safer alternative compared to the combinations tested.

Example 44: Crop Safety with 2,4-DC, and Metazachlor Plus Napropamide Tank-Mix Combinations

In this example, a greenhouse study was conducted to determine crop selectivity and weed efficacy of 2,4-DC, with 2,4-DC alone or in combination with Metazachlor plus Napropamide as preemergence treatment against the following weeds: Redroot pigweed (*Amaranth retroflexus*, AMARE), Italian ryegrass (*Lolium perenne. multiflorum*, LOLMU), wild mustard (*Sinapis arvensis*, SINAR), annual bluegrass (*Poa annua* POAAN), wild oat (*Avena fatua*, AVEFA), blackgrass (*Alopecurus myosuroides*, ALOMY), common lambsquarters (*Chenopodium album*, CHEAL), littleseed canarygrass (*Phalaris minor*, PHAMI), common chickweed (*Stellaria media*, STEME), corn poppy (*Papaver rhoeas*, PAPRH) and silky windgrass (*Apera spica-venti*, APESV). Crops tested included wheat and canola.

Methods:

2,4-DC (SC 36%) was applied at 50, 100, or 200 g ai/ha alone or as tank-mix with metazachlor (Butisan® 43.1%) and napropamide (Devrinol® 50DF). Metazachlor rates for alone or tank-mix application were 250, 500, and 750 g ai/ha and the napropamide rate was 1260 g ai/ha. A non-treated check was included as reference standard. Other treatments included tank-mix application of clomazone (COMMAND® 3ME 31.4%) plus metazachlor plus napropamide at 100+750+1260 g ai/ha and an application of clomazone (2.13%) plus metazachlor (13%) plus napropamide (13.6%) premix at 1572 g ai/ha. Treatments were applied before the emergence of redroot pigweed, Italian ryegrass, wild oat, blackgrass, littleseed canarygrass, common chickweed, common lambsquarters, corn poppy, wild mustard, annual bluegrass, silky windgrass, canola, and wheat. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data were analyzed using Minitab statistical software at 95% confidence interval.

All combinations of 2,4-DC+Metazachlor+Napropamide caused 100% mortality of pigweed, corn poppy, Italian ryegrass, annual bluegrass, lambsquarters, canarygrass, chickweed and silky windgrass. Blackgrass was controlled with all nine combinations. No combination was safe on wheat while three combinations were safe on canola. For example, when 2,4-DC was coapplied with metazachlor+napropamide at same rates, injury to canola was reduced to 3%. 2,4-DC alone provided control of corn poppy at ≥100 g, Italian ryegrass at ≥200 g, lambsquarters, 400 g, blackgrass at ≥200 g, silky windgrass at ≥100 g and chickweed at all rates.

In summary, 2,4-DC caused greater than 10% injury to canola at all rates. 2,4-DC was safe on wheat up to 200 g ai/ha. When 2,4-DC was coapplied with metazachlor+napropamide at same rates, injury to canola was reduced dramatically. All combinations of metazachlor+napropamide provided control of nearly all species at all rates and did not show selectivity to canola and wheat. The table below highlights unexpected safening effects of the tested combinations.

Example 45: Crop Safety with 2,4-DC and Mesotrione Tank-Mix Combinations

In this example, crop safety of 2,4-DC, with 2,4-DC alone or in combination with mesotrione as preemergence treatment were analysed against the following weeds: Jimsonweed (*Datura stramonium*, DATST), velvetleaf (*Abutilon theophrasti*, ABUTH), hairy beggarticks (*Asteraceae bidens*, BIDPA), common cocklebur (*Xanthium strumarium*, XANST), barnyardgrass (*Echinochloa crus-galli*, ECHCG). Treatments were also applied ot sweet corn, yellow corn, and *sorghum*.

Methods:

2,4-DC (SC 36%) was applied at 50, 100, or 200 g ai/ha alone or as tank-mix with mesotrione (40%) at 25, 50 or 100 g ai/ha. A non-treated check was included as reference standard. Other treatments included a tank-mix application of mesotrione plus S-metolachlor (Dual II Magnum 82.4%) at 100+525 g and an application of 2,4-DC at 400 g applied alone only. Treatments were applied before the emergence of Jimsonweed, velvetleaf, hairy beggarticks, common cocklebur, barnyardgrass, sweet corn, yellow corn, and *sorghum*. Plant species were planted in fiber flats (6"×10") containing Pennington soil and flats were watered well before application and watered lightly after application. Flats were watered and fertilized routinely after treatment application. Treatments were applied using compressed air track spray chamber at 30 GPA using a TeeJet 8001E nozzle at 40 PSI. Visual percent weed control and percent visual crop injury data were collected at 14, 21, and 28 days after treatment using a scale of 0 (no control/no injury) to 100 (complete plant death). Data were analyzed using Minitab statistical software at 95% confidence interval.

Results:

2,4-DC alone was safe on sweet corn and *sorghum* at the lowest rate while safe on yellow corn at 50 or 100 g ai/ha. Mesotrione alone was safe on sweet corn and yellow corn at all three rates; safe on *sorghum* at 25 and 50 g. Out of nine combinations of 2,4-DC+mesotrione, two combinations were safe (≤10%) on sweet corn, five combinations were safe on *sorghum* and seven combinations were safe on yellow corn.

Example 46: 2,4-DC and 2,5-DC Safety on Sorghum

To compare preemergence (PRE) *sorghum* tolerance, 2,4-DC (42% SC), 2,5-DC (47.5%), COMMAND® 4EC (clomazone, 46.7%), and COMMAND® 3ME (clomazone, 31.4%) were applied at 31, 63, 125, 250, and 375 g ai/ha. A non-treated check was included as reference standard. Treatments were applied to *sorghum* at the time of planting using Pennington soil. Each treatment was replicated four times. Soil was watered before and after application for herbicide activation. Plants were watered and fertilized routinely. Treatments were applied using compressed air track spray chamber at 30 GPA using a TeeJet 8001E nozzle at 40 PSI. Visual percent crop injury was recorded at 7, 14, 21, and 28 days after treatment using a scale of 0 (no injury) to 100 (complete plant death). Data were analyzed using Minitab statistical software at 95% confidence interval.

TABLE

Percent sorghum injury at different rating intervals with 2,4-DC, 2,5-DC, COMMAND ® 4EC or 3ME when applied preemergence.

| Formulation | g ai/ha | Days after application | | | |
| | | 7 | 14 | 21 | 28 |
| --- | --- | --- | --- | --- | --- |
| Non-treated check | — | 0 | 0 | 0 | 0 |
| 2,4-DC | 31 | 0 | 0 | 0 | 0 |
| 2,4-DC | 63 | 2 | 0 | 0 | 0 |
| 2,4-DC | 125 | 9 | 7 | 5 | 5 |
| 2,4-DC | 250 | 25 | 17 | 12 | 12 |
| 2,4-DC | 375 | 38 | 28 | 20 | 13 |
| 2,5-DC | 31 | 0 | 0 | 1 | 1 |
| 2,5-DC | 63 | 2 | 0 | 0 | 0 |
| 2,5-DC | 125 | 6 | 6 | 6 | 5 |
| 2,5-DC | 250 | 21 | 21 | 19 | 16 |
| 2,5-DC | 375 | 35 | 28 | 16 | 11 |
| COMMAND ® 4EC | 31 | 8 | 6 | 5 | 5F |
| COMMAND ® 4EC | 63 | 6 | 8 | 8 | 6 |
| COMMAND ® 4EC | 125 | 16 | 15 | 12 | 12 |

TABLE-continued

Percent sorghum injury at different rating intervals with 2,4-DC, 2,5-DC, COMMAND ® 4EC or 3ME when applied preemergence.

| Formulation | g ai/ha | Days after application | | | |
| | | 7 | 14 | 21 | 28 |
| --- | --- | --- | --- | --- | --- |
| COMMAND ® 4EC | 250 | 35 | 43 | 35 | 25 |
| COMMAND ® 4EC | 375 | 48 | 68 | 71 | 71 |
| COMMAND ® 3ME | 31 | 5 | 7 | 5 | 5 |
| COMMAND ® 3ME | 63 | 4 | 1 | 1 | 1 |
| COMMAND ® 3ME | 125 | 10 | 10 | 9 | 9 |
| COMMAND ® 3ME | 250 | 33 | 31 | 39 | 39 |
| COMMAND ® 3ME | 375 | 38 | 58 | 58 | 58 |

In this study 2,4-DC and 2,5-DC were safe on *sorghum* at rates ranging from 31 to 125 g ai/ha irrespective of rating timings (Table given above). The injury to *sorghum* with 2,4-DC and 2,5-DC was greater than ≥11% at 250 and 375 g. Both formulations of clomazone (COMMAND® 4EC & 3ME) were safe up to 63 g; however, 3ME showed safety at 125 g at 21 and 28 DAT (Table given above).

Example 47: Volatility of Formulations

The column method was used to determine clomazone volatility from moist double-sieved Pennington soil. Clomazone or clomazone compounds (2,4-DC or 2,5-DC) were applied to the soil at 1000 g ai/ha. The amount of clomazone trapped from the column during the 18-hour collection, averaged over four replicates, in units of micrograms was determined. The relative amount of volatilization compared to the 4EC formulation (mean value, shown as a percentage) was determined. Analysis of extracted methanol samples was conducted utilizing HPLC. The mean of those values, over 4 replicates, was then converted to obtain the total ugs per treatment.

| Example | Formulation type | % volatility control vs. COMMAND ® 4EC |
| --- | --- | --- |
| COMMAND ® 3ME standard | CS | 84.9 |
| COMMAND ® 4EC reference | EC | 0.0 |
| 2,4-DC, Example 9A | CS | 85.1 |
| 2,4-DC, Example 9C | CS | 52.7 |
| 2,4-DC, Example 9D | CS | 31.1* |
| 2,4-DC, Example 9E | CS | 53.5 |
| 2,4-DC, Example 9F | CS | 100 |
| 2,4-DC, Example 9G | CS | 100 |
| 2,4-DC, Example 1A | SC | 64 |

*In this case microencapsulation provided less volatility control than for the SC formulation.

All references cited herein are incorporated by reference in their entirety.

While this invention has been described with an emphasis upon preferred embodiments, it will be obvious to those of ordinary skill in the art that variations in the preferred compositions and methods can be used and that it is intended that the invention can be practiced otherwise than as specifically described herein. Accordingly, this invention includes all modifications encompassed within the spirit and scope of the invention as defined by the claims that follow.

What is claimed is:

1. A method of controlling undesired vegetation in a wheat crop comprising applying to the locus of said vegetation an herbicidally-effective amount of a composition comprising a first herbicide 2-(2,4-dichlorophenyl) methyl- 4,4-dimethyl-3-isoxazolidinone ("2,4-DC") and optionally at least a second herbicide, and agriculturally acceptable salts or esters thereof, the second herbicide being selected from the group consisting of: bromoxynil, diflufenican, metsulfuron-methyl, napropamide, pyroxasulfone, thifensulfuron-methyl, sulfentrazone; and mixtures of the two or more said second herbicide; wherein the first herbicide is applied at a rate of at least 50 g ai/ha and there is no observed phytotoxicity of greater than 10% to the wheat crop 7 to 28 days after treatment (DAT).

2. The method of claim 1, wherein said undesired vegetation is selected from the group consisting of annual blue grass, Benghal dayflower, black grass, black night shade, broadleaf signal grass, Canada thistle, cheat, common cocklebur (Xanthium pensylvanicum), common ragweed, corn poppies, field violet, giant foxtail, goose grass, green fox tail, guinea grass, hairy beggarticks, herbicide-resistant black grass, horseweed, Italian rye grass, jimsonweed, johnsongrass (Sorghum halepense), large crabgrass, little seed canary grass, morning glory, Pennsylvania smartweed, pitted morningglory, prickly sida, quack grass, redroot pigweed, shatter cane, sheppard's purse, silky windgrass, sunflower (as weed in potato), wild buckwheat (Polygonum convolvulus), wild mustard (Brassica kaber), wild oat (Avena fatua), wild pointsettia, yellow foxtail, and yellow nutsedge (Cyperus esculentus).

3. The method of claim 1, wherein said optional second herbicide is present in the composition.

4. The method of claim 3, wherein said second herbicide, are agriculturally acceptable salts or esters thereof, and is selected from the group consisting of: bromoxynil, diflufenican, metsulfuron-methyl, napropamide, thifensulfuronmethyl and sulfentrazone and mixtures of the two or more said second herbicide.

5. The method of claim 4, wherein said second herbicide are agriculturally acceptable salts or esters thereof, and is selected from the group consisting of: napropamide, diflufenican, sulfentrazone, metsulfuron-methyl and thifensulfuron-methyl; and mixtures of the two or more said second herbicide.

6. The method of claim 4, wherein said optional second herbicide is absent from the composition.

7. The method of claim 3, wherein said second herbicide, are agriculturally acceptable salts or esters thereof, and is selected from the group consisting of: diflufenican, pyroxasulfone and sulfentrazone and mixtures of the two or more said second herbicide.

8. The method of claim 7, wherein said second herbicide, are agriculturally acceptable salts or esters thereof, is selected from the group consisting of: pyroxasulfone and sulfentrazone and mixtures of the two said second herbicide.

9. The method of claim 8, wherein said second herbicide, are agriculturally acceptable salts or esters thereof, is pyroxasulfone.

10. A method of controlling undesired vegetation in a wheat crop comprising applying to the locus of said vegetation an herbicidally-effective amount of a composition comprising a first herbicide 2-(2,4-dichlorophenyl) methyl-4,4-dimethyl-3-isoxazolidinone ("2,4-DC") and at least a second herbicide, and agriculturally acceptable salts or esters thereof, the second herbicide being selected from the group consisting of: diflufenican, napropamide, pyroxasulfone, and sulfentrazone; and mixtures of two or more thereof, wherein there is no observed phytotoxicity of greater than 10% to the wheat crop 7 to 28 days after treatment (DAT).

11. The method of claim 10 wherein the second herbicide being selected from the group consisting of: diflufenican, pyroxasulfone, and sulfentrazone; and a mixture of the two or more said second herbicide.

12. The method of claim 11 wherein the second herbicide being selected from the group consisting of: diflufenican and sulfentrazone; and a mixture of the two second herbicide.

13. The method of claim 11 wherein the second herbicide is pyroxasulfone.

\* \* \* \* \*